United States Patent
Lee et al.

(10) Patent No.: US 11,395,001 B2
(45) Date of Patent: *Jul. 19, 2022

(54) IMAGE ENCODING AND DECODING METHODS AND APPARATUSES USING ARTIFICIAL INTELLIGENCE

(71) Applicant: SAMSUNG ELECTRONICS CO., LTD., Suwon-si (KR)

(72) Inventors: Jongseok Lee, Suwon-si (KR); Youngo Park, Suwon-si (KR); Pilkyu Park, Suwon-si (KR); Yumi Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,744

(22) Filed: Feb. 22, 2021

(65) Prior Publication Data

US 2021/0176490 A1  Jun. 10, 2021

Related U.S. Application Data

(63) Continuation of application No. 17/081,364, filed on Oct. 27, 2020.

(30) Foreign Application Priority Data

Oct. 29, 2019 (KR) .................. 10-2019-0135604

(51) Int. Cl.
*H04N 19/59* (2014.01)
*H04N 19/172* (2014.01)
(Continued)

(52) U.S. Cl.
CPC .............. *H04N 19/59* (2014.11); *G06N 3/04* (2013.01); *G06T 3/4046* (2013.01); *H04N 19/172* (2014.11); *H04N 19/61* (2014.11)

(58) Field of Classification Search
None
See application file for complete search history.

(56) References Cited

U.S. PATENT DOCUMENTS 7,308,031 B2   12/2007   Yamaguchi et al.
7,400,588 B2   7/2008   Izzat et al.
(Continued)

FOREIGN PATENT DOCUMENTS

JP   2008-527810 A   7/2008
JP   WO2021059476 A1 *   4/2021
(Continued)

OTHER PUBLICATIONS

Translation of WO2021/059476 A1 cited in the current Rejection—Obtained from STIC. (Year: 2019).*
(Continued)

*Primary Examiner* — Tyler W. Sullivan
(74) *Attorney, Agent, or Firm* — Sughrue Mion, PLLC

(57) ABSTRACT

Methods and apparatuses for image encoding and image decoding are provided. The image decoding method includes: obtaining deep neural network (DNN) update permission information indicating whether one or more pieces of DNN setting information are updated; based on the DNN update permission information indicating that the one or more pieces of the DNN setting information are updated, obtaining DNN update information necessary for determining one or more pieces of the DNN setting information that are updated; determining the one or more pieces of the updated DNN setting information according to the DNN update information; and obtaining a third image by performing artificial intelligence (AI) up-scaling on a second image according to the one or more pieces of the updated DNN setting information.

16 Claims, 30 Drawing Sheets

(51) Int. Cl.
 *G06T 3/40* (2006.01)
 *H04N 19/61* (2014.01)
 *G06N 3/04* (2006.01)

(56) References Cited

U.S. PATENT DOCUMENTS

| | | | |
|---|---|---|---|
| 8,184,164 | B2 | 5/2012 | Yang et al. |
| 8,385,406 | B2 | 2/2013 | Cho et al. |
| 9,129,190 | B1* | 9/2015 | Ranzato ............... G06V 10/82 |
| 9,251,572 | B2 | 2/2016 | Shu et al. |
| 9,602,814 | B2 | 3/2017 | Bhagavathy et al. |
| 9,679,213 | B2 | 6/2017 | Yang et al. |
| 9,936,208 | B1 | 4/2018 | Brailovskiy et al. |
| 10,148,723 | B2 | 12/2018 | Faivo |
| 10,218,971 | B2 | 2/2019 | Dong et al. |
| 10,225,607 | B1 | 3/2019 | Bai et al. |
| 10,499,069 | B2* | 12/2019 | Wang ............... H04N 19/177 |
| 10,623,775 | B1 | 4/2020 | Theis et al. |
| 10,805,634 | B2 | 10/2020 | Kapoor et al. |
| 11,164,340 | B2* | 11/2021 | Lee ............... G06T 3/4046 |
| 2005/0018768 | A1* | 1/2005 | Mabey ............... H04N 19/115 375/240.2 |
| 2005/0129306 | A1 | 6/2005 | Wang et al. |
| 2007/0183493 | A1* | 8/2007 | Kimpe ............... H04N 19/127 375/240.1 |
| 2007/0189392 | A1 | 8/2007 | Tourapis et al. |
| 2008/0140594 | A1 | 6/2008 | Tannhof et al. |
| 2009/0148054 | A1 | 6/2009 | Kim et al. |
| 2011/0090950 | A1 | 4/2011 | Bush et al. |
| 2012/0230604 | A1 | 9/2012 | Yamajo et al. |
| 2014/0037015 | A1 | 2/2014 | Ye et al. |
| 2014/0177706 | A1 | 6/2014 | Fernandes et al. |
| 2015/0256828 | A1 | 9/2015 | Dong et al. |
| 2015/0334416 | A1 | 11/2015 | Holcomb et al. |
| 2016/0328630 | A1 | 11/2016 | Han et al. |
| 2017/0208345 | A1 | 7/2017 | Jeong et al. |
| 2017/0287109 | A1 | 10/2017 | Tasfi |
| 2017/0345130 | A1 | 11/2017 | Wang et al. |
| 2017/0347061 | A1 | 11/2017 | Wang et al. |
| 2017/0357871 | A1 | 12/2017 | Zhai et al. |
| 2018/0063549 | A1 | 3/2018 | Amer et al. |
| 2018/0108137 | A1* | 4/2018 | Price ............... G06T 7/11 |
| 2018/0131953 | A1 | 5/2018 | Wang et al. |
| 2018/0139458 | A1 | 5/2018 | Wang et al. |
| 2018/0174275 | A1 | 6/2018 | Bourdev et al. |
| 2018/0176570 | A1 | 6/2018 | Rippel et al. |
| 2018/0176576 | A1 | 6/2018 | Rippel et al. |
| 2018/0249158 | A1 | 8/2018 | Huang et al. |
| 2018/0288440 | A1 | 10/2018 | Chao |
| 2018/0293706 | A1 | 10/2018 | Viswanathan et al. |
| 2018/0302456 | A1 | 10/2018 | Katsavounidis et al. |
| 2019/0013822 | A1 | 1/2019 | Marpe et al. |
| 2019/0075301 | A1 | 3/2019 | Chou et al. |
| 2019/0147296 | A1 | 5/2019 | Wang et al. |
| 2019/0166379 | A1 | 5/2019 | Michelini et al. |
| 2019/0230354 | A1 | 7/2019 | Kim |
| 2019/0311259 | A1* | 10/2019 | Cheri ............... H04L 65/605 |
| 2020/0053408 | A1 | 2/2020 | Park et al. |
| 2020/0097724 | A1* | 3/2020 | Chakravarty ...... G06K 9/00771 |
| 2020/0104720 | A1* | 4/2020 | Bao ............... G06N 3/0454 |
| 2020/0126186 | A1* | 4/2020 | Kim ............... H04N 19/117 |
| 2020/0126187 | A1* | 4/2020 | Park ............... H04N 19/172 |
| 2020/0126262 | A1* | 4/2020 | Kim ............... H04N 19/80 |
| 2020/0143194 | A1 | 5/2020 | Hou et al. |
| 2020/0162751 | A1 | 5/2020 | Kim et al. |
| 2020/0162789 | A1 | 5/2020 | Ma et al. |
| 2020/0184685 | A1* | 6/2020 | Kim ............... H04N 19/134 |
| 2020/0193647 | A1* | 6/2020 | Jeon ............... G06N 3/0454 |
| 2020/0211172 | A1* | 7/2020 | Nam ............... G06T 5/40 |
| 2020/0221242 | A1* | 7/2020 | Kim ............... H03G 9/005 |
| 2020/0250539 | A1* | 8/2020 | Liu ............... G06K 9/6223 |
| 2020/0311551 | A1* | 10/2020 | Aytekin ............... G06N 3/084 |
| 2020/0389658 | A1 | 12/2020 | Kim et al. |
| 2020/0394755 | A1 | 12/2020 | Park et al. |
| 2021/0049468 | A1* | 2/2021 | Karras ............... G06N 3/0454 |
| 2021/0125380 | A1* | 4/2021 | Lee ............... G06N 3/082 |
| 2021/0127135 | A1* | 4/2021 | Lee ............... G06T 3/4046 |
| 2021/0142445 | A1* | 5/2021 | Dinh ............... G06N 3/0454 |
| 2021/0256658 | A1* | 8/2021 | Kim ............... H04L 65/4069 |
| 2021/0398326 | A1* | 12/2021 | Lee ............... H04N 19/59 |
| 2022/0028121 | A1* | 1/2022 | Lee ............... G06T 3/4046 |
| 2022/0036561 | A1* | 2/2022 | Liu ............... G06K 9/629 |

FOREIGN PATENT DOCUMENTS

| | | |
|---|---|---|
| KR | 10-0224801 B1 | 10/1999 |
| KR | 10-2015-0041098 A | 4/2015 |
| KR | 10-2016-0080929 A | 7/2016 |
| KR | 10-2016-0131848 A | 11/2016 |
| KR | 10-2017-0059040 A | 5/2017 |
| KR | 10-2018-0001428 A | 1/2018 |
| KR | 10-1885855 B1 | 8/2018 |
| KR | 10-2018-0100976 A | 9/2018 |
| KR | 10-2018-0108288 A | 10/2018 |
| WO | 2012/058394 A1 | 5/2012 |
| WO | 2016/132148 A1 | 8/2016 |
| WO | 2017/036370 A1 | 3/2017 |
| WO | 2018/143992 A1 | 8/2018 |
| WO | 2019/185981 A1 | 10/2019 |
| WO | 2020/080623 A1 | 4/2020 |

OTHER PUBLICATIONS

Jeong, Woojin et al., "Efficient Super-Resolution Method for Single Image based on Deep Neural Networks", Journal of the Institute of Electronics and Information Engineers, vol. 55, No. 6, pp. 779-786, Jun. 2018. (13 pages total).

Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).

Seungbin Lee et al., "Performance Analysis of Convolution Neural Network and Generative Adversarial Network for Super Resolution", Journal of the Korean Institute of Information Scientists and Engineers, Jun. 2017, pp. 931-933. (5 pages total).

Sehwan Ki et al. "A Study on the Convolution Neural Network based on Blind High Dynamic Range Image Quality Assessment" The Journal of Korean Institute of Communications and Information Sciences, Jan. 2018, (5 pages total).

Le Callet, Patrick et al., "A Convolutional Neural Network Approach for Objective Video Quality Assessment", IEEE Transactions on Neural Networks, vol. 17. No. 5, Sep. 6, 2006, pp. 1316-1327. (14 pages total).

Michalis Giannopoulos et al. "Convolutional Neural Networks for Video Quality Assessment" Sep. 26, 2018, [retrieved from https://arxiv.org/abs/1809.10117v1] (14 pages total).

Jiang, Feng, et al. "An End-to-End Compression Framework Based on Convolutional Neural Networks" IEEE Transactions on Circuits and Systems for Video Technology, vol. 28, No. 10, Oct. 2018): 3007-3018. (Year: 2017).

Kim, Jaehwan et al., "Dynamic frame resizing with convolutional neural network for efficient video compression", Proceedings of SPIE, 2017, vol. 10396. (14 pages total).

Afonso, Mariana et al., "Spatial resolution adaptation framework for video compression", Proceedings of SPIE, 2018, vol. 10752. (11 pages total).

Cai, Bolun et al., "Deep Sampling Networks", arXiv:1712.00926v2 [cs.CV], Mar. 26, 2018. 17 pages total).

Li, Yue et al., "Convolutional Neural Network-Based Block Upsampling for Intra Frame Coding", IEEE Transactions on Circuits and Systems for Video Technology, arXiv:1702.06728v3 [cs.MM], Jul. 14, 2017. (14 pages total).

Li, Yue et al., "Learning a Convolutional Neural Network for Image Compact-Resolution", IEEE Transactions on Image Processing, vol. 28, No. 3, ,Mar. 2019, pp. 1092-1107.

Gorodilov, Artem et al., "Neural Networks for Image and Video Compression." 2018 International Conference on Artificial Intelligence Applications and Innovations (IC-AIAI). IEEE. (Year: 2018). (5 pages total).

(56) References Cited

OTHER PUBLICATIONS

Zhang, Xiangjun et al., "Can Lower Resolution Be Better?", Data Compression Conference, IEEE (Year: 2008), pp. 302-311.
Deshpande, Adit - Engineering at Forward, "A Beginner's Guide To Understanding Convolutional Neural Networks", UCLA CS '19, https://adeshpande3.github.io/A-Beginner%27s-Guide-To-Understanding-Convolutional-Neural-Networks/, downloaded Oct. 27, 2020. (13 pages total).
Chen, Honggang et al., "Low bit rates image compression via adaptive block downsampling and super resolution", Journal of Electronic Imaging, Jan./Feb. 2016, vol. 25, No. 1. (11 pages total).
Hosking, Brett et al., "An Adaptive Resolution Rate Control Method for Intra Coding in HEVC", 2016 IEEE International Conference on Acoustics, Speech and Signal Processing (ICASSP 2016): Proceesings of a meeting held Mar. 20, 2016-Mar. 25, 2016, Shanghai, China, pp. 1486-1490, Institute of Electrical and Electronics Engineers (IEEE). (6 pages total).
Hou, Xianxu et al., "Learning Based Image Transformation Using Convolutional Neural Networks", IEEE Access, Sep. 28, 2018, vol. 6, pp. 49779-49792.
Kim, Heewon et al., Task-Aware Image Downscaling, ECCV 2018. (16 pages total).
Mao, Xiao-Jiao et al., "Image Restoration Using Convolutional Auto-encoders with Symmetric Skip Connections", Manuscript, arXiv.1606.08921 v3 [cs.CV], Aug. 30, 2016. pp. 1-17. (18 pages total).
Park, Woon-Sung et al., "CNN-Based in-Loop Filtering for Coding Efficiency Improvement", IEEE, 2016. (5 pages total).
Dai, Yuanying et al., A Convolutional Neural Network Approach for Post-Processing in HEVC Intra Coding, Oct. 29, 2016, 12 pages.
Tao, Wen et al., "An End-to-End Compression Framework Based on Convolutional Neural Networks", 2017 Data Compression Conference, IEEE, Apr. 4, 2017, p. 463, XP033095376. (1 Page total).
Theis, Lucas et al., "Lossy Image Compression With Compressive Autoencoders", arXiv:1703.00395v1 [stat.ML], Mar. 1, 2017, XP080753545. (19 pages total).
Jiang, Feng et al., "An End-to-End Compression Framework Based on Convolutional Neural Networks", Submitted to IEEE Transactions on Circuits and Systems for Video Technology, arXiv:1708.00838v1 [cs.CV], Aug. 2, 2017, XP055610399. (13 pages total).
Nguyen, Viet-Anh et al., "Adaptive Downsampling/Upsampling for Better Video Compression at Low Bit Rate", Circuits and Systems, 2008. ISCAS 2008, IEEE International Symposium on, IEEE, May 18, 2008, XP031392300. (4 pages total).
Ben Yahia, Haitam et al., "Frame Interpolation using Convolutional Neural Networks on 2D animation", Universiteit Van Amsterdam, Bachelor Thesis, Aug. 5, 2016. (20 pages total).
Skoneczny, Slawomir et al., "Classical and neural methods of image sequence interpolation", Proceedings of SPEI 4535, Optical Sensing for Public Safety, Health, and Security, Aug. 24, 2001. (15 pages total).
Communication issued Apr. 28, 2020 by the European Patent Office in counterpart European Patent Application No. 19183429.0.
Communication issued Aug. 19, 2019 by the European Patent Office in counterpart European Patent Application No. 19183429.0.
International Search Report and Written Opinion dated Jan. 30, 2020 by the International Searching Authority in related International Patent Application No. PCT/KR2019/013421 (PCT/ISA210, PCT/ISA/220 and PCT/ISA/237).
International Search Report and Written Opinion dated Dec. 4, 2019 by the International Searching Authority in related International Patent Application No. PCT/KR2019/010645 (PCT/ISA210, PCT/ISA/220 and PCT/ISA/237).
International Search Report and Written Opinion dated Jan. 23, 2020 by the International Searching Authority in related International Patent Application No. PCT/KR2019/012836 (PCT/ISA210, PCT/ISA/220 and PCT/ISA/237).
International Search Report and Written Opinion dated Jan. 29, 2020 by the International Searching Authority in related International Patent Application No. PCT/KR2019/013595 PCT/ISA210, PCT/ISA/220 and PCT/ISA/237).
International Search Report and Written Opinion dated Feb. 21, 2020 by the International Searching Authority in related International Patent Application No. PCT/KR2019/013733 (PCT/ISA210, PCT/ISA/220 and PCT/ISA/237).
International Search Report and Written Opinion dated Apr. 5, 2018 by the International Searching Authority in related International Patent Application No. PCT/KR2017/007258 (PCT/ISA210, PCT/ISA/220 and PCT/ISA/237).
International Search Report and Written Opinion dated Jul. 11, 2018 by the International Searching Authority in related International Patent Application No. PCT/KR2018/001542 (PCT/ISA210, PCT/ISA/220 and PCT/ISA/237).
Sze et al., "Efficient Processing of Deep Neural Networks: A Tutorial and Survey," arXiv:1703.09039v2, Aug. 13, 2017, pp. 1-32.
Cho et al., A Technical Analysis on Deep Learning based Image and Video Compression, Journal of Broadcast Engineering Society, Korean Institute of Broadcast and Media Engineers, JBE vol. 23, No. 3, May 2018, pp. 383-394.
Communication dated Nov. 23, 2020, issued by the Korean Intellectual Property Office in Korean Patent Application No. 10-2019-0135604.
Communication dated Jan. 26, 2021, issued by the International Searching Authority in counterpart International Application No. PCT/KR2020/014868 (PCT/ISA/220, 210, 237).
Communication dated Jan. 5, 2021, issued by the Korean Intellectual Property Office in Korean Patent Application No. 10-2019-0076569.
Communication dated Jul. 21, 2021 issued by the Korean Intellectual Property Office of the Korean Application No. 10-2019-0076569.
Communication dated Jun. 29, 2021 issued by the European Patent Office in European Application No. 19873762.9.
Communication dated May 28, 2021 issued by the Korean Intellectual Property Office of the Korean Application No. 10-2019-0135604.
Communication dated Jul. 19, 2021 issued by the Korean Intellectual Property Office of the Korean Application No. 10-2019-0135604.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

| AI_codec_usage_highlevel_updeate ( payloadSize ) { | Descriptor |
|---|---|
| ai_codec_info | u(1) |
| If(ai_codec_info){ | |
|   ai_codec_DNN_update_flag | u(1) |
|   if(ai_codec_DNN_update_flag) { | |
|     ai_codec_num_DNN | u(8) |
|     for(i = 0; i< ai_codec_num_DNN ; i++) { | |
|       ai_codec_DNN_struct_reuse_flag  [ i ] | u(1) |
|       if(ai_codec_DNN_struct_reuse_flag [ i ]) { | |
|         ai_codec_DNN_struct_reuse_idx  [ i ] | u(8) |
|         for( j = 0; j< ai_codec_num_layers[ i ]; j++) { | |
|           ai_codec_layer_update_flag  [ i ][ j ] | u(1) |
|           if(ai_codec_layer_update_flag) { | |
|             for( k = 0; k < ai_codec_filter_out_channel[ i ] [ j ];k++) { | |
|               ai_codec_bias [ i ][ j ][ k ] | ue(v) |
|               for(l = 0; l < ai_codec_filter_in_channel [ i ][ j ] ; l++) { | |
|                 for(m = 0; m < ai_codec_filter_width[ i ][ j ] * ai_codec_filter_height[ i ][ j ] ; m++) { | |
|                   ai_codec_weights [ i ][ j ][ k ][ l ][ m ] | ue(v) |
|                 } | |
|               } | |
|             } | |
|           } | |
|         } | |
|       } else { | |
|         ai_codec_num_layers[ i ] | u(8) |
|         for( j = 0; j< ai_codec_num_layers; j++) { | |
|           ai_codec_filter_in_channel [ i ][ j ] | u(8) |
|           ai_codec_filter_out_channel  [ i ][ j ] | u(8) |
|           ai_codec_filter_width  [ i ][ j ] | u(8) |
|           ai_codec_filter_height  [ i ][ j ] | u(8) |
|           for( k = 0; k < ai_codec_filter_out_channel [ i ][ j ] ; k++) { | |
|             ai_codec_bias [ i ][ j ][ k ] | ue(v) |
|             for(l = 0; l < ai_codec_filter_in_channel [ i ][ j ] ; l++) { | |
|               for(m = 0; m < ai_codec_filter_width[ i ][ j ] * ai_codec_filter_height[ i ][ j ] ; m++) { | |
|                 ai_codec_weights  [ i ][ j ][ k ][ l ][ m ] | ue(v) |
|               } | |
|             } | |
|           } | |
|         } | |
|       } | |
|     } | |
|   } else { | |
|     ai_codec_DNN_index | ue(v) |
|   } | |
| } | |

FIRST SYNTAX 2610 (ai_codec_DNN_update_flag block through if(ai_codec_DNN_struct_reuse_flag))

SECOND SYNTAX 2620 (struct_reuse_idx through weights loop)

THIRD SYNTAX 2630 (else branch: num_layers, filter params, bias and weights loops)

FIRST SYNTAX 2610 (else: ai_codec_DNN_index)

FIG. 28
2800

| | Descriptor |
|---|---|
| AI_codec_partial_update ( payloadSize ) { | |
|   ai_codec_info | u(1) |
|   if (ai_codec_info) { | |
|     dependent_ai_condition_info | u(1) |
|     if (!dependent_ai_condition_info ) { | |
|       ai_codec_DNN_index | ue(v) |
|       ai_codec_DNN_update_flag | u(1) |
|       if(ai_codec_DNN_update_flag) { | |
|         for(j = 0; j < ai_codec_num_layers[ i ]; j++) { | |
|           ai_codec_layer_update_flag   [ i ][ j ] | u(1) |
|           if(ai_codec_layer_update_flag) { | |
|             for(k = 0; k < ai_codec_filter_out_channel[ i ]   [ j ];k++) { | |
|               ai_codec_bias [ i ][ j ][ k ] | ue(v) |
|               for(l = 0; l < ai_codec_filter_in_channel [ i ][ j ]  ; l++) { | |
|                 for(m = 0; m < ai_codec_filter_width[ i ][ j ] * ai_codec_filter_height[ i ][ j ]  ; m++) { | |
|                   ai_codec_weights  [ i ][ j ][ k ][ l ][ m ] | ue(v) |
|                 } | |
|               } | |
|             } | |
|           } | |
|         } | | ated, obtaining the third image by performing the AI up-scaling on the second image according to one or more pieces of default DNN setting information.

The DNN update information includes DNN number information indicating a number of the one or more pieces of the updated DNN setting information, and the determining the one or more pieces of the updated DNN setting information includes determining whether the number of the one or more pieces of the updated DNN setting information matches the number of the one or more pieces of the updated DNN setting information indicated by the DNN number information.

IMAGE ENCODING AND DECODING METHODS AND APPARATUSES USING ARTIFICIAL INTELLIGENCE

CROSS-REFERENCE TO RELATED APPLICATION

This application is a continuation of U.S. patent application Ser. No. 17/081,364, filed on Oct. 27, 2020, in the U.S. Patent and Trademark Office, which is based on and claims priority under 35 U.S.C. § 119 to Korean Patent Application No. 10-2019-0135604, filed on Oct. 29, 2019, in the Korean Intellectual Property Office, the disclosures of which are incorporated herein by reference in their entireties.

BACKGROUND

1. Field

The disclosure relates to the field of image processing, and more particularly, to apparatuses and methods for encoding and decoding an image by using a deep neural network (DNN).

2. Description of Related Art

An image is encoded using a codec conforming to a predefined data compression standard such as a Moving Picture Expert Group (MPEG) standard, etc., and then is stored in a recording medium or transmitted through a communication channel in the form of a bitstream.

With the development and dissemination of hardware capable of reproducing and storing high-resolution/high-definition images, there is an increasing need for a codec capable of effectively encoding and decoding high-resolution/high-definition images.

SUMMARY

Methods and apparatuses for encoding and decoding an image at a low bitrate by using a deep neural network (DNN) are provided.

Also, a computer-readable recording medium having recorded thereon a program for executing, on a computer, an image encoding method and an image decoding method according to an embodiment of the disclosure.

Additional aspects will be set forth in part in the description which follows and, in part, will be apparent from the description, or may be learned by practice of the presented embodiments of the disclosure.

According to an embodiment, there is provided an image decoding method including: obtaining deep neural network (DNN) update permission information indicating whether one or more pieces of DNN setting information are updated; based on the DNN update permission information indicating that the one or more pieces of the DNN setting information are updated, obtaining DNN update information necessary for determining one or more pieces of the DNN setting information that are updated; determining the one or more pieces of the updated DNN setting information according to the DNN update information; and obtaining a third image by performing artificial intelligence (AI) up-scaling on a second image according to the one or more pieces of the updated DNN setting information.

The image decoding method further includes, based on the DNN update permission information indicating that the one or more pieces of DNN setting information are not updated, obtaining the third image by performing the AI up-scaling on the second image according to one or more pieces of default DNN setting information.

The DNN update information further includes at least one of layer number information indicating a number of layers included in a DNN, input channel information indicating a number of input channels in each of the layers, output channel information indicating a number of output channels in each layer, filter kernel size information indicating a size of a filter kernel in each layer, weight information indicating weights of the filter kernel, or bias information indicating a bias for adjusting an output of the filter kernel.

The obtaining the DNN update information includes: obtaining default DNN reuse permission information indicating whether a structure of a default DNN is reused for the updated DNN setting information; and based on the default DNN reuse permission information indicating that the structure of the default DNN is reused for the updated DNN setting information, obtaining reference DNN index information indicating an index of the default DNN of which information is reused, and wherein the determining the one or more pieces of the updated DNN setting information includes, based on the default DNN reuse permission information indicating that the structure of the default DNN is reused for the updated DNN setting information, determining the one or more pieces of the updated DNN setting information according to the structure of the default DNN indicated by the reference DNN index information and the DNN update information.

The determining the one or more pieces of the updated DNN setting information further includes determining a number of layers, a number of input channels in each of the layers, a number of output channels in each layer, and a size of a filter kernel of each layer according to a number of default layers in the default DNN indicated by the reference DNN index information, a number of default input channels in each of the default layers, a number of output channels in each default layer, and a size of a filter kernel of each default layer and determining, from the DNN update information, weights and a bias of the filter kernel in the updated DNN setting information.

The DNN update information includes at least one of weight information indicating the weights of the filter kernel or bias information indicating the bias for adjusting an output of the filter kernel, the weight information indicates a difference between weights respectively in the default DNN and an updated DNN, and the bias information indicates a difference between biases respectively in the default DNN and the updated DNN.

The obtaining the DNN update permission information, the obtaining the DNN update information, and the determining the one or more pieces of the updated DNN setting information are performed for a frame group that is a coded video sequence including a plurality of frames, and wherein the obtaining the third image includes: determining, for a frame in the frame group, the updated DNN setting information used for the frame based on the one or more pieces of the updated DNN setting information; and obtaining the third image in the frame by performing the AI up-scaling on the second image in the frame according to the updated DNN setting information.

The obtaining the third image includes: obtaining, for a frame, DNN index information indicating updated DNN setting information used for the frame based on the one or more pieces of the updated DNN setting information; determining, according to the DNN index information, the updated DNN setting information used for the frame based on the one or more pieces of the updated DNN setting information; obtaining secondary DNN update permission information indicating whether a secondary update of the updated DNN setting information is to be performed; based on the secondary DNN update permission information indicating that the secondary update of the updated DNN setting information is to be performed, obtaining secondary DNN update information; and obtaining the third image by performing the AI up-scaling on the second image by using secondary updated DNN setting information determined according to the secondary DNN update information.

According to an embodiment, there is provided an image decoding method including: obtaining, for a frame from among a plurality of frames, deep neural network (DNN) index information indicating one or more pieces of default DNN setting information used for up-scaling a second image from among a plurality of pieces of default DNN setting information; obtaining DNN update permission information indicating whether the default DNN setting information indicated by the DNN index information is updated; based on the DNN update permission information indicating that the default DNN setting information is updated, obtaining DNN update information necessary for determining one or more pieces of the DNN setting information that are updated; determining the one or more pieces of the updated DNN setting information according to the DNN update information; and obtaining a third image in the frame by performing artificial intelligence (AI) up-scaling on the second image in the frame according to the one or more pieces of the updated DNN setting information.

According to an embodiment, there is provided an image decoding apparatus including: a memory storing one or more instructions; and a processor configured to execute the one or more instructions stored in the memory to: obtain deep neural network (DNN) update permission information indicating whether one or more pieces of DNN setting information are updated; based on the DNN update permission information indicating that the one or more pieces of DNN setting information are updated, obtain DNN update information necessary for determining one or more pieces of the DNN setting information that are updated; determine the one or more pieces of the updated DNN setting information according to the DNN update information; and obtain a third image by performing artificial intelligence (AI) up-scaling on a second image according to the one or more pieces of the updated DNN setting information.

According to an embodiment, there is provided a non-transitory computer-readable recording medium having recorded thereon a program for performing the image decoding method provided above.

According to an embodiment, there is provided a non-transitory computer-readable recording medium in which artificial intelligence (AI) data is stored, wherein the AI data includes deep neural network (DNN) update permission information indicating whether one or more pieces of DNN setting information are updated, based on the DNN update permission information indicating that the one or more pieces of the DNN setting information are updated, the AI data further includes DNN update information necessary for determining one or more pieces of the DNN setting information that are updated, and DNN index information that indicates whether the updated DNN setting information used for up-scaling a second image based on the one or more pieces of the updated DNN setting information.

The DNN update information includes DNN number information indicating a number of the one or more pieces of the updated DNN setting information, and the DNN index information indicates whether a number of the one or more pieces of the updated DNN setting information matches the number of the one or more pieces of the updated DNN setting information indicated by the DNN number information.

The DNN update information includes at least one of layer number information indicating a number of layers included in a DNN, input channel information indicating a number of input channels in each of the layers, output channel information indicating a number of output channels in each layer, filter kernel size information indicating a size of a filter kernel in each layer, weight information indicating weights of the filter kernel, or bias information indicating a bias for adjusting an output of the filter kernel.

The DNN update information further includes: default DNN reuse permission information indicating whether a structure of a default DNN is reused for the updated DNN setting information; and when the default DNN reuse permission information indicates that the structure of the default DNN is reused for the updated DNN setting information, the DNN update information further includes reference DNN index information indicating an index of the default DNN of which information is reused, and the DNN update information further includes information related to an update of the DNN setting information for which the structure of the default DNN indicated by the reference DNN index information is not reused.

The DNN setting information for which the structure of the default DNN indicated by the reference DNN index information is reused includes a number of layers in the default DNN, a number of input channels in each of the layers, a number of output channels in each layer, and a size of a filter kernel of each layer, the DNN setting information for which the structure of the default DNN indicated by the reference DNN index information is not reused includes weights and a bias of the filter kernel.

The DNN update information includes at least one of weight information indicating the weights of the filter kernel or bias information indicating the bias for adjusting an output of the filter kernel, wherein the weight information indicates a difference between a weight in the default DNN and a weight in an updated DNN, and wherein the bias information indicates a difference between a bias in the default DNN and a bias in the updated DNN.

The DNN update permission information and the DNN update information are set for a frame group including a plurality of frames, and wherein the DNN index information is set for each of the plurality of frames in the frame group.

The DNN index information is set for each of a plurality of frames in a frame group, and wherein the AI data further includes: secondary DNN update permission information indicating whether a secondary update of the updated DNN setting information determined according to the DNN index information is to be performed, and when the secondary DNN update permission information indicates that the secondary update of the updated DNN setting information is to be performed, secondary DNN update information necessary for determining secondary updated DNN setting information used for the up-scaling of the second image.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a table showing a mapping relationship between several pieces of image-related information and several pieces of DNN setting information according to an embodiment;

FIG. 26 illustrates an AI codec high-level syntax in which the data structure of FIG. 23 including AI data related to an update of DNN setting information is implemented, according to an embodiment;

FIG. 28 illustrates an AI codec high-level syntax in which the data structure of FIG. 27 including AI data related to an update of DNN setting information is implemented, according to an embodiment;

DETAILED DESCRIPTION

Figure 1:
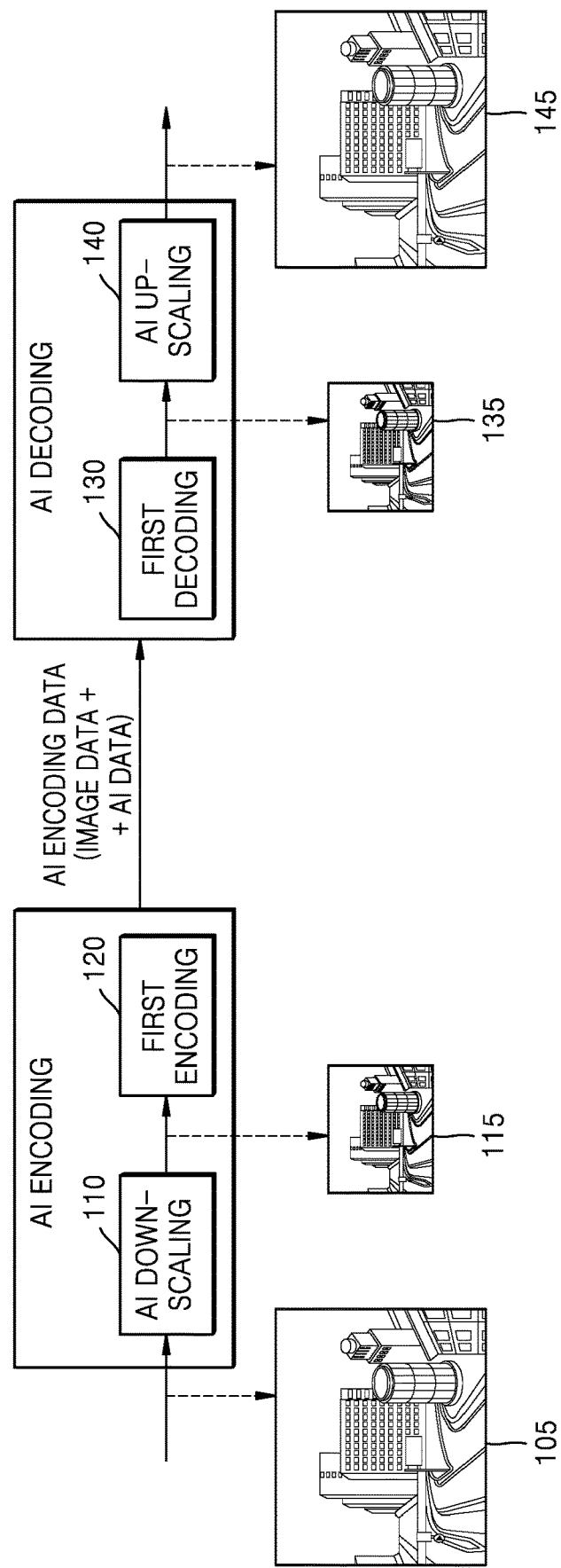
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of the embodiments, certain detailed explanations of related art are omitted when such explanations may unnecessarily obscure the essence of the disclosure. Also, numbers (for example, a first, a second, and the like) used in the description are merely identifying labels for distinguishing one element from another.

Throughout the disclosure, the expression "at least one of a, b or c" includes only a, only b, only c, both a and b, both a and c, both b and c, all of a, b, and c, or variations thereof.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

In the disclosure, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the disclosure, an 'image' or a 'picture' may denote a still image, a moving image including a plurality of consecutive still images (or frames), or a video.

Also, in the disclosure, a deep neural network (DNN) is a representative example of an artificial neural network model simulating brain nerves, and is not limited to an artificial neural network model using a specific algorithm.

Also, in disclosure, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the disclosure, a 'first DNN' indicates a DNN used for artificial intelligence (AI) down-scaling an image, and a 'second DNN' indicates a DNN used for AI up-scaling an image.

Also, in the disclosure, 'DNN setting information' includes information related to an element constituting a DNN. 'DNN setting information' includes the parameter described above as information related to the element constituting the DNN. The first DNN or the second DNN may be set by using the DNN setting information.

Also, in the disclosure, an 'original image' denotes an image that is an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the disclosure, 'AI down-scale' denotes a process of decreasing a resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing a resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving the efficiency of encoding and decoding of an image is required.

As shown in FIG. 1, a first image 115 is obtained by performing AI down-scaling 110 on an original image 105 having high resolution. Then, first encoding 120 and first decoding 130 are performed on the first image 115 having relatively low resolution, and thus a bitrate may be significantly reduced compared to simply performing the first encoding and the first decoding on the high resolution original image 105.

In particular, in FIG. 1, the first image 115 is obtained by performing the AI down-scaling 110 on the original image 105 and the first encoding 120 is performed by an encoding apparatus or the like, on the first image 115 during the AI encoding process. During the AI decoding process, AI encoding data including AI data and image data, which are obtained as a result of AI encoding, is received by a decoding apparatus or the like, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on an AI model, and the AI model for performing the AI down-scaling 110 needs to be trained jointly with an AI model for performing the AI up-scaling 140 of the second image 135. This is because, when the AI model for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target included in the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, an information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. In addition, according to an embodiment, the AI data may be transmitted separately from the image data, in a form of a frame or a packet. The AI data and the image data obtained as a result of the AI encoding may be transmitted through the same network or through different networks.

Figure 2:
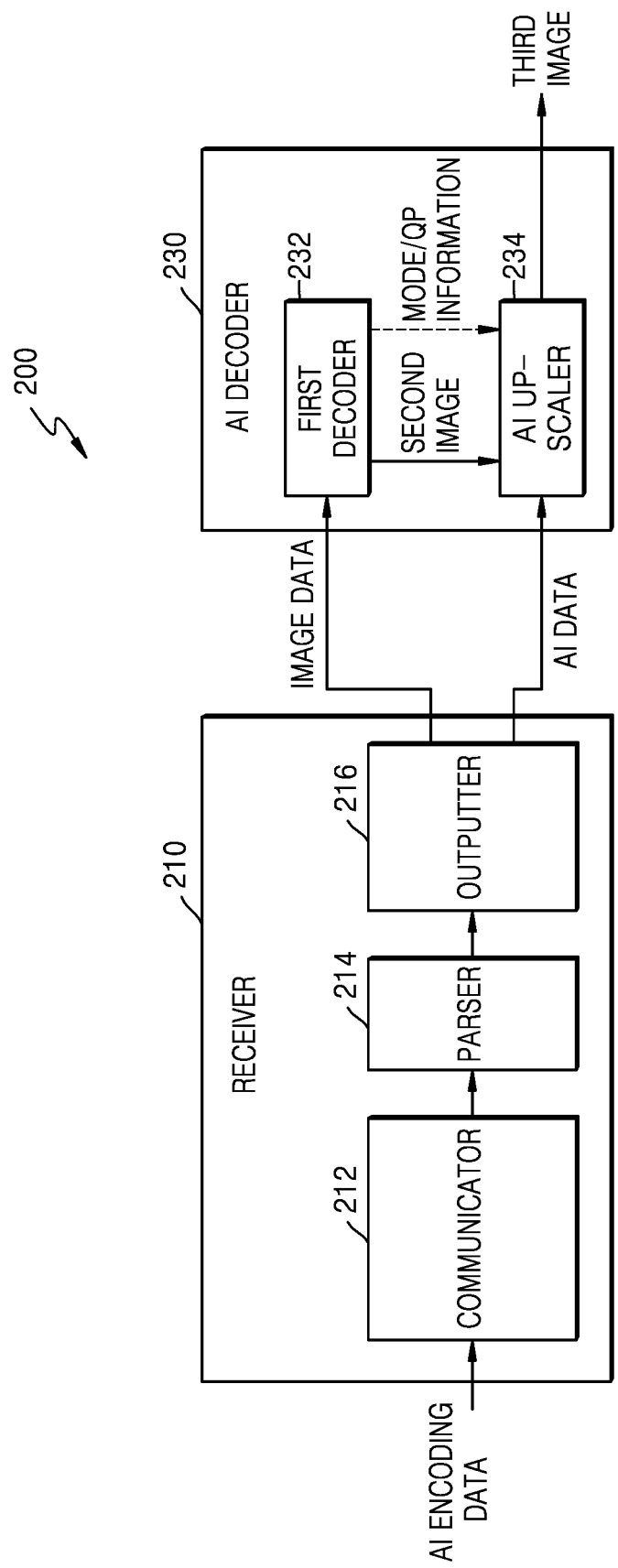
FIG. 2 is a block diagram of an AI decoding apparatus according to an embodiment.

FIG. 2 is a block diagram of an AI decoding apparatus 100 according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and outputs image data and AI data to the AI decoder 230.

In particular, the communicator 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to segment the image data from the AI data. For example, the parser 214 may distinguish the image data and the AI data by reading a header of data obtained from the communicator 212. According to an embodiment, the parser 214 transmits the image data and the AI data to the outputter 216 via the header of the data received through the communicator 212, and the outputter 216 transmits the image data and AI data respectively to the first decoder 232 and the AI up-scaler 234. At this time, the image data included in the AI encoding data may be verified as image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the decoded second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through a dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling target of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may include information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may include vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method of performing AI up-scaling on the second image 135 according to the up-scaling target by the AI up-scaler 234, an AI up-scaling process through the second DNN will be described with reference to FIGS. 3 and 4.

Figure 3:
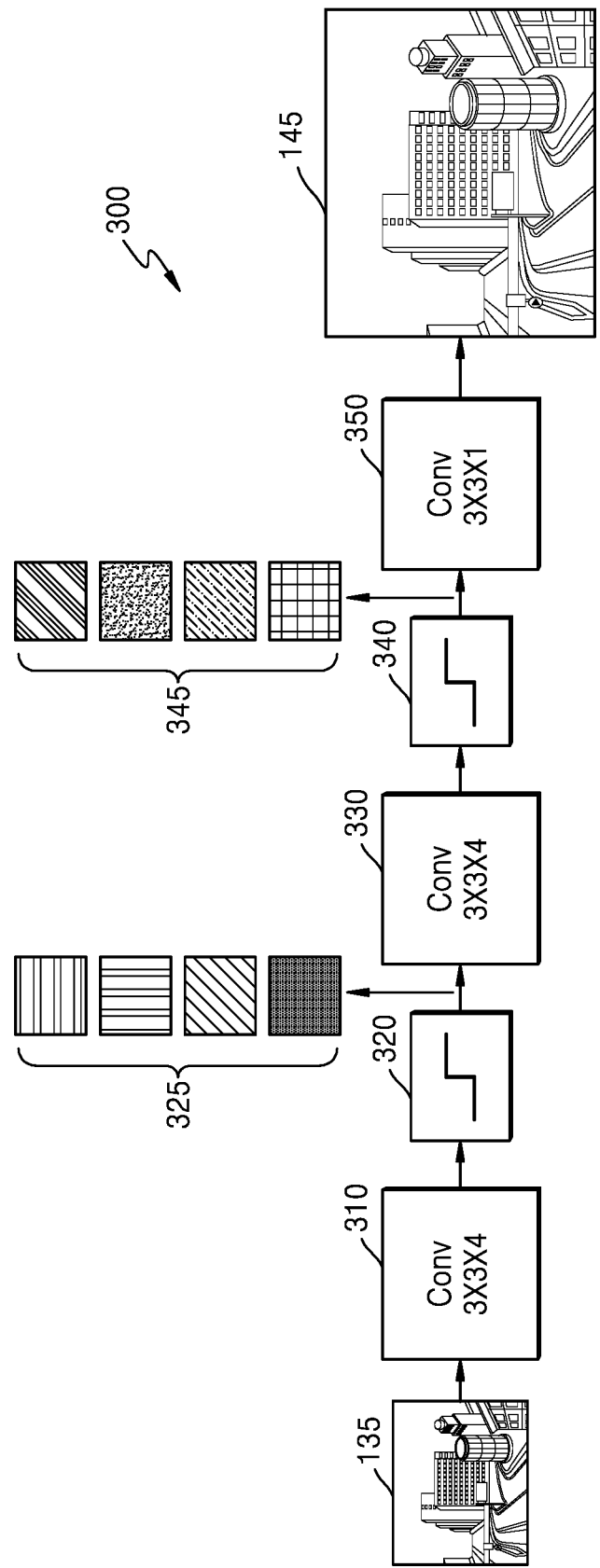
FIG. 3 is a diagram showing a second deep neural network (DNN) for performing AI up-scaling on a second image according to an embodiment.
Figure 4:
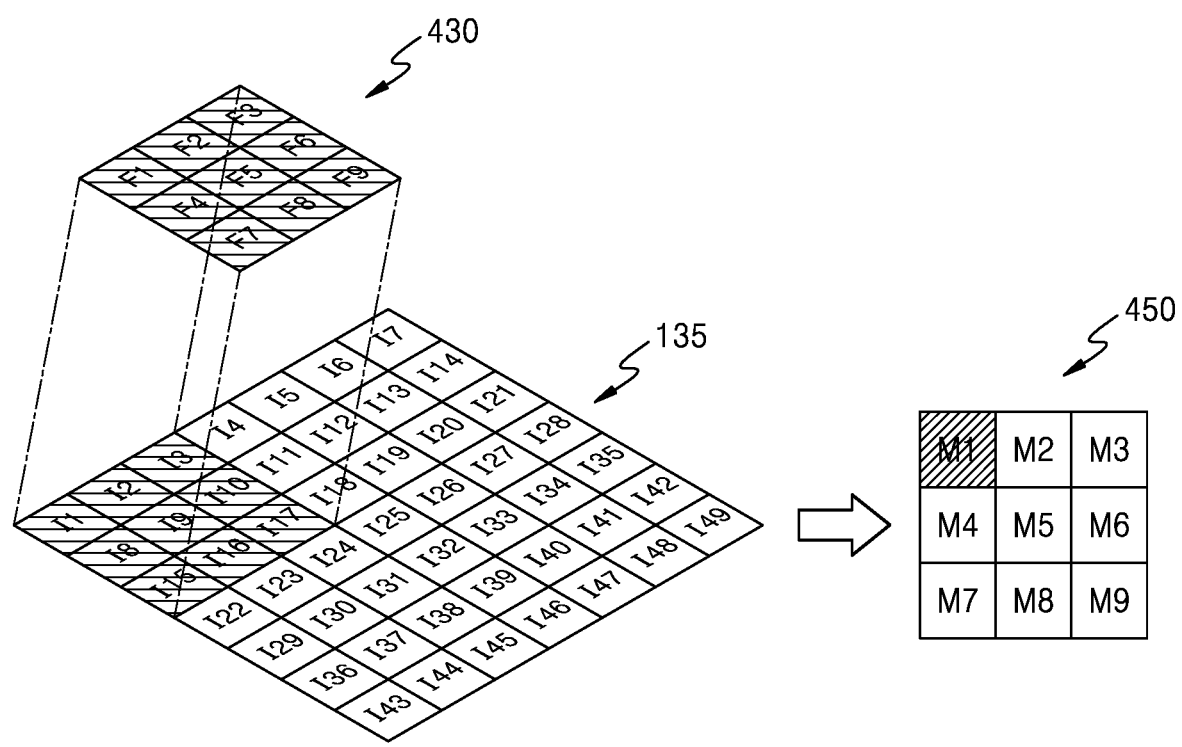
FIG. 4 is a diagram for describing a convolution operation by a convolution layer according to an embodiment.

FIG. 3 is a diagram showing a second DNN 300 for performing AI up-scaling on the second image 135 according to an embodiment, and FIG. 4 is a diagram for describing a convolution operation in a first convolution layer 310 of FIG. 3 according to an embodiment.

As shown in FIG. 3, the second image 135 is input to the first convolution layer 310. Here, the label 3×3×4 in the first convolution layer 310 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

Referring to FIG. 4, I1 through I49 indicate pixels in the second image 135, and F1 through F9 in the filter kernel 430 indicate parameters of the filter kernel 430. Also, M1 through M9 in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450. Similarly, M3 through M9 of the feature map 450 may be obtained by performing the above-described operation process.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through jointly training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a hyperbolic tangent (Tan h) function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

The label 3×3×4 in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. The label 3×3×1 in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the number of convolution layers and the number of activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information configurable in a second DNN.

Here, the DNN setting information may include information about at least one of the number of convolution layers included in the second DNN, the number of filter kernels for each convolution layer, or one or more parameters of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain DNN setting information for performing AI up-scaling on the second image 135, among the plurality of pieces of DNN setting information. Each of the plurality of pieces of DNN setting information may be information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 at a resolution that is twice the resolution of the second image 135, for example, the third image 145 may have a 4 K (4096×2160) resolution that is twice the 2 K (2048×1080) resolution of the second image 135, and another piece of DNN setting information may include information for obtaining the third image 145 of resolution four times higher than the resolution of the second image 135, for example, the third image 145 of 8 K (8192×4320) resolution four times higher than the 2 K (2048×1080) of the second image 135.

Figure 6:
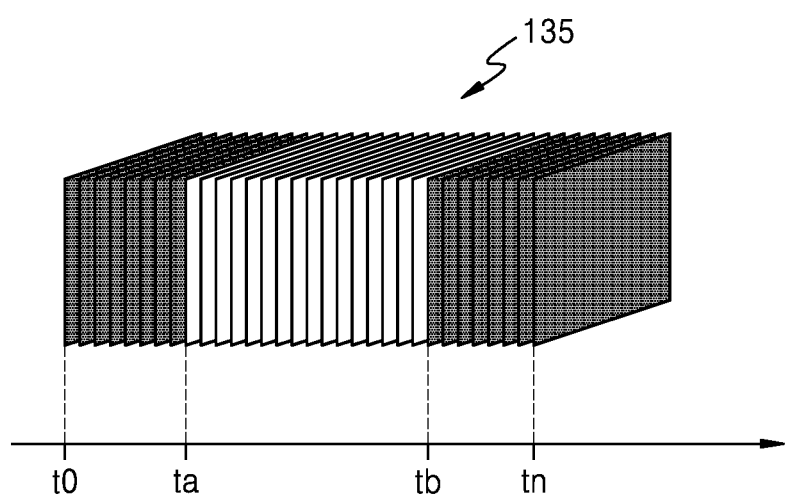
FIG. 6 is a diagram showing a second image including a plurality of frames according to an embodiment.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN that is trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160) resolution) of the original image 105 is twice higher than the resolution (for example, 2 K (2048×1080) resolution) of the first image 115, based on the difference information, the AI up-scaler 234 may obtain the DNN setting information for increasing the resolution of the second image 135 by two-folds.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between image-related information and DNN setting information according to an embodiment.

According to FIG. 5, the AI encoding and AI decoding processes do not only consider a change of resolution, but also other factors for performing the AI encoding and decoding processes. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information. When it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 based on the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information configurable or selectable in the first DNN and identifiers indicating each of the plurality of DNN setting information configurable or selectable in the second DNN may be previously designated. In this case, the same identifier may be designated for a pair of DNN setting information configurable or selectable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, one or more parameters of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of a DNN corresponding to the up-scaling target is determined, the AI up-scaler 234 may obtain the DNN setting information, for example, parameters of a filter kernel, corresponding to the determined structure of the DNN.

The AI up-scaler 234 obtains the DNN setting information of the second DNN through the AI data including information related to the first DNN, and performs AI up-scaling on the second image 135 through the second DNN set based on the obtained DNN setting information. As such, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135 based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data being applicable. For example, when the AI data includes information indicating that DNN setting information is applicable up to the frame ta, the AI up-scaler 234 performs AI up-scaling on the frames t0 through ta by using DNN setting information obtained based on the AI data. Also, when another piece of AI data includes information indicating that DNN setting information is applicable up to the frame tn, the AI up-scaler 234 performs AI up-scaling on the frames ta+1 through to by using DNN setting information obtained based on the other piece of AI data.

Hereinafter, the AI encoding apparatus 600 for performing AI encoding on the original image 105 will be described with reference to FIG. 7.

Figure 7:
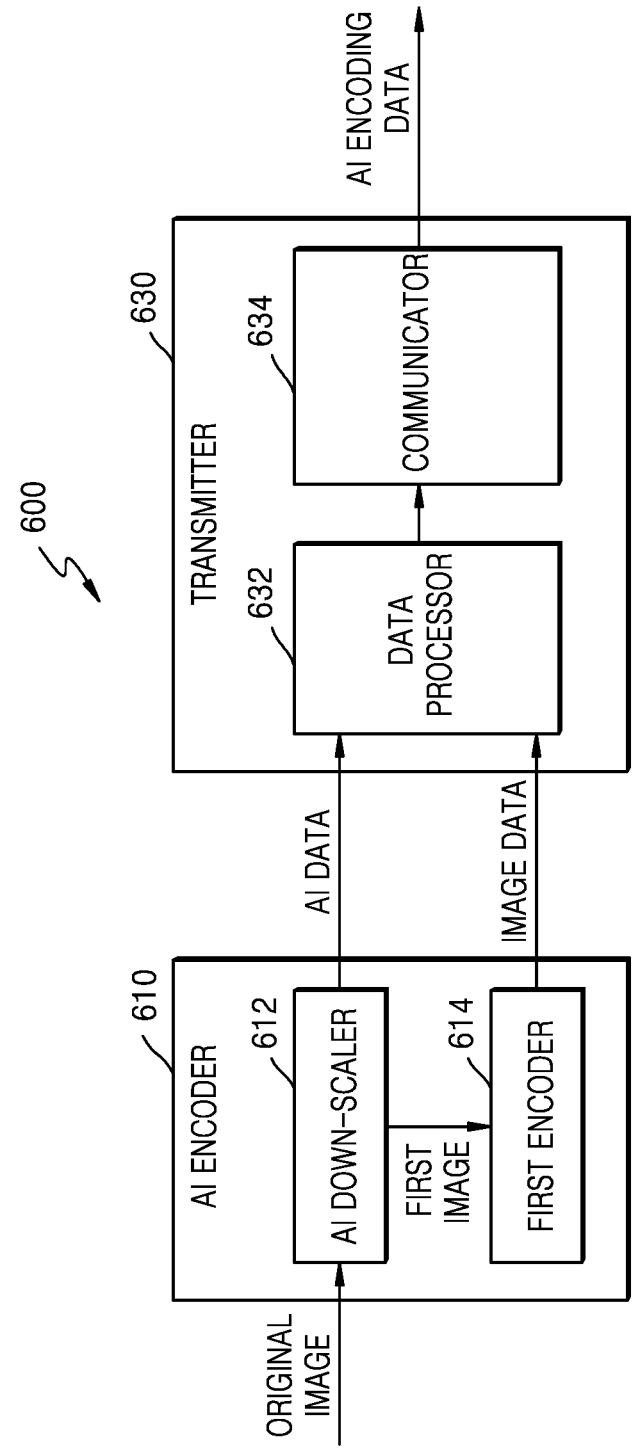
FIG. 7 is a block diagram of an AI encoding apparatus according to an embodiment.

FIG. 7 is a block diagram of an AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through a dedicated processor or through a combination of software and general-purpose processor such as AP, CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200. The transmitter 630 may include a communication interface, such as a wireless communication interface including a radio and/or an antenna or a wired communication interface such as HDMI, Ethernet, and the like.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed or uniform DNN setting information such that the AI up-scaling is performed on the second image 135 to the up-scaling target corresponding to the down-scaling target of the first DNN.

Also, according to an embodiment, the AI data may include DNN setting information configurable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 based on the down-scaling target, the AI down-scaler 612 may store a plurality of pieces of DNN setting information configurable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of a pre-determined resolution and/or a pre-determined quality. For example, any one piece of DNN setting information among the plurality of pieces of DNN setting information may include information for obtaining the first image 115 at a resolution that is half the resolution of the original image 105, for example, the first image 115 may be down-scaled to 2 K (2048×1080) resolution that is half the 4 K (4096×2160) resolution of the original image 105, and another piece of DNN setting information may include information for obtaining the first image 115 at a resolution that is a quarter of the resolution of the original image 105, for example, the first image 115 may be down-scaled to 2 K (2048×1080) resolution that is a quarter of the 8 K (8192×4320) resolution of the original image 105.

According to an embodiment, when pieces of information (for example, the number of convolution layers, the number of filter kernels for each convolution layer, one or more parameters of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of a DNN corresponding to the down-scaling target, and obtain DNN setting information corresponding to the determined structure of the DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or one or more parameters of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much resolution is decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using compression history information stored in the AI encoding apparatus 600. For example, according to the compression history information of the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most frequently according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames among the plurality of frames, or may determine down-scaling target for all of the plurality of frames.

According to an embodiment, the AI down-scaler 612 may divide the frames included in the original image 105 into a certain number of groups, and independently determine down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
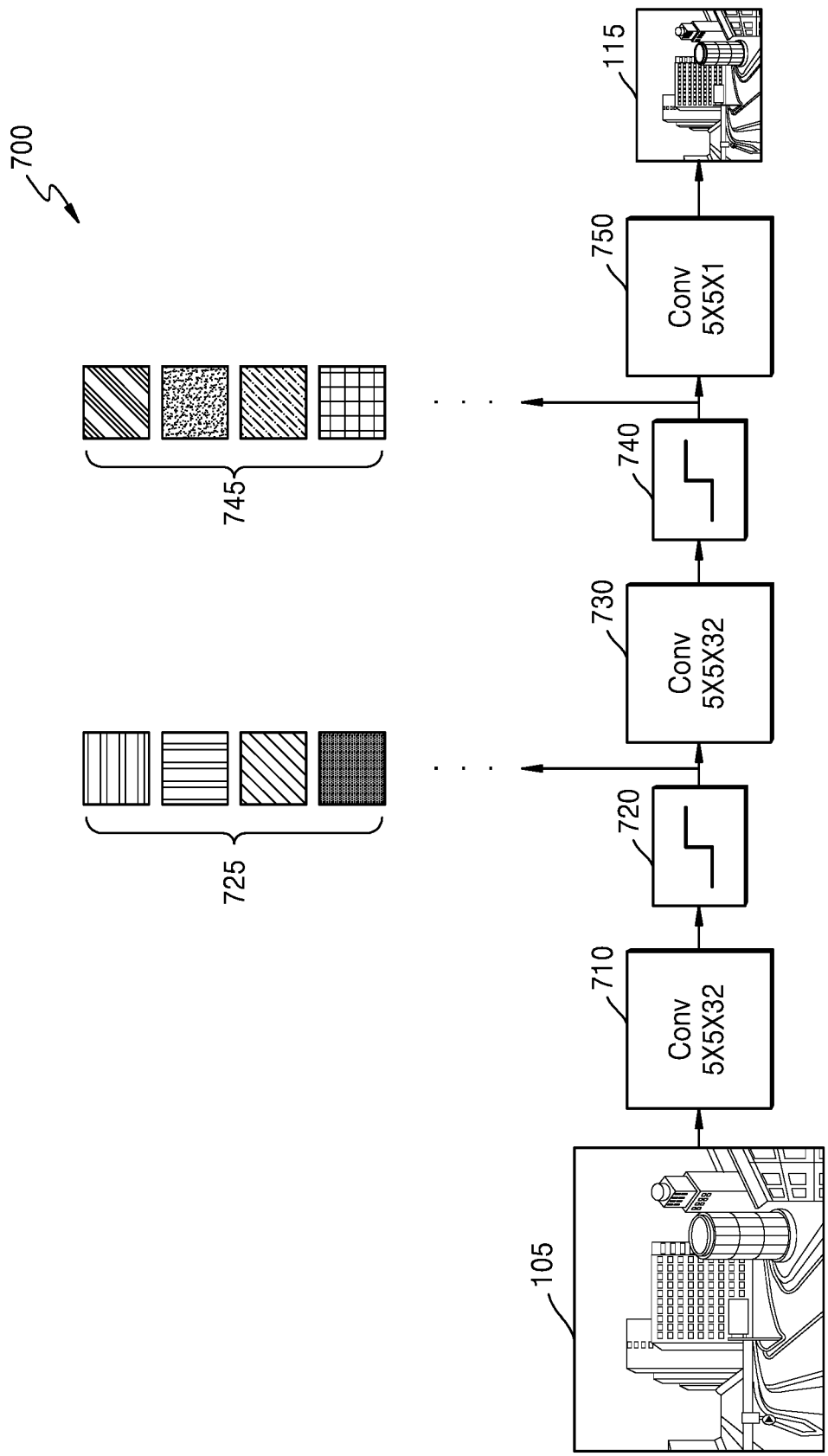
FIG. 8 is a diagram showing a first DNN for performing AI down-scaling on an original image according to an embodiment.

FIG. 8 is a diagram illustrates a first DNN 700 for performing AI down-scaling on the original image 105 according to an embodiment.

As shown in FIG. 8, the original image 105 is input to a first convolution layer 710. The first convolution layer 710 performs a convolution process on the original image 105 by using 32 filter kernels having a size of 5×5. Here, 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and are not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. Here, 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation. Although the embodiments for the convolution layers and the activation layers have been described above, the convolution layers and the activation layers are not limited to the specific embodiments described above, and may be configured variously.

There may be a plurality of pieces of DNN setting information indicating the numbers of filter kernels of the first, second, and third convolution layers 710, 730, and 750 of the first DNN 700, one or more parameters of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750, respectively) and two activation layers (the first and second activation layers 720 and 740, respectively), but this is only an example, and the numbers of convolution layers and activation layers may vary according to various embodiments. Also, according to an embodiment, the first DNN 700 may be implemented as an RNN. In this case, a CNN structure of the first DNN 700 may be changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a tan h function, or a Rectifier Linear Unit (ReLU) function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
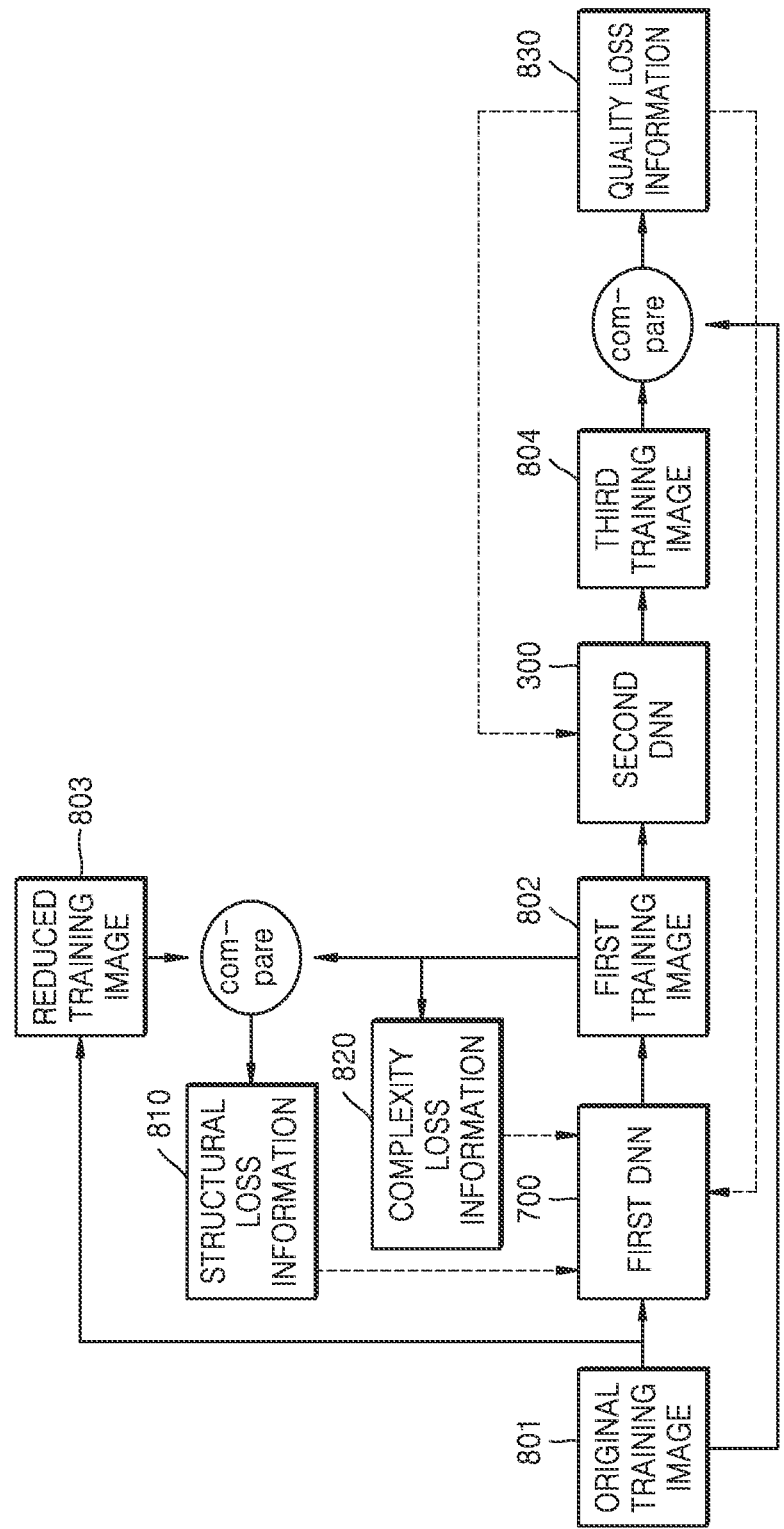
FIG. 9 is a diagram for describing a method of training a first DNN and a second DNN according to an embodiment.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity or consistency between the original image 105 and the third image 145 obtained as a result of AI decoding, communication or coordination between the AI encoding process and the AI decoding process is required. In other words, information lost in the AI encoding process needs to be reconstructed during the AI decoding process, and in this regard, the first DNN 700 and the second DNN 300 need to be jointly trained to make up for the information loss.

For accurate AI decoding, quality loss information 830 corresponding to a difference between a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image to which AI down-scaling is to be performed and a first training image 802 is an image obtained by performing AI down-scaling on the original training image 801. Also, the third training image 804 is an image obtained by performing AI up-scaling on the first training image 802.

The original training image 801 may be a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 may each include a plurality of frames. When the plurality of frames of the original training image 801 are sequentially input to the first DNN 700, a plurality of frames of the first training image 802, a plurality of frames of the second training image and a plurality of frames of the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent structural feature of the first image 115 deviating greatly from the structural feature of the original image 105, the reduced training image 803 is obtained to preserve the structural feature of the original training image 801.

Before training is performed, the first DNN 700 and the second DNN 300 may be configured according to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined according to Equation 1 below.

LossDS=$a$×Structural loss information+$b$×Complexity loss information+$c$×Quality loss information LossUS=$d$×Quality loss information       [Equation 1]

In Equation 1, LossDS indicates final loss information to be reduced or minimized to train the first DNN 700, and LossUS indicates final loss information to be reduced or minimized to train the second DNN 300. Also, coefficients a, b, c and d may be pre-determined weights.

In other words, the first DNN 700 updates parameters such that LossDS of Equation 1 is reduced, and the second DNN 300 updates parameters such that LossUS is reduced. When the parameters of the first DNN 700 are updated according to LossDS derived during the training, the first training image 802 obtained based on the updated parameters becomes different from a previous first training image 802 obtained based on parameters that have not been updated, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. Accordingly, because the first DNN 700 and the second DNN 300 are jointly trained by sharing the quality loss information 830, the parameters of the first DNN 700 and the parameters of the second DNN 300 may be jointly optimized.

Referring to Equation 1, it may be assumed that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

The parameters of the first DNN 700 may be optimized by adjusting the weights a, b, and c of Equation 1. For example, when the weight b is set to a high value, the parameters of the first DNN 700 may be updated to be prioritizing a low bitrate over high quality of the third training image 804. When the weight c is set to a high value, the parameters of the first DNN 700 may be updated to be prioritizing high quality of the third training image 804 over a high bitrate or maintaining of the structural information of the original training image 801.

Also, the parameters of the first DNN 700 may be optimized according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 may be jointly optimized.

Also, when the first DNN 700 and the second DNN 300 are trained after changing the weights a, b, and c, and the type of codec, the parameters of the first DNN 700 and the parameters of the second DNN 300 jointly optimized may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
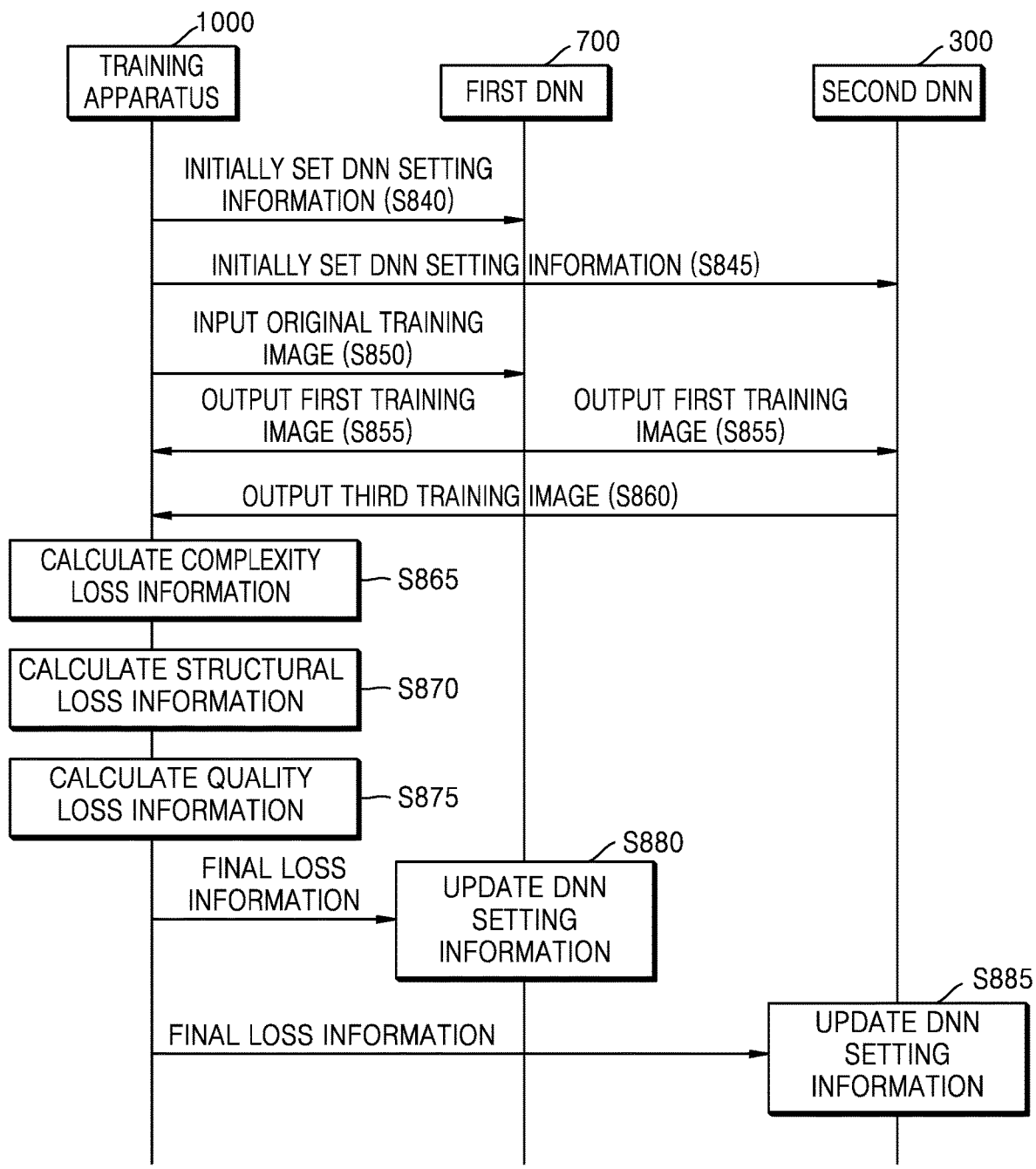
FIG. 10 is a sequence flowchart for describing a training process of a first DNN and a second DNN by a training apparatus according to an embodiment.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, in operations S840 and S845, the training apparatus 1000 initially sets the DNN setting information of the first DNN 700 and the second DNN 300. Accordingly, the first DNN 700 and the second DNN 300 may operate according to the initialized DNN setting information. The DNN setting information may include information about at least one of the number of convolution layers included in the first DNN 700 and the second DNN 300, the number of filter kernels for each convolution layer, the size of a filter kernel for each convolution layer, or one or more parameters of each filter kernel.

In operation S850, the training apparatus 1000 inputs the original training image 801 into the first DNN 700. The original training image 801 may include a still image or at least one frame included in a moving image.

The first DNN 700 processes the original training image 801 according to the initialized DNN setting information and outputs the first training image 802 obtained by performing AI down-scaling on the original training image 801, in operation S855. In FIG. 10, the first training image 802 output from the first DNN 700 is directly input to the second DNN 300 or the first training image 802 output from the first DNN 700 may be input to the second DNN 300 by the training apparatus 1000. Also, the training apparatus 1000 may perform first encoding and first decoding on the first training image 802 via a certain codec, and then provide the second training image as input to the second DNN 300.

The second DNN 300 processes the first training image 802 or the second training image according to the initialized DNN setting information and outputs the third training image 804 obtained by performing AI up-scaling on the first training image 802 or the second training image, in operation S860.

The training apparatus 1000 calculates the complexity loss information 820 based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to generate the DNN setting information. During each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, being higher than subjective image quality when encoding and decoding are performed via HEVC, a bitrate is reduced by at least 50%.

Figure 11:
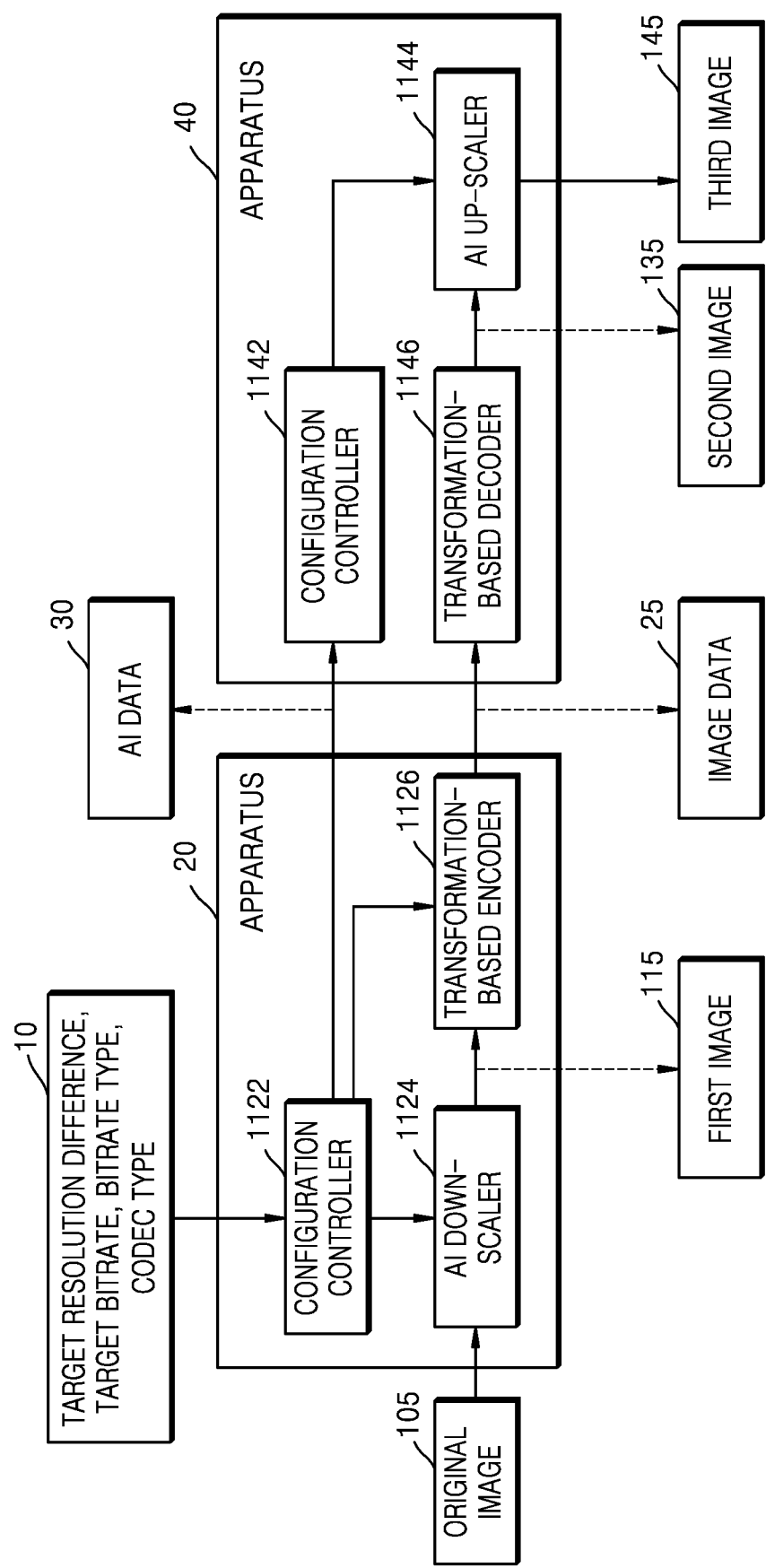
FIG. 11 is a diagram of an apparatus for performing AI down-scaling on an original image and an apparatus for performing AI up-scaling on a second image according to an embodiment.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program may be stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution for each of the AI down-scaler 1124 and the AI up-scaler 1144, a bitrate of the image data 25, a bitrate type of the image data 25 (for example, a variable bitrate type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and configures the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling may be applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to FIGS. 1, 7, 8, 9 and 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10. The information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and configures the AI up-scaler 1144 according to the obtained DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information based on the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, H.265/HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

Figure 12:
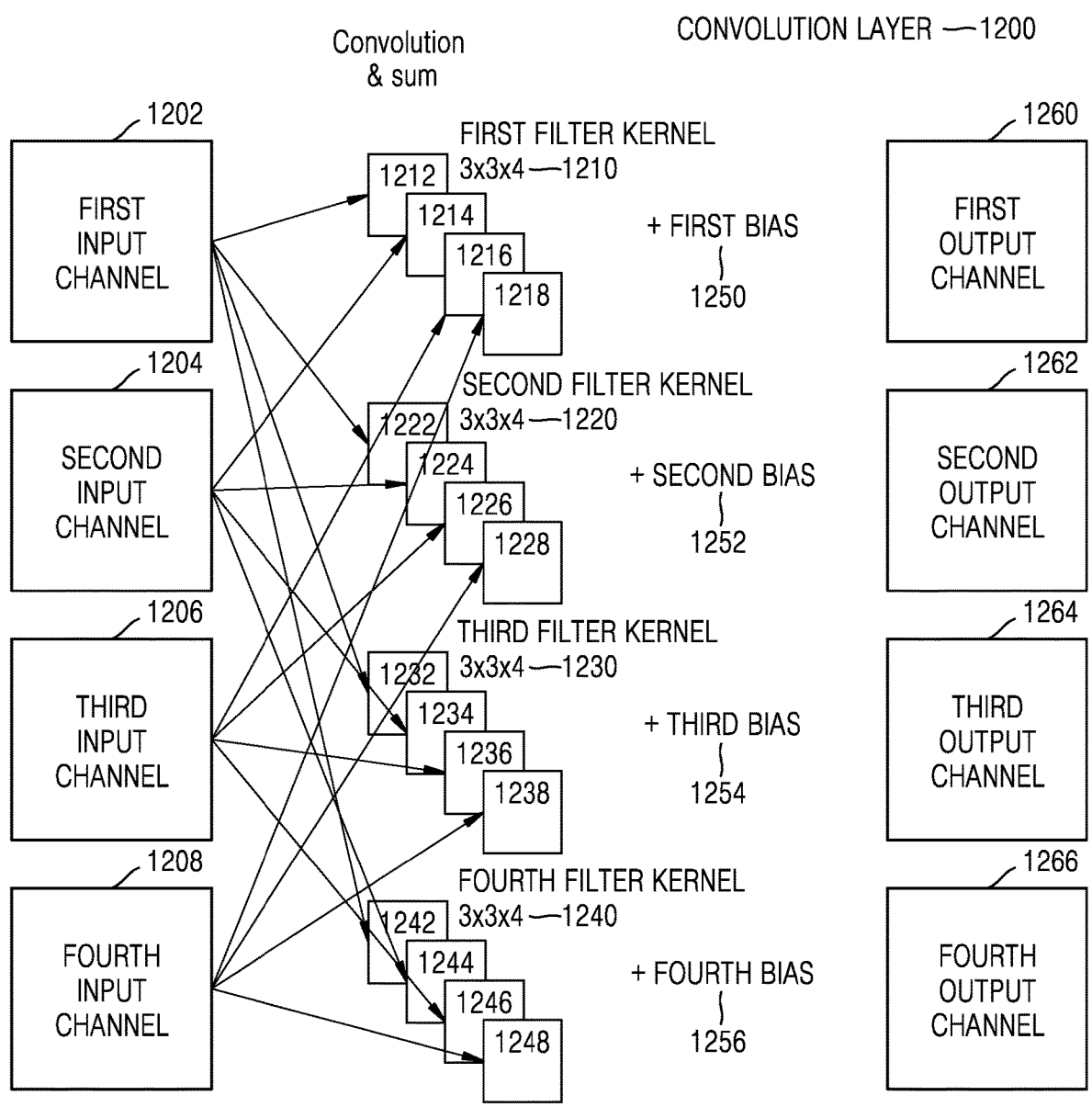
FIG. 12 illustrates a structure of a convolution layer according to an embodiment.
Figure 13:
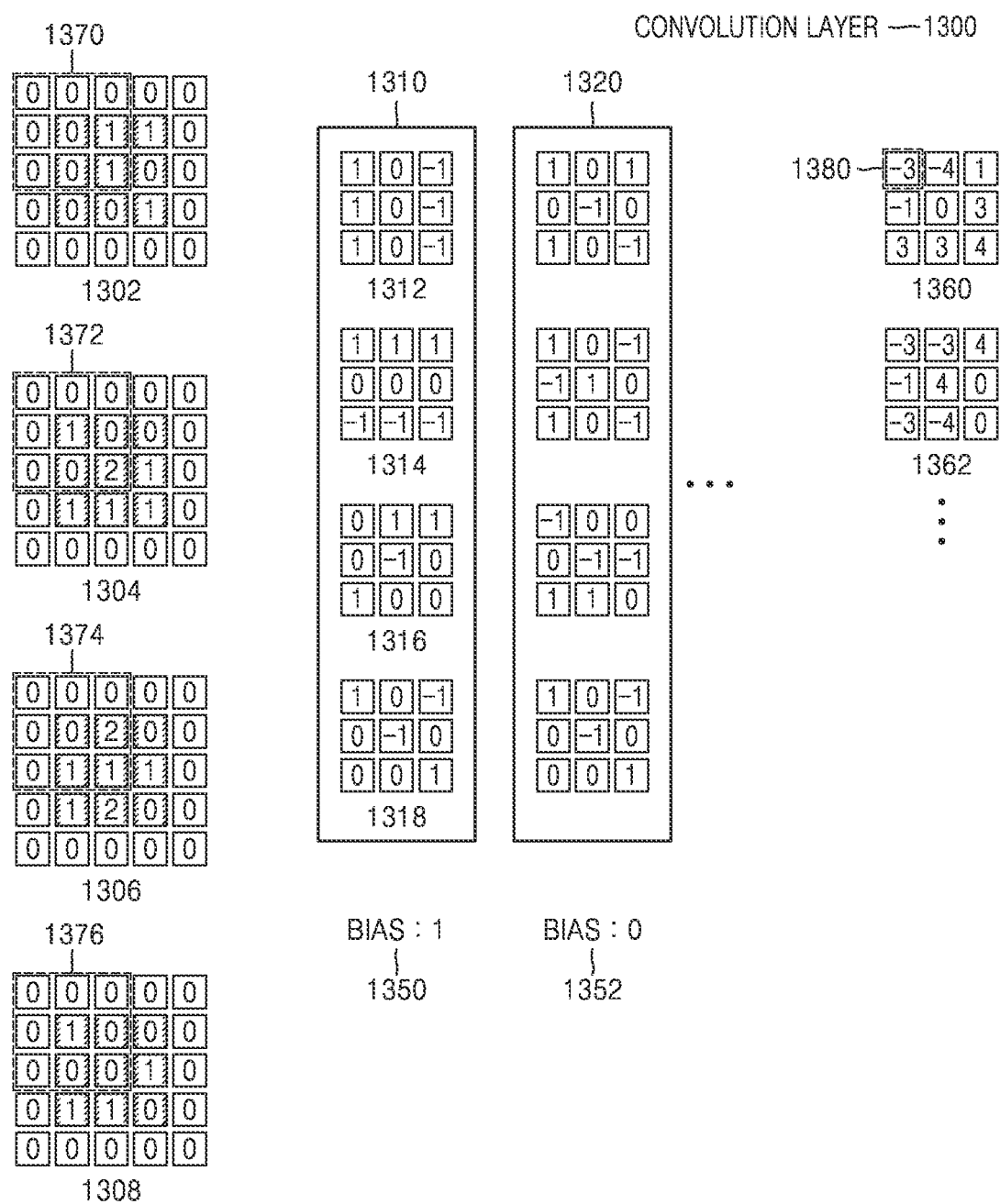
FIG. 13 illustrates weights and biases of a first filter kernel and a second filter kernel in the convolution layer of FIG. 12, according to an embodiment.

FIGS. 12 and 13 illustrate convolution layers 1200, 1300 according to an embodiment of the disclosure. A structure of the convolution layer 1200 and DNN setting information regarding parameters according to the embodiment of the disclosure are now described with reference to FIGS. 12 and 13. The convolution layers 310, 330, 350 of the second DNN 300 of FIG. 3 and the convolution layers 710, 730, 750 of the first DNN 700 of FIG. 8 may be determined according to the structure of the convolutional layer 1200 described with reference to FIGS. 12 and 13.

FIG. 12 illustrates the structure of the convolution layer 1200 according to an embodiment of the disclosure.

The convolution layer 1200 is composed of one or more filter kernels. Each filter kernel includes parameters used to generate elements for an output channel from elements for a corresponding input channel. The parameters of the filter kernel include weights and a bias.

Weights of a filter kernel are parameters necessary for calculating a weighted sum of elements for an input channel. For example, F1 through F9 in the filter kernel 430 of FIG. 4 are weights of the filter kernel 430. I1, I2, I3, I8, I9, I10, I15, I16, and I17 in the second image 135 are elements for an input channel. M1 in the feature map 450 for an output channel may be determined as a weighted sum of I1, I2, I3, I8, I9, I10, I15, I16, and I17 in the second image 135 based on the weights F1 through F9 of the filter kernel 430.

A bias of a filter kernel is a parameter for adjusting an element output to an output channel. Each element for the output channel may be determined by adding a bias to a weighted sum of elements for an input channel determined according to weights of the filter kernel. For example, M1 in the feature map 450 that is an element for the output channel may be determined by adding a bias to the weighted sum of I1, I2, I3, I8, I9, I10, I15, I16, and I17 in the second image 135.

Like the second convolution layer 330 of FIG. 3, the convolution layer 1200 may respectively output, to four output channels, i.e., first through fourth output channels 1260, 1262, 1264, and 1266, values obtained by filtering elements received from four input channels, i.e., first through fourth input channels 1202, 1204, 1206, and 1208, with four filter kernels, i.e., first through fourth filter kernels 1210, 1220, 1230, and 1240.

The first filter kernel 1210 may include a three-dimensional (3D) weight matrix and a first bias 1250. For example, a size of the 3D weight matrix of the first filter kernel 1210 may be expressed as 3×3×4. The label 3×3×4 respectively represent rows, columns, and a depth of the filter kernel 1210. According to an embodiment of the disclosure, sizes of 3D weight matrices of the first through fourth filter kernels 1210, 1220, 1230, and 1240 may be determined differently. For convenience of description, FIG. 12 shows that the 3D weight matrix of the first filter kernel 1210 includes four two-dimensional (2D) weight matrices having a size of 3×3. Similarly, FIG. 12 also shows that a 3D weight matrix of each of the second through fourth filter kernels 1220, 1230, and 1240 includes four 2D weight matrices having a size of 3×3.

A 2D weight matrix 1212 of a first depth of the first filter kernel 1210 is used to filter elements for the first input channel 1202. In addition, 2D weight matrices 1214, 1216, and 1218 of second through fourth depths of the first filter kernel 1210 are respectively used to filter elements for the second through fourth input channels 1204, 1206, and 1208.

Similarly, 2D weight matrices 1222, 1224, 1226, and 1228 of depths of the second filter kernel 1220 are respectively used to filter the elements for the first through fourth input channels 1202, 1204, 1206, and 1208. Furthermore, 2D weight matrices 1232, 1234, 1236, and 1238 of depths of the third filter kernel 1230 are respectively used to filter the elements for the first through fourth input channels 1202, 1204, 1206, and 1208. In addition, 2D weight matrices 1242, 1244, 1246, and 1248 of depths of the fourth filter kernel 1240 are respectively used to filter the elements for the first through fourth input channels 1202, 1204, 1206, and 1208.

The first filter kernel 1210 includes the first bias 1250. Likewise, the second through fourth filter kernels 1220, 1230, and 1240 respectively include second through fourth biases 1252, 1254, and 1256. The first through fourth biases 1250, 1252, 1254, and 1256 are used to adjust elements for the first through fourth output channels 1260, 1262, 1264, and 1266.

A first weighted sum of the elements for the first input channel 1202 is determined according to weights in the 2D weight matrix 1212 of the first depth of the first filter kernel 1210. A second weighted sum of the elements for the second input channel 1204 is determined according to weights in the 2D weight matrix 1214 of the second depth of the first filter kernel 1210. Furthermore, a third weighted sum of the elements for the third input channel 1206 is determined according to weights in the 2D weight matrix 1216 of the third depth of the first filter kernel 1210. A fourth weighted sum of the elements for the first input channel 1202 is determined according to weights in the 2D weight matrix 1218 of the fourth depth of the first filter kernel 1210. In addition, an element for the first output channel 1260 may be determined by adding the first bias 1250 to a sum of the first through fourth weighted sums.

Similarly to the above-described method of determining the element for the first output channel 1260, elements for the second through fourth output channels 1262, 1264, and 1266 may be determined. In detail, an element for the second output channel 1262 may be determined by filtering the elements for the first through fourth input channels 1202, 1204, 1206, and 1208 according to the four 2D weight matrices 1222, 1224, 1226, and 1228 of the second filter kernel 1220 and the second bias 1252. Similarly, an element for the third output channel 1264 may be determined by filtering the elements for the first through fourth input channels 1202, 1204, 1206, and 1208 according to the four 2D weight matrices 1232, 1234, 1236, and 1238 of the third filter kernel 1230 and the third bias 1254. In addition, an element for the fourth output channel 1266 may be determined by filtering the elements for the first through fourth input channels 1202, 1204, 1206, and 1208 according to the four 2D weight matrices 1242, 1244, 1246, and 1248 of the fourth filter kernel 1240 and the fourth bias 1256.

Although it has been described with reference to FIG. 12 that convolution layer 1200 has the four input channels, i.e., the first through fourth input channels 1202, 1204, 1206, and 1208, the number of input channels may be configured differently according to an embodiment. Furthermore, while it has been described with reference to FIG. 12 that the convolution layer 1200 has the four output channels, i.e., the first through fourth output channels 1260, 1262, 1264, and 1266, the number of output channels may be configured differently according to an embodiment of the disclosure. The number of filter kernels included in the convolution layer 1200 is determined depending on the number of output channels. In addition, while FIG. 12 shows that first through fourth filter kernels 1210, 1220, 1230, and 1240 each has a size of 3×3 (3 rows and 3 columns) for convenience, the number of rows and columns in each of the first through fourth filter kernels 1210, 1220, 1230, and 1240 may be set or arranged differently according to an embodiment of the disclosure.

FIG. 13 illustrates weights and biases for the first and second filter kernels 1210 and 1220 in the convolution layer 1200 of FIG. 12, according to an embodiment of the disclosure. Thus, in addition to the description of the filter kernel 430 of FIG. 4, functions of a filter kernel are now described with reference to FIG. 13. Reference numbers 12XX of FIG. 12 correspond to reference numbers 13XX of FIG. 13. A part of reference numbers in FIG. 13 may not correspond to any reference numbers of FIG. 12.

For convenience description, FIG. 13 shows only the weights and biases for the first and second filter kernels 1310 and 1320. However, like the first and second filter kernels 1310 and 1320, the third and fourth filter kernels may each include weights and a bias.

Referring to FIG. 13, a size of a 2D data array for each of the first through fourth input channels 1302, 1304, 1306 and 1308 is 3×3. Furthermore, a size of a 2D data array for each of the first and second output channels 1360 and 1362 is 3×3. Although FIG. 13 shows a size of a 2D data array for each input channel or each output channel is 3×3 for convenience, the size of a 2D data array for each of the first through fourth input channels 1302, 1304, 1306 and 1308 and for each of the first and second output channels 1360 and 1362 may be configured differently according to an embodiment of the disclosure.

As shown in FIG. 13, padding such as zero padding or mirror padding may be performed on top, bottom, right, and left sides of a 2D data array for each of the first through fourth input channels 1302, 1304, 1306 and 1308. Zero padding refers to a process of adding an element with a value of 0 to a 2D data array. Mirror padding is a process of adding an element with the same value as an element located in a boundary of a 2D data array to the 2D data array. Referring to FIG. 13, zero padding may be performed on a 2D data array for each of the first through fourth input channels 1302, 1304, 1306 and 1308 to generate a 2D data array having a size of 5×5.

A top-left element 1380 in the 2D data array for the first output channel 1360 is determined by filtering 2D data arrays 1370, 1372, 1374, and 1376 of a size 3×3 respectively at top-left corners of zero-padded 2D data arrays of a size 5×5 for the first through fourth input channels 1302, 1304, 1306, and 1308. A position of each element in the 2D data array for the first output channel 1260 (shown in FIG. 12) correspond to positions of the 2D data arrays 1370, 1372, 1374, and 1376 corresponding to the element. Accordingly, the positions of the 2D data arrays 1370, 1372, 1374, and 1376 corresponding to the top-left element 1380 are determined depending on the position of the top-left element 1380 in the 2D data array for the first output channel 1260 (shown in FIG. 12).

Elements [0, 0, 0; 0, 0, 1; 0, 0, 1] in the 2D data array 1370 are multiplied element-wise by elements [1, 0, −1; 1, 0, −1; 1, 0, −1] of the 2D weight matrix 1312 of the first depth of the first filter kernel 1310. Then, −2, which is the sum of all the element-wise products is determined as a value obtained by filtering the 2D data array 1370. (0×1+0×0+0×(−1)+0×1+0×0+1×(−1)+0×1+0×0+1×(−1)=−2).

According to the above-described filtering method, a value obtained by filtering the 2D data array 1372 with the 2D weight matrix 1314 of the second depth of the first filter kernel 1310 is determined to be −2. Similarly, a value obtained by filtering the 2D data array 1374 according to the 2D weight matrix 1316 of the third depth of the first filter kernel 1310 is determined to be 0. Then, a value obtained by filtering the 2D data array 1376 according to the 2D weight matrix 1318 of the fourth depth of the first filter kernel 1310 is determined to be −1.

Finally, −4, which is a result obtained by adding the first bias 1350 to the sum of all the values obtained by filtering the 2D data arrays 1370, 1372, 1374, and 1376, is determined as a value of the top-left element 1380 for the first output channel 1360 ((−2)+(−2)+0+(−1)+1=−4). Values of the remaining elements in the 2D data array for the first output channel 1360 are then determined in the same manner as the value of the top-left element 1380. Furthermore, elements of a 2D data array for the second output channel 1362 are determined in the same manner as the elements of the 2D data array for the first output channel 1360.

To improve the performance of AI up-scaling, a DNN including the convolution layer 1200 described above with reference to FIGS. 12 and 13 may be optimized according to image characteristics, a state of a network, selection of a content provider, etc. Accordingly, the number of convolutional layers included in the DNN and a structure and parameters of each convolutional layer in the DNN may be determined differently according to the image characteristics, state of the network, selection of the content provider, etc.

The structure and parameters of the convolution layer 1200 described with reference to FIGS. 12 and 13 may be applied to the first through third convolution layers 310, 330 and 350 in the second DNN 300 of FIG. 3 and the first through third convolution layers 710, 730, and 750 in the first DNN 700 of FIG. 8.

A structure of AI encoding data including image data 1400 and AI data 1440 is now described with reference to FIGS. 14 through 16.

Figure 14:
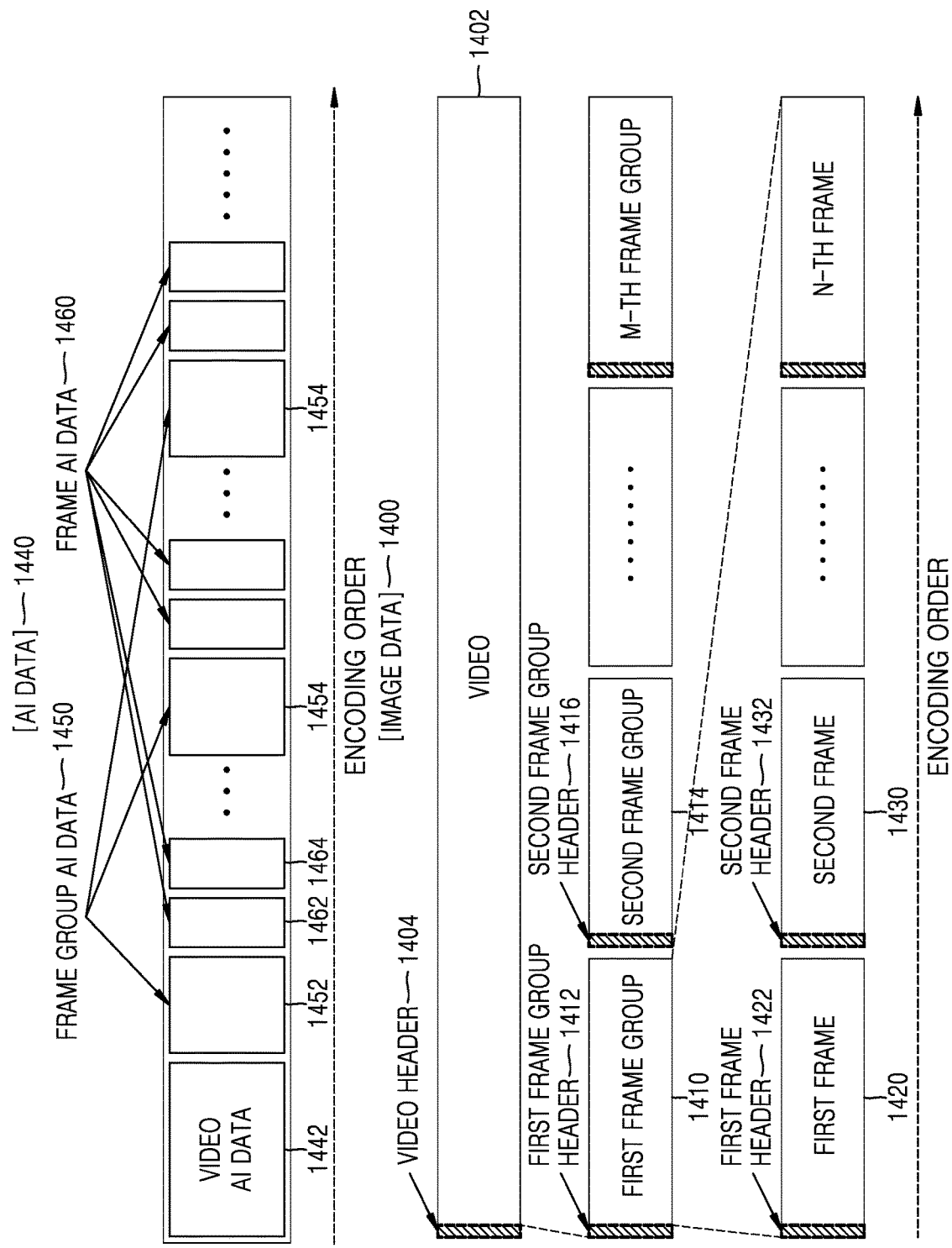
FIG. 14 illustrates structures of image data and AI data and a corresponding relationship between the image data and the AI data according to an embodiment.

FIG. 14 illustrates structures of the image data 1400 and the AI data 1440 together with a corresponding relationship between the image data 1400 and the AI data 1440.

A video-frame group-frame hierarchical structure of image data 1400 is described with reference to FIG. 14. A video 1402 of FIG. 14 is a data unit including all consecutive frames of the image data 1400. Parameter information of a video parameter set may be applied to all frames in the video 1402. The video parameter set is included in a video header 1404.

The video 1402 may include a plurality of frame groups (or coded video sequences). A frame group is a data unit composed of one or more consecutive frames that share parameter information of a frame group parameter set (or sequence parameter set). The frame group parameter set may be included in a frame group header. For example, a frame group parameter set of a first frame group 1410 may be included in a first frame group header 1412. In addition, a frame group parameter set of a second frame group 1414 may be included in a second frame group header 1416.

Each frame group may be independently encoded without being referenced to other frame groups. Each frame group includes an instantaneous decoding refresh (IDR) frame or an intra random access point (I RAP) frame encoded without being referenced to other frames. All the remaining frames in the frame group are encoded with reference to the IDR frame (or IRAP frame). Thus, the first frame group 1410 is independently encoded without being referenced to other frame groups in the video 1402. A first frame 1420, which is a first encoded frame in the first frame group 1410, is an IDR frame (or IRAP frame). All the remaining frames in the first frame group 1410 including the second frame 1430 are encoded with reference to the first frame 1420.

Each frame represents one still image included in a video. A frame header of a frame may include a frame parameter set including parameter information applied to the frame. For example, a first frame header 1422 of the first frame 1420 may include a frame parameter set applied to the first frame 1420. Similarly, a second frame header 1432 of the second frame 1430 may include a frame parameter set applied to the second frame 1430.

A method of classifying AI data 1440 according to the above-described video-frame group-frame hierarchical structure is described with reference to FIG. 14. The AI data 1440 may be classified into video AI data 1442, frame group AI data 1450, and frame AI data 1460 according to the type of a data unit to which the AI data 1440 is applied. The video AI data 1442 refers to AI data applied to a video, and the frame group AI data 1450 refers to AI data applied to a frame group. In addition, the frame AI data 1460 refers to AI data applied to a frame.

The video AI data 1442 corresponds to the video header 1404. Thus, the video AI data 1442 may be decoded in parallel with the video header 1404. In addition, the video AI data 1442 may be decoded before decoding of the video header 1404. Alternatively, the video AI data 1442 may be decoded after decoding of the video header 1404.

The frame group AI data 1450 corresponds to a frame group header. Referring to FIG. 14, first frame group AI data 1452 corresponds to the first frame group header 1412. Furthermore, second frame group AI data 1454 corresponds to the second frame group header 1416. The first frame group AI data 1452 and the second frame group AI data 1454 may be respectively decoded in parallel with the first and second frame group headers 1412 and 1416. Alternatively, for example, the first frame group AI data 1452 and the second frame group AI data 1454 may be respectively decoded immediately before decoding of the first and second frame group headers 1412 and 1416. Alternatively, the first frame group AI data 1452 and the second frame group AI data 1454 may be respectively decoded immediately after decoding of the first and second frame group headers 1412 and 1416.

The frame AI data 1460 corresponds to a frame header. Referring to FIG. 14, first frame AI data 1462 corresponds to the first frame header 1422. Furthermore, second frame AI data 1464 corresponds to the second frame header 1432. The first frame AI data 1462 and the second frame AI data 1464 may be respectively decoded in parallel with the first and second frame headers 1422 and 1432. Alternatively, for example, the first frame AI data 1462 and the second frame AI data 1464 may be respectively decoded immediately before decoding of the first and second frame headers 1422 and 1432. Alternatively, the first frame AI data 1462 and the second frame AI data 1464 may be respectively decoded immediately after decoding of the first and second frame headers 1422 and 1432.

According to an embodiment of the disclosure, the data processor 632 of FIG. 7 may generate a file corresponding to the image data 1400 separately from a file corresponding to the AI data 1440. Thus, the communicator 634 transmits AI encoding data to the communicator 212 of FIG. 2 as two separate files. Thus, the communicator 634 may transmit the file corresponding to the image data 1400 and the file corresponding to the AI data 1440 via different communication channels. The communicator 634 may also sequentially transmit the file corresponding to the image data 1400 and the file corresponding to the AI data 1440 at different times. In the disclosure, a file refers to a collection of data stored in a memory. A video file is a collection of image data stored in the memory and the image data may be implemented in the form of a bitstream.

In the above-described embodiment of the disclosure, according to the corresponding relationship between the image data 1400 and the AI data 1440 described with reference to FIG. 14, the file corresponding to the AI data 1440 may be decoded according to a process of decoding the file corresponding to the image data 1400. Furthermore, because the file (or bitstream) corresponding to the image data 1400 is separated from the file corresponding to the AI data 1440, the file corresponding to the image data 1400 and the file corresponding to the AI data 1440 may each include information about synchronization of the two files.

According to an embodiment of the disclosure, the data processor 632 of FIG. 7 may generate AI encoding data as a single file including both the image data 1400 and the AI data 1440. The communicator 634 transmits the AI encoding data as the single file to the communicator 212 in FIG. 2.

According to an embodiment of the disclosure, the AI data 1440 may not be embedded in the image data 1400, but separated from the image data 1400. Thus, because the AI encoding data is configured as a single file but the AI data 1440 is separated from the image data 1400, the AI data 1440 and/or the image data 1400 may contain information about synchronization of the AI data 1440 and the image data 1400. Alternatively, the second DNN 300 required for AI up-scaling may be determined according to the AI data 1440 and then the image data 1400 may be decoded.

Alternatively, the AI data 1440 may be embedded in the image data 1400. For example, the video AI data 1442 may be embedded in the video header 1404. In this case, the video header 1404 may include the video AI data 1442 together with the video parameter set. Alternatively, the video AI data 1442 may be embedded in the single file to be placed before or after the video header 1404 independently of the video header 1404. Thus, decoding of the video AI data 1442 may be performed simultaneously with, immediately before, or immediately after decoding of the video header 1404.

Similarly, the first frame group header 1412 may include the first frame group AI data 1452 together with the frame group parameter set. Alternatively, the first frame group AI data 1452 may be embedded in the single file to be placed before or after the first frame group header 1412, independently of the first frame group header 1412. Thus, decoding of the first frame group AI data 1452 may be performed simultaneously with, before or after decoding of the first frame group header 1412.

Similarly, the first frame header 1422 may include the first frame AI data 1462 together with the frame parameter set. Alternatively, the first frame AI data 1462 may be embedded in the single file to be placed before or after the first frame header 1422, independently from the first frame header 1422. Thus, decoding of the first frame AI data 1462 may be performed simultaneously with, before, or after decoding of the first frame header 1422.

Figure 15:
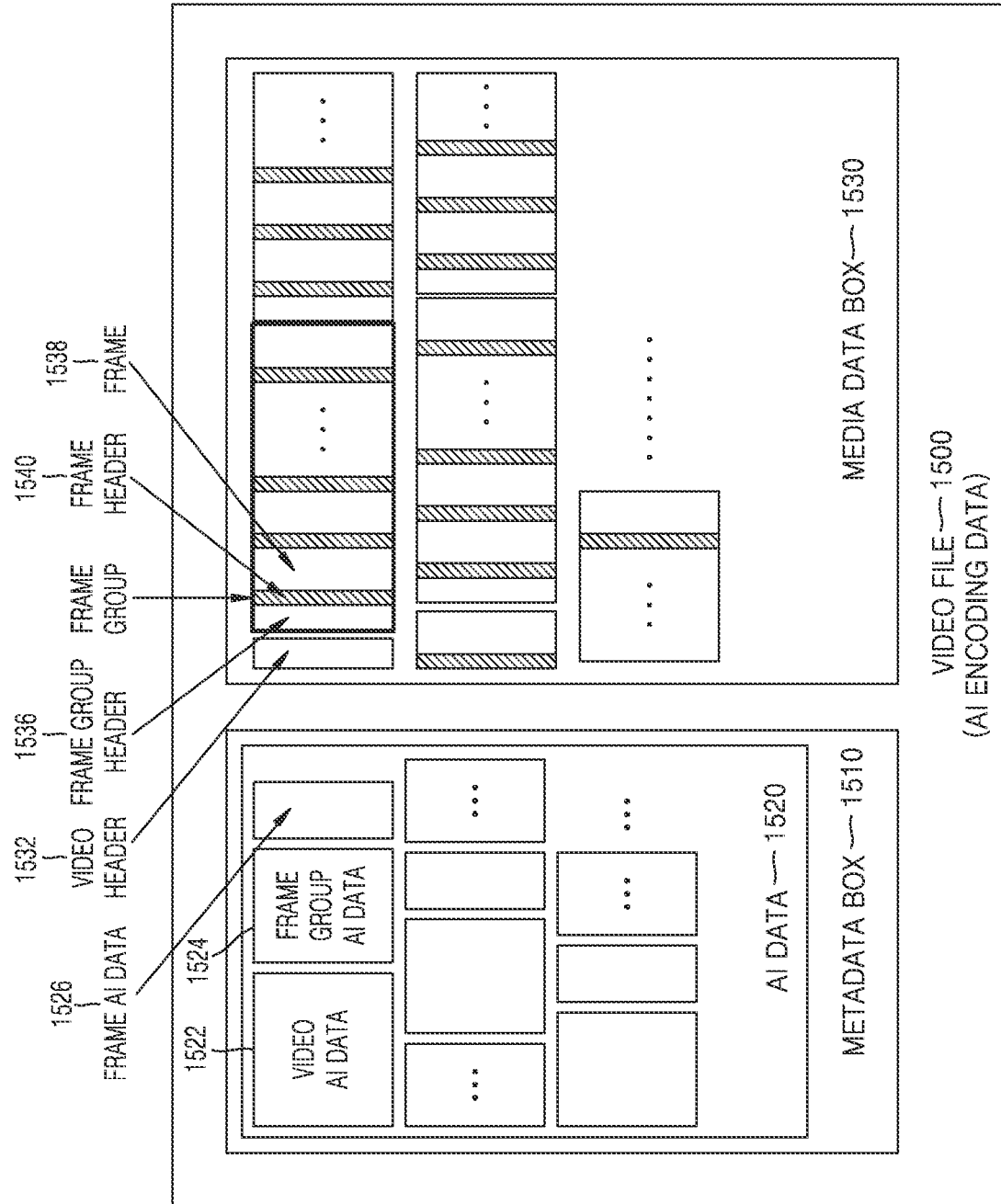
FIG. 15 illustrates AI encoding data of a case where AI data and image data are separated from each other in a single file, according to an embodiment.

FIG. 15 illustrates AI encoding data when AI data 1520 is separated from image data within a single file, according to an embodiment of the disclosure. As shown in FIG. 15, the AI encoding data 1500 is included in a video file 1500 in a predefined container format. The predefined container format may be MP4, Audio Video Interlaced (AVI), Matroska (MKV), Flash Video (FLV), or the like.

The video file 1500 includes a metadata box 1510 and a media data box 1530. The metadata box 1510 includes information about media data included in the media data box 1530. For example, the metadata box 1510 may include pieces of information about a type of media data, a type of a codec used to encode the media data, and a playback time for a media.

The metadata box 1510 may include the AI data 1520. The AI data 1520 is encoded according to an encoding method provided in the predefined container format and then stored in the metadata box 1510. The AI data 1520 stored in the metadata box 1510 may be configured independently of the image data.

The AI data 1520 includes video AI data 1522, frame group AI data 1524, and frame AI data 1526. The video AI data 1522, the frame group AI data 1524, and the frame AI data 1526 are respectively set to correspond to a video header 1532, a frame group header 1536, and a frame header 1540.

The AI data 1520 in the metadata box 1510 may be decoded before the image data in the media data box 1530. Thus, the second DNN 300 required for AI up-scaling may be determined according to the AI data 1520 before decoding the image data. The second DNN 300 may be determined for the entire video, i.e., all of the plurality of frames in the video. Alternatively, for adaptive AI up-scaling on a per-frame group basis, the second DNN 300 may be determined differently for each frame group. Alternatively, for adaptive AI up-scaling on a per-frame basis, the second DNN 300 may be determined differently for each frame.

The AI data 1520 in the metadata box 1510 may be decoded together with the image data in the media data box 1530. Decoding of the video AI data 1522 may be performed immediately before or after decoding of the video header 1532. Alternatively, the video AI data 1522 may be decoded in parallel with the video header 1532. Similarly, decoding of the frame group AI data 1524 may be performed immediately before or after decoding of the frame group header 1536. Alternatively, the frame group AI data 1524 may be decoded in parallel with the frame group header 1536. Furthermore, decoding of the frame AI data 1526 may be performed immediately before or after decoding of the frame header 1540. Alternatively, the frame AI data 1526 may be decoded in parallel with the frame header 1540.

While FIG. 15 shows that the video file 1500 includes one metadata box 1510 and one media data box 1530 for convenience of description, the video file 1500 may include two or more metadata boxes 1510 and two or more media data boxes. In this case, two or more image data segments (or frames 1538) obtained by dividing the image data in units at a preset time interval may be stored in the two or more media data boxes. Furthermore, pieces of information about the two or more image data segments stored in the two or more media data boxes may be respectively included in the two or more metadata boxes. In addition, the two or more metadata boxes may each include AI data.

Although it has been described with reference to FIG. 15 that the AI data 1520 is included in the metadata box 1510, according to an embodiment of the disclosure, the AI data 1520 may be included in the media data box 1530. In this case, the AI data 1520 may be configured independently of the image data within the media data box 1530.

Figure 16:
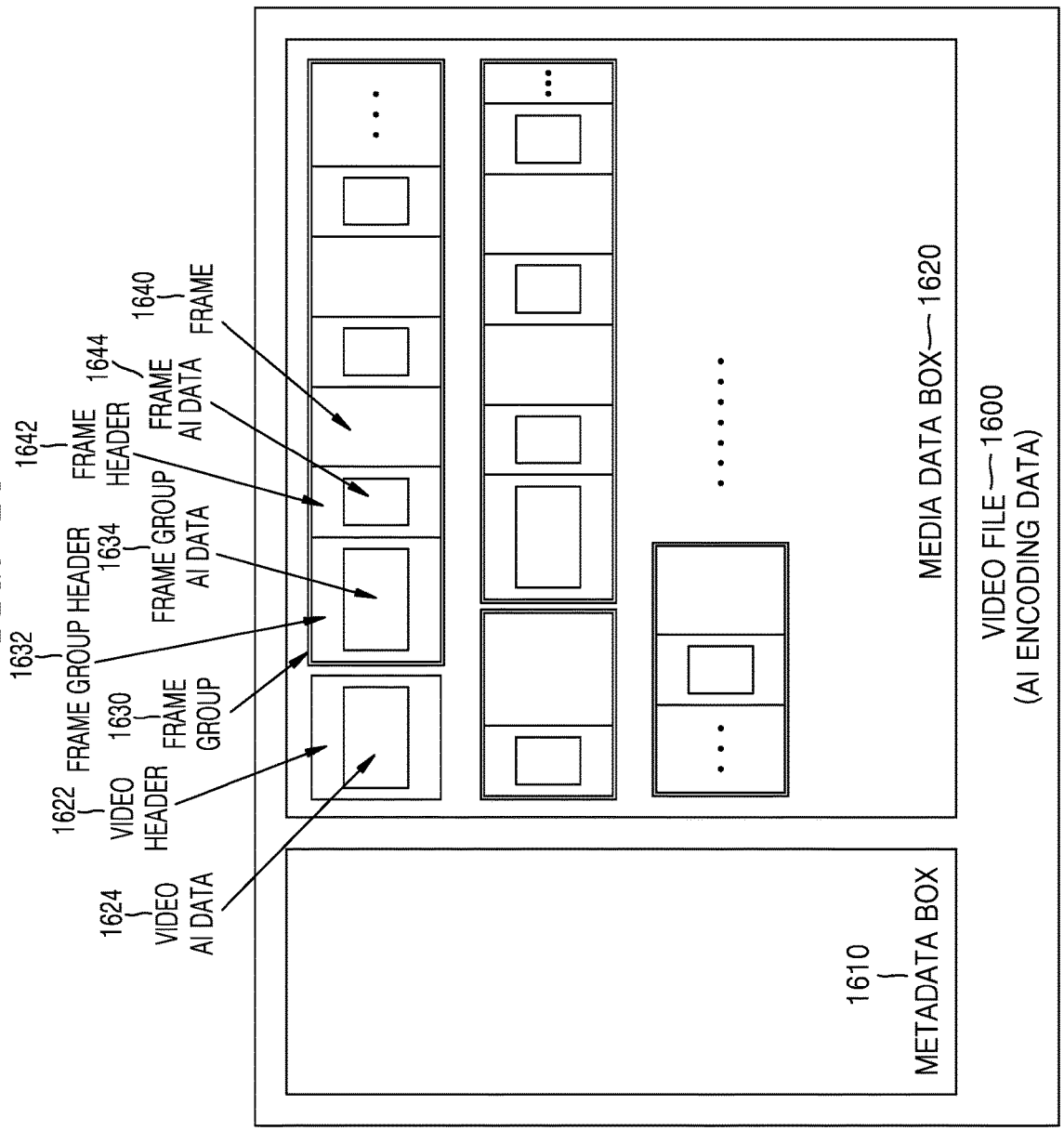
FIG. 16 illustrates AI encoding data of a case where AI data is embedded in image data in a single file, according to an embodiment.

FIG. 16 illustrates AI encoding data of a case where AI data is embedded in image data in a single file, according to an embodiment of the disclosure.

A video file 1600 includes a metadata box 1610 and a media data box 1620. Because AI data is embedded in image data, the metadata box 1610 does not include the AI data. The media data box 1620 instead includes the image data having the AI data embedded therein. AI data may be encoded according to a video codec for image data. Examples of video codec for the image data may include H.264, HEVC, AVS2.0, XviD, etc.

Referring to FIG. 16, video AI data 1624 may be included in a video header 1622. Accordingly, the video AI data 1624 may be decoded together with video parameters included in the video header 1622. Furthermore, frame group AI data 1634 may be included in a frame group header 1632. The frame group AI data 1634 may be decoded together with frame group parameters included in the frame group header 1632. In addition, frame AI data 1644 may be included in a frame header 1642. The frame AI data 1644 may be decoded together with frame parameters included in the frame header 1642.

According to an embodiment of the disclosure, unlike in FIG. 16, the video AI data 1624 may be located before or after the video header 1622. In this case, the video AI data 1624 may be decoded before or after the video parameters included in the video header 1622 are decoded. Furthermore, the frame group AI data 1632 may be located before or after the frame group header 1634. Accordingly, the frame group AI data 1632 may be decoded before or after the frame group parameters included in the frame group header 1634 are decoded. In addition, the frame AI data 1644 may be located before or after the frame header 1642. Accordingly, the frame AI data 1644 may be decoded before or after the frame parameters included in the frame header 1642 are decoded. According to the embodiment of the disclosure, the video AI data 1624, the frame group AI data 1632, and the frame AI data 1644 are each in the form of a supplemental enhancement information (SEI) message and are respectively separated from the video header 1622, the frame group header 1634, and the frame header 1642.

FIG. 15 shows that the AI data 1520 is included only in the metadata box 1510, and FIG. 16 shows that the AI data is embedded in the image data included in the media data box 1620. However, according to an embodiment of the disclosure, a part of AI data may be included in the metadata box 1610 while the remaining part of the AI data may be included in the media data box 1620. For example, video AI data applied to the entire image data may be included in the metadata box 1610 while AI data applied to a frame group 1630 and a frame 1640 may be included in the media data box 1620. Furthermore, according to an embodiment of the disclosure, a part of AI data may not be included in the video file 1600 and may be separately transmitted.

A method of adaptively determining DNN setting information of the second DNN 300 used to perform AI up-scaling for a video, a frame group, and/or a frame is described with reference to FIGS. 17 through 30. Furthermore, a method of updating DNN setting information for a video, a frame group, and/or a frame to adaptively determine DNN setting information for the video, the frame group, and/or the frame is described. Therefore, the accuracy of AI up-scaling may be improved by applying updated DNN setting information adaptively determined for a current video, a current frame group, and/or a current frame instead of default DNN setting information preset based on training images.

Figure 17:
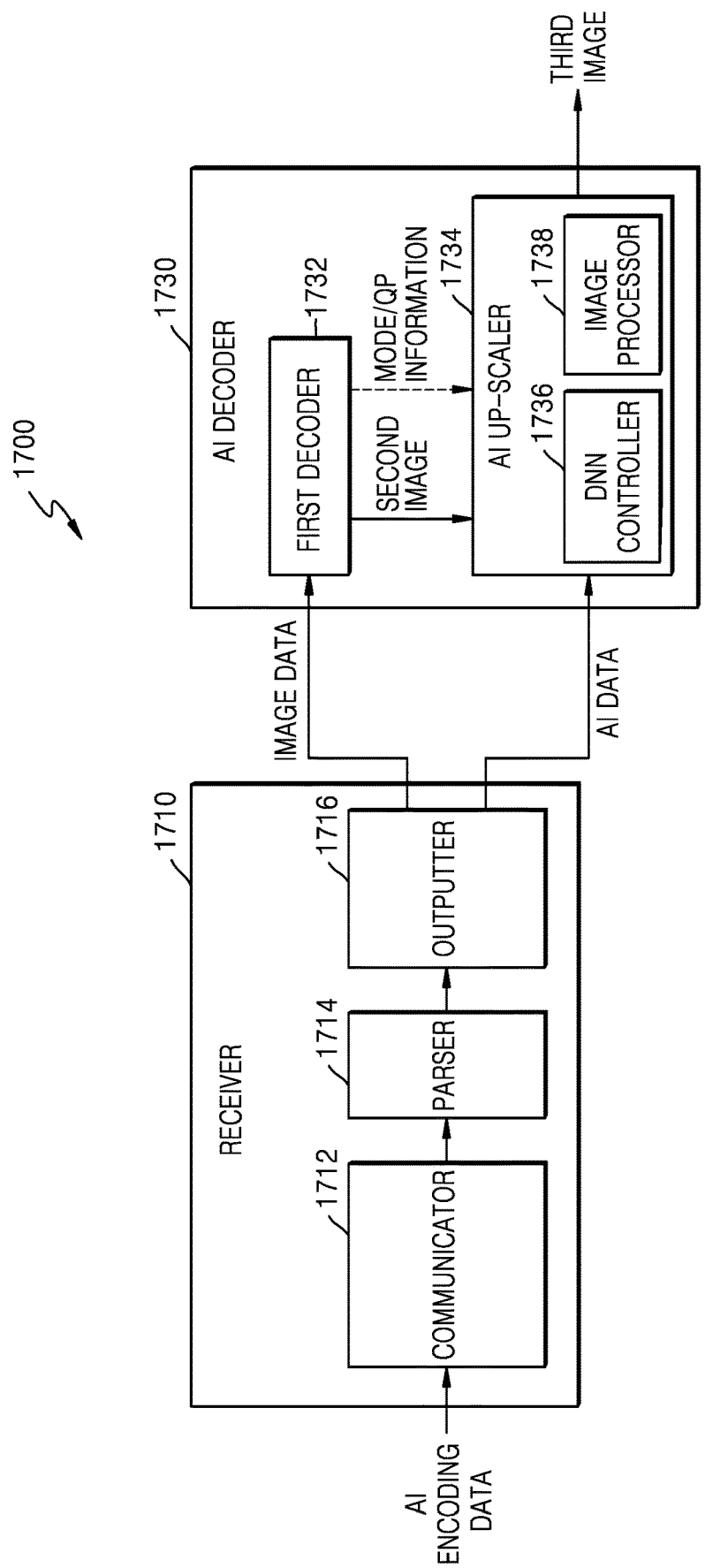
FIG. 17 is a block diagram of an AI decoding apparatus including an AI up-scaler with more detailed functions compared to that of the AI decoding apparatus of FIG. 2, according to an embodiment.

FIG. 17 is a block diagram of an AI decoding apparatus 1700 including an AI up-scaler 1734 with detailed functions compared to the AI up-scaler 234 of the AI decoding apparatus 200 of FIG. 2.

A communicator 1712, a parser 1714, and an outputter 1716 included in a receiver 1710 of the AI decoding apparatus 1700 may perform the functions of the communicator 212, the parser 214, and the outputter 216, respectively, included in the receiver 210 of the AI decoding apparatus 200. Furthermore, a first decoder 1732 and the AI up-scaler 1734 included in an AI decoder 1730 of the AI decoding apparatus 1700 may perform the functions of the first decoder 232 and the AI up-scaler 234, respectively, included in the AI decoder 230 of the AI decoding apparatus 200.

When image data and AI data are transmitted as separate files as shown in FIG. 14, the image data and the AI data are received by the communicator 1712. Then, the image data and the AI data are respectively transmitted to the first decoder 1732 and the AI up-scaler 1734 by the outputter 1716.

When image data and AI data are separated from each other within a single video file and transmitted as shown in FIG. 15, the video file including the image data and the AI data is received by the communicator 1712. Then, the image data and AI data are extracted from the video file by the parser 1714 and are respectively transmitted to the first decoder 1732 and the AI up-scaler 1734 by the outputter 1716.

When a video file including image data with AI data embedded therein is transmitted as shown in FIG. 16, the video file is received by the communicator 1712. The image data with the AI data embedded therein is then transmitted to the first decoder 1732 by the outputter 1716. In the process of decoding the image data, the AI data embedded in the image data is extracted by the first decoder 1732. The second image 135 obtained by decoding the image data is then transmitted to the AI up-scaler 1734.

The AI up-scaler 1734 included in the AI decoder 1730 of the AI decoding apparatus 1700 may include a DNN controller 1736 and an image processor 1738. The DNN controller 1736 may determine, based on the AI data, video DNN setting information applied to a video, frame group DNN setting information applied to a frame group, and frame DNN setting information applied to a frame.

The DNN controller 1736 may determine video DNN setting information, frame group DNN setting information, and frame DNN setting information based on one or more pieces of default DNN setting information that are preset. Furthermore, the DNN controller 1736 may set the second DNN 300 by using the video DNN setting information, the frame group DNN setting information, and/or the frame DNN setting information. The one or more pieces of default DNN setting information may be prestored in the AI up-scaler 1734.

Furthermore, the DNN controller 1736 may use, instead of default DNN setting information, updated DNN setting information generated according to DNN update information. Furthermore, the DNN controller 1736 may determine, based on the updated DNN setting information, video DNN setting information, frame group DNN setting information, and frame DNN setting information optimized according to image characteristics of a video, a frame group, and a frame.

The DNN update information may include information for generating DNN setting information optimized for a video, a frame group, or a frame. Furthermore, the updated DNN setting information may include DNN setting information generated according to the DNN update information. Furthermore, an updated DNN is a DNN set according to the updated DNN setting information.

Furthermore, the image processor 1738 may perform AI up-scaling on the second image 135 according to the second DNN 300 set by the DNN controller 1736.

The AI decoding apparatus 1700 may process AI encoding data transmitted in various forms as described with reference to FIGS. 14 through 16.

Hereinafter, a method, performed by the DNN controller 1736, of determining video DNN setting information, frame group DNN setting information, and/or frame DNN setting information will be described with reference to FIGS. 18 through 22.

Figure 18:
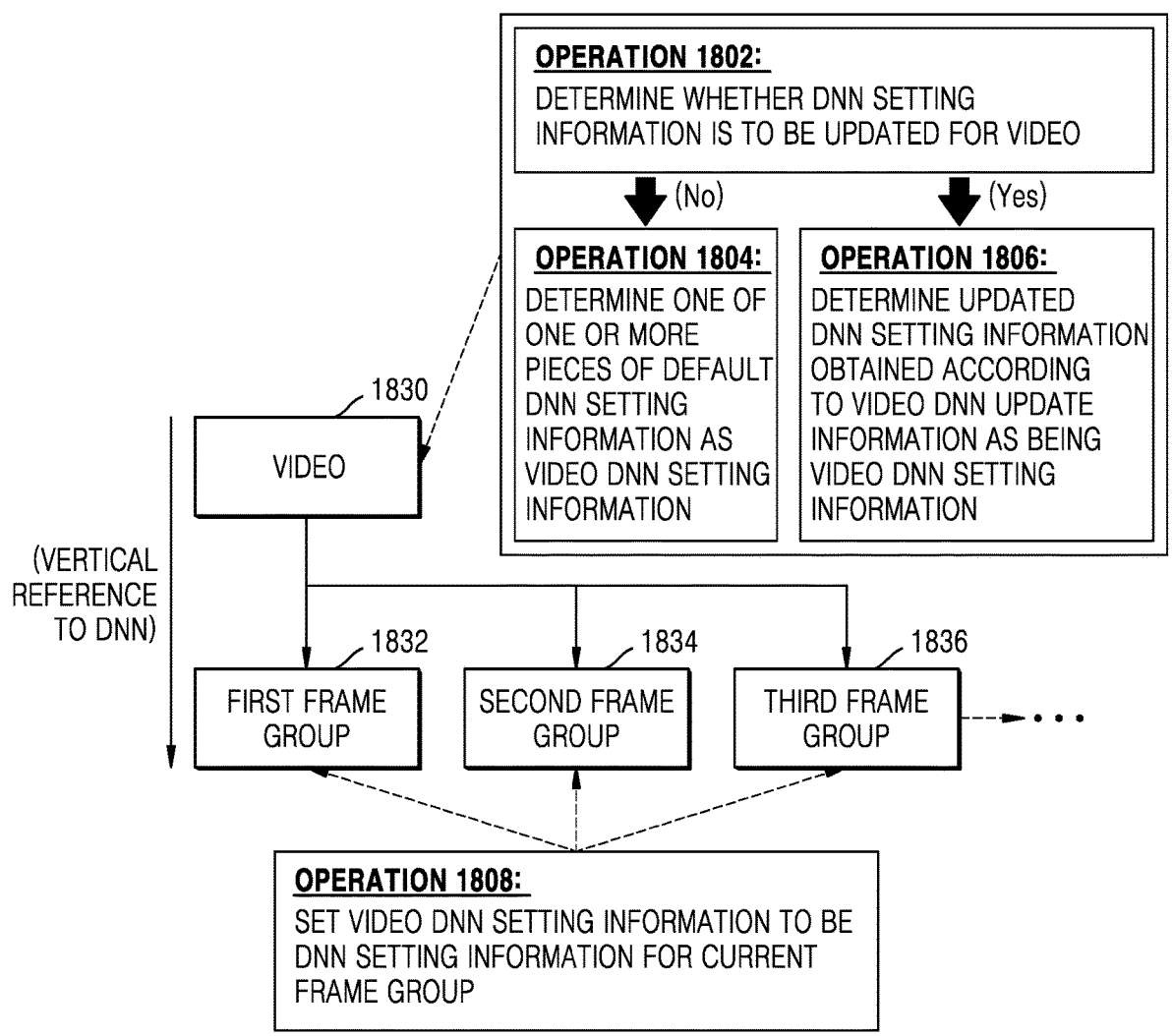
FIG. 18 illustrates a DNN setting information determination method for updating DNN setting information on a per-video basis, according to an embodiment.

FIG. 18 illustrates a DNN setting information determination method for updating DNN setting information on a per-video basis, according to an embodiment of the disclosure.

The DNN controller 1736 (shown in FIG. 17) determines whether DNN setting information is to be updated for a video 1830 (operation 1802). The DNN controller 1736 may determine whether the DNN setting information is to be updated according to video DNN update permission information. The video DNN update permission information indicates whether the DNN setting information for the video 1830 is updated.

When the DNN setting information is not updated for the video 1830 (operation 1802: No), the DNN controller 1736 determines video DNN setting information from among one or more pieces of default DNN setting information (operation 1804). The DNN controller 1736 may determine video DNN setting information from among one or more pieces of default DNN setting information according to video DNN index information. The video DNN index information indicates DNN setting information used for the video 1830 from among a plurality of pieces of candidate DNN setting information.

When the DNN setting information is updated for the video 1830 (operation 1802: Yes), the DNN controller 1736 determines updated DNN setting information generated according to video DNN update information as being video DNN setting information (operation 1806). The video DNN update information may include the number of layers related to an up-scaling DNN applied to the video 1830, the number of input channels and output channels, a size of a filter kernel, weights and a bias of a filter kernel, etc.

The DNN controller 1736 sets the video DNN setting information determined in operation 1804 or 1806 to be frame group DNN setting information for a first frame group 1832, a second frame group 1834, a third frame group 1836, and the like (operation 1808).

Figure 19:
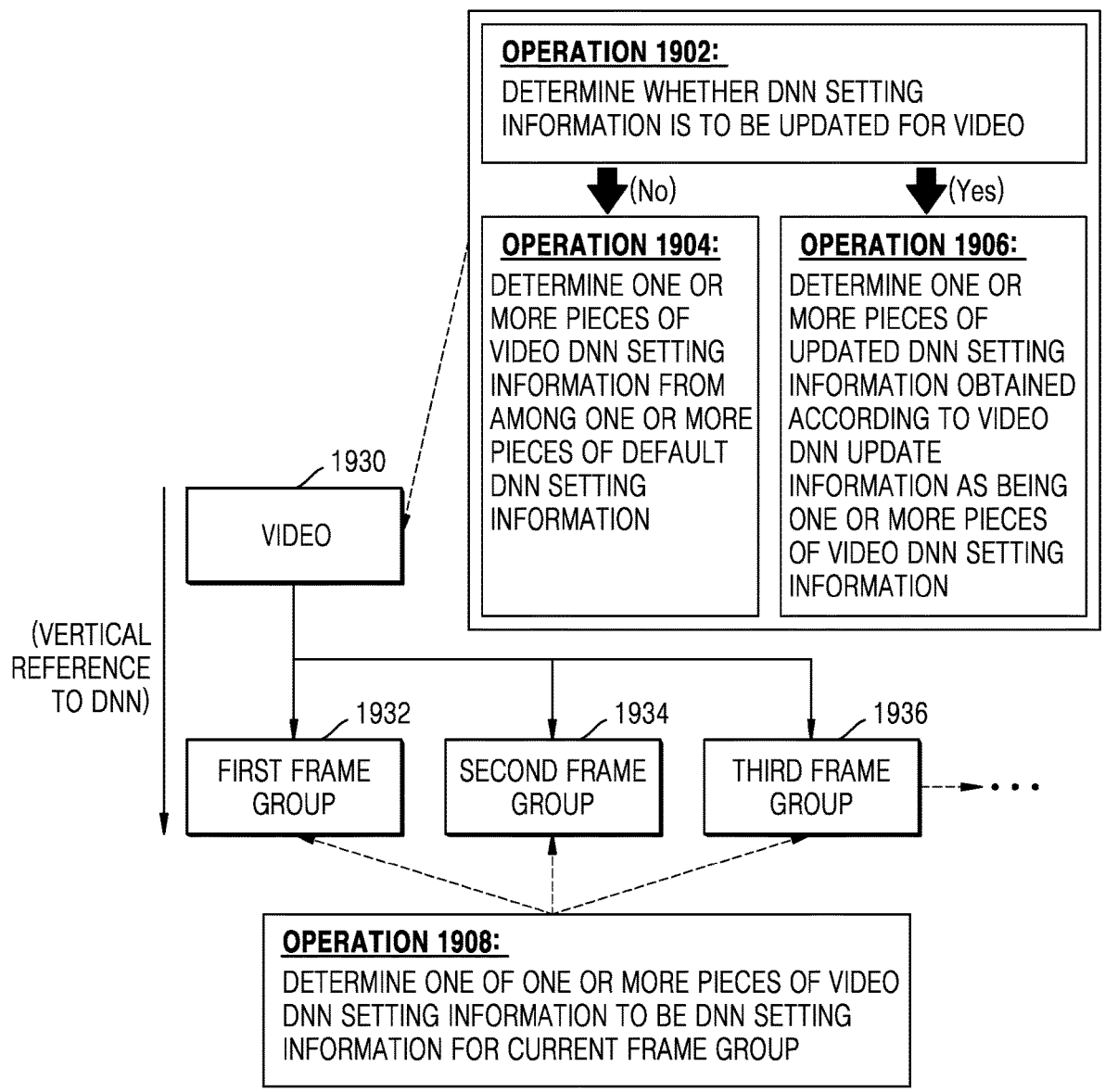
FIG. 19 illustrates a DNN setting information determination method for updating one or more pieces of DNN setting information on a per-video basis, according to an embodiment.

FIG. 19 illustrates a DNN setting information determination method for updating one or more pieces of DNN setting information on a per-video basis, according to an embodiment of the disclosure.

The DNN controller 1736 (shown in FIG. 17) determines whether DNN setting information is to be updated for a video 1930 (operation 1902). The DNN controller 1736 may determine whether the DNN setting information is to be updated according to video DNN update permission information.

When the DNN setting information is not updated for the video 1930 (operation 1902: No), the DNN controller 1736 determines one or more pieces of video DNN setting information from among one or more pieces of default DNN setting information (operation 1904). The DNN controller 1736 may determine, based on video DNN index information, one or more pieces of video DNN setting information from among one or more pieces of default DNN setting information.

When the DNN setting information is updated for the video 1930 (operation 1902: Yes), the DNN controller 1736 determines one or more pieces of updated DNN setting information generated according to video DNN update information as being one or more pieces of video DNN setting information (operation 1906).

The DNN controller 1736 determines one of the one or more pieces of video DNN setting information determined in operation 1904 or 1906 to be frame group DNN setting information for a current frame group (operation 1908).

The video 1930 consists of a plurality of frame groups including a first frame group 1932, a second frame group 1934, a third frame group 1936, etc. The current frame group is a frame group currently being decoded from among the frame groups included in the video 1930. Operation 1908 is performed for each of the frame groups. In other words, the DNN controller 1736 may independently select one piece of video DNN setting information for each frame group from among the one or more video DNN setting information. Thus, different pieces of video DNN setting information may be respectively selected for the first and second frame groups 1932 and 1934.

The DNN controller 1736 may select one from among the one or more pieces of video DNN setting information according to frame group DNN index information. The frame group DNN index information indicates DNN setting information used for a frame group from among a plurality of pieces of available candidate DNN setting information.

Figure 20:
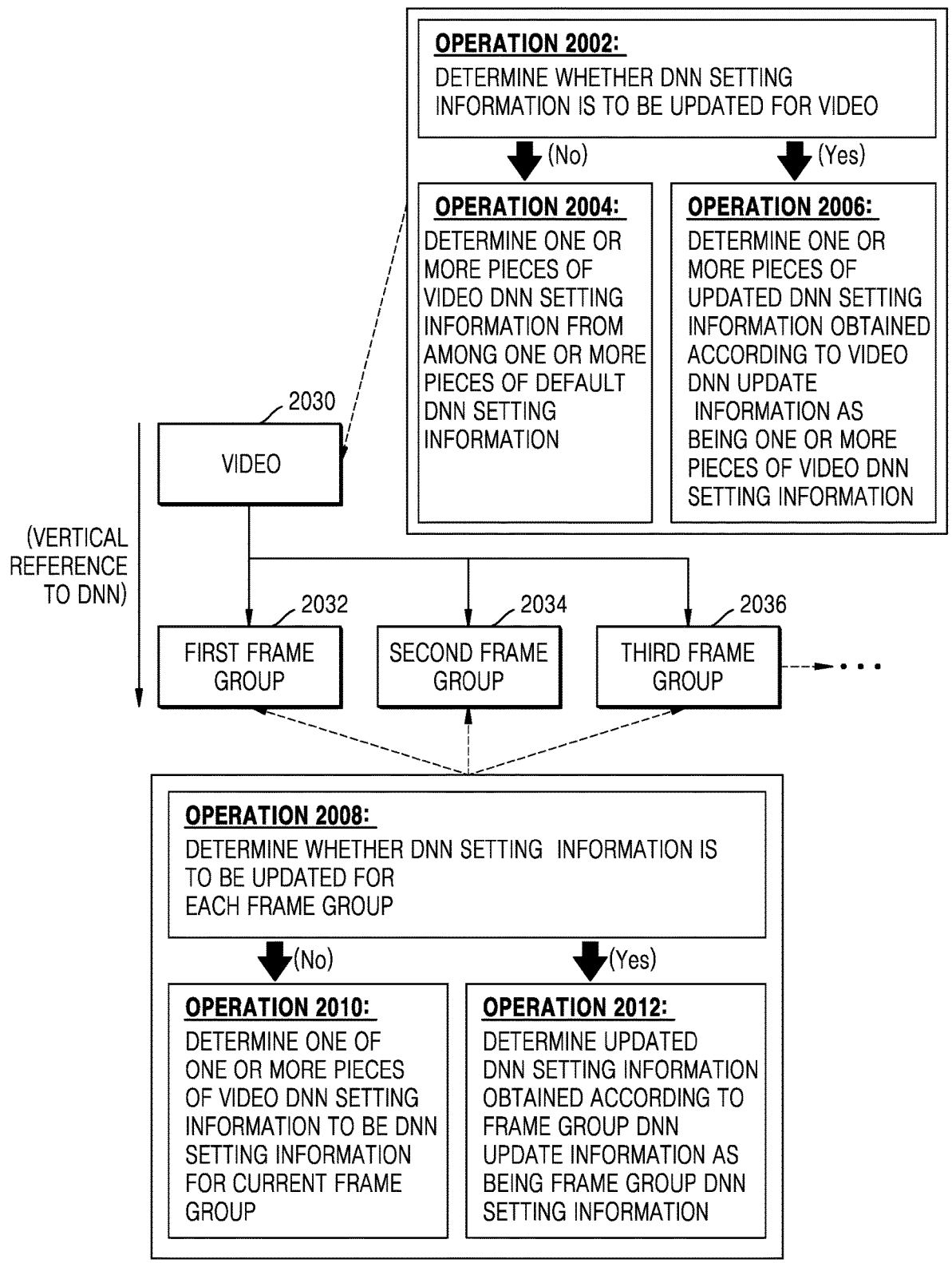
FIG. 20 illustrates a DNN setting information determination method for updating one or more pieces of DNN setting information on a per-video basis and on a per-frame group basis, according to an embodiment.

FIG. 20 illustrates a DNN setting information determination method for updating one or more pieces of DNN setting information on a per-video basis and on a per-frame group basis, according to an embodiment of the disclosure.

The DNN controller 1736 (shown in FIG. 17) determines whether DNN setting information is to be updated for a video 2030 (operation 2002). The DNN controller 1736 may determine whether the DNN setting information is to be updated according to video DNN update permission information.

When the DNN setting information is not updated for the video 2030 (operation 2002: No), the DNN controller 1736 determines one or more pieces of video DNN setting information from among one or more pieces of default DNN setting information (operation 2004). The DNN controller 1736 may determine, based on video DNN index information, one or more pieces of video DNN setting information from among one or more pieces of default DNN setting information.

When the DNN setting information is updated for the video 2030 (operation 2002: Yes), the DNN controller 1736 determines one or more pieces of updated DNN setting information generated according to video DNN update information as being one or more pieces of video DNN setting information (operation 2006).

Operations 2008 through 2012 are performed for each frame group. The video 2030 includes a plurality of frame groups including a first frame group 2032, a second frame group 2034, a third frame group 2036, etc. A current frame group is a frame group currently being decoded from among the plurality of frame groups included in the video 2030.

The DNN controller 1736 determines whether the DNN setting information is to be updated for a current frame group (operation 2008). The DNN controller 1736 may determine whether the DNN setting information is to be updated according to frame group DNN update permission information. The frame group DNN update permission information indicates whether DNN setting information is updated for the current frame group.

When the DNN setting information is not updated for the current frame group (operation 2008: No), the DNN controller 1736 determines one of the one or more pieces of video DNN setting information determined in operation 2004 or 2006 to be frame group DNN setting information for the current frame group (operation 2010). The DNN controller 1736 may select one from among the one or more pieces of video DNN setting information according to frame group DNN index information.

When the DNN setting information is updated for the current frame group (operation 2008: Yes), the DNN controller 1736 determines updated DNN setting information generated according to frame group DNN update information as being frame group DNN setting information (operation 2012).

According to an embodiment of the disclosure, the frame group DNN update information may include DNN setting information related to a structure of the second DNN 300, which is applied to a frame group, so that an up-scaling DNN may be set without reference to video DNN setting information. The frame group DNN update information may further include DNN setting information regarding parameters of filter kernels in the second DNN 300.

According to another embodiment of the disclosure, DNN setting information related to the structure of the second DNN 300 may be determined according to video DNN setting information. Furthermore, the frame group DNN update information may include only DNN setting information regarding parameters of filter kernels to be set in the second DNN 300. Thus, operation 2012 may include selecting one from among the one or more pieces of video DNN setting information. Then, a structure of an up-scaling DNN may be determined based on the selected video DNN setting information. Furthermore, weights and biases of filter kernels in the up-scaling DNN may be determined based on the frame group DNN update information.

Figure 21:
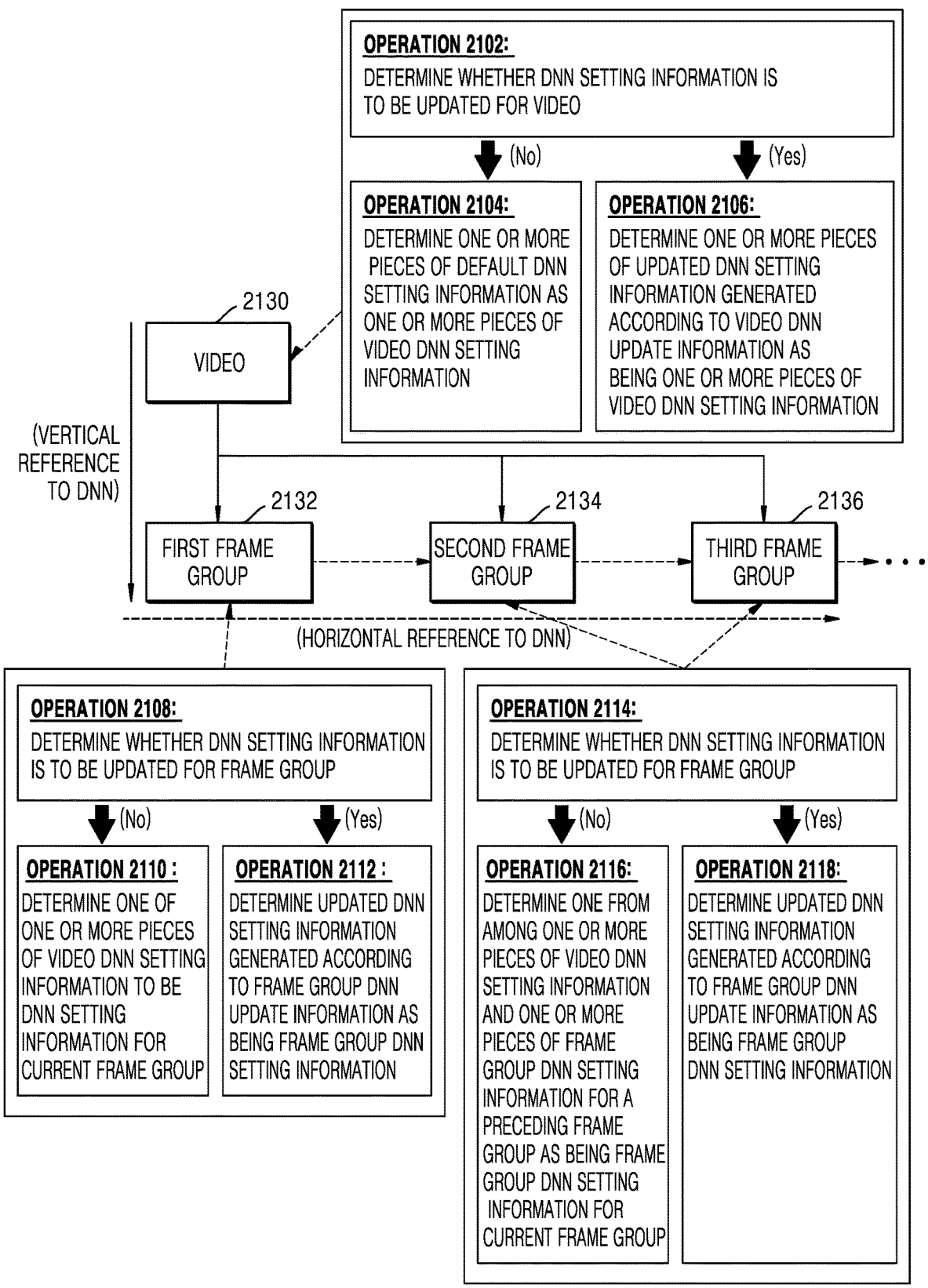
FIG. 21 illustrates a DNN setting information determination method for updating one or more pieces of DNN setting information on a per-video basis and on a per-frame group basis, according to an embodiment.

FIG. 21 illustrates a DNN setting information determination method for updating one or more pieces of DNN setting information on a per-video basis and on a per-frame group basis, according to an embodiment of the disclosure. Unlike in the DNN setting information determination method of FIG. 20, according to the DNN setting information determination method of FIG. 21, DNN setting information for a frame group may be determined by referring to DNN setting information for a previously decoded frame group.

According to the DNN setting information determination methods of FIGS. 18 through 20, video DNN setting information is vertically referenced for frame groups that are lower level data units of a video. However, when pieces of frame group DNN setting information for temporally consecutive frame groups are identical or similar to each other, the size of AI data required for determination of DNN setting information may be reduced by horizontally referencing the DNN setting information between the frame groups.

The DNN controller 1736 determines whether DNN setting information is to be updated for a video 2130 (operation 2102). The DNN controller 1736 may determine whether the DNN setting information is to be updated according to video DNN update permission information.

When the DNN setting information is not updated for the video 2130 (operation 2102: No), the DNN controller 1736 determines one or more pieces of video DNN setting information from among one or more pieces of default DNN setting information (operation 2104). The DNN controller 1736 may determine, based on video DNN index information, one or more pieces of video DNN setting information from among one or more pieces of default DNN setting information.

When the DNN setting information is updated for the video 2030 (operation 2102: Yes), the DNN controller 1736 determines one or more pieces of updated DNN setting information generated according to video DNN update information as being one or more pieces of video DNN setting information (operation 2106).

The video 2130 includes a plurality of frame groups including a first frame group 2132, a second frame group 2134, a third frame group 2136, etc. Frame group DNN setting information for the first frame group 2132 that is initially decoded may be determined by referring to only the one or more pieces of video DNN setting information determined in operation 2104 or operation 2106. On the other hand, pieces of frame group DNN setting information for frame groups decoded after the first frame group 2132, such as the second and third frame groups 2134 and 2136, may be determined by referring to the one or more pieces of video DNN setting information determined in operation 2104 or 2106 as well as pieces of frame group DNN setting information for previously decoded frame groups.

Operations 2108, 2110, and 2112 are performed for the first frame group 2132.

The DNN controller 1736 determines whether DNN setting information is to be updated for the first frame group 2132 (operation 2108). The DNN controller 1736 may determine whether the DNN setting information is to be updated according to frame group DNN update permission information.

When the DNN setting information is not updated for the first frame group 2132 that is a current frame group (operation 2108: No), the DNN controller 1736 determines one of the one or more pieces of video DNN setting information determined in operation 2104 or 2106 to be frame group DNN setting information for the current frame group (operation 2110). The DNN controller 1736 may select one from among the one or more pieces of video DNN setting information according to frame group DNN index information.

When the DNN setting information is updated for the current frame group (operation 2108: Yes), the DNN controller 1736 determines updated DNN setting information set based on frame group DNN update information as being frame group DNN setting information (operation 2112). According to an embodiment of the disclosure, the DNN controller 1736 may determine frame group DNN setting information without referring to video DNN setting information. According to another embodiment, the DNN controller 1736 may determine frame group DNN setting information related to the structure of the second DNN 300 according to video DNN setting information. Furthermore, the DNN controller 1736 may determine frame group DNN setting information regarding parameters of filter kernels in the second DNN 300 based on the frame group DNN update information.

Operations 2114, 2116, and 2118 are performed for each of the remaining frame groups other than the first frame group 2132.

The DNN controller 1736 determines whether DNN setting information is to be updated for a current frame group (operation 2114). Like in operation 2108, the DNN controller 1736 may determine whether the DNN setting information is to be updated according to frame group DNN update permission information.

When the DNN setting information is not updated for the current frame group (operation 2114: No), the DNN controller 1736 determines, as being frame group DNN setting information for the current frame group, one from among the one or more pieces of video DNN setting information determined in operation 2104 or 2106 and one or more pieces of frame group DNN setting information for a previous frame group decoded before the current frame group (operation 2116).

When the DNN setting information is updated for the current frame group (operation 2114: Yes), the DNN controller 1736 determines updated DNN setting information set based on frame group DNN update information as being frame group DNN setting information for the current frame group (operation 2118). According to an embodiment of the disclosure, the DNN controller 1736 may determine frame group DNN setting information for the current frame group without referring to video DNN setting information or frame group DNN setting information for a previous frame group. According to another embodiment of the disclosure, the DNN controller 1736 may determine frame group DNN setting information related to the structure of the second DNN 300 according to the video DNN setting information or the frame group DNN setting information for the previous frame group. Furthermore, the DNN controller 1736 may determine frame group DNN setting information regarding parameters of filter kernels to be set in the second DNN 300 based on the frame group DNN update information.

According to an embodiment of the disclosure, prior to operation 2114, the DNN controller 1736 may obtain, for each of the remaining frame groups other than the first frame group 2132, frame group DNN dependency information indicating whether frame group DNN setting information for an immediately preceding frame group is to be referred to. Furthermore, prior to operation 2114, the DNN controller 1736 may determine, based on the frame group DNN dependency information, whether frame group DNN setting information for the current frame group is determined by referring to the frame group DNN setting information for the immediately preceding frame group. Because it is highly likely that the same or similar frame group DNN setting information will be used for consecutive frame groups, the size of data required to determine the frame group DNN setting information may be reduced by using the frame group DNN dependency information.

Figure 22:
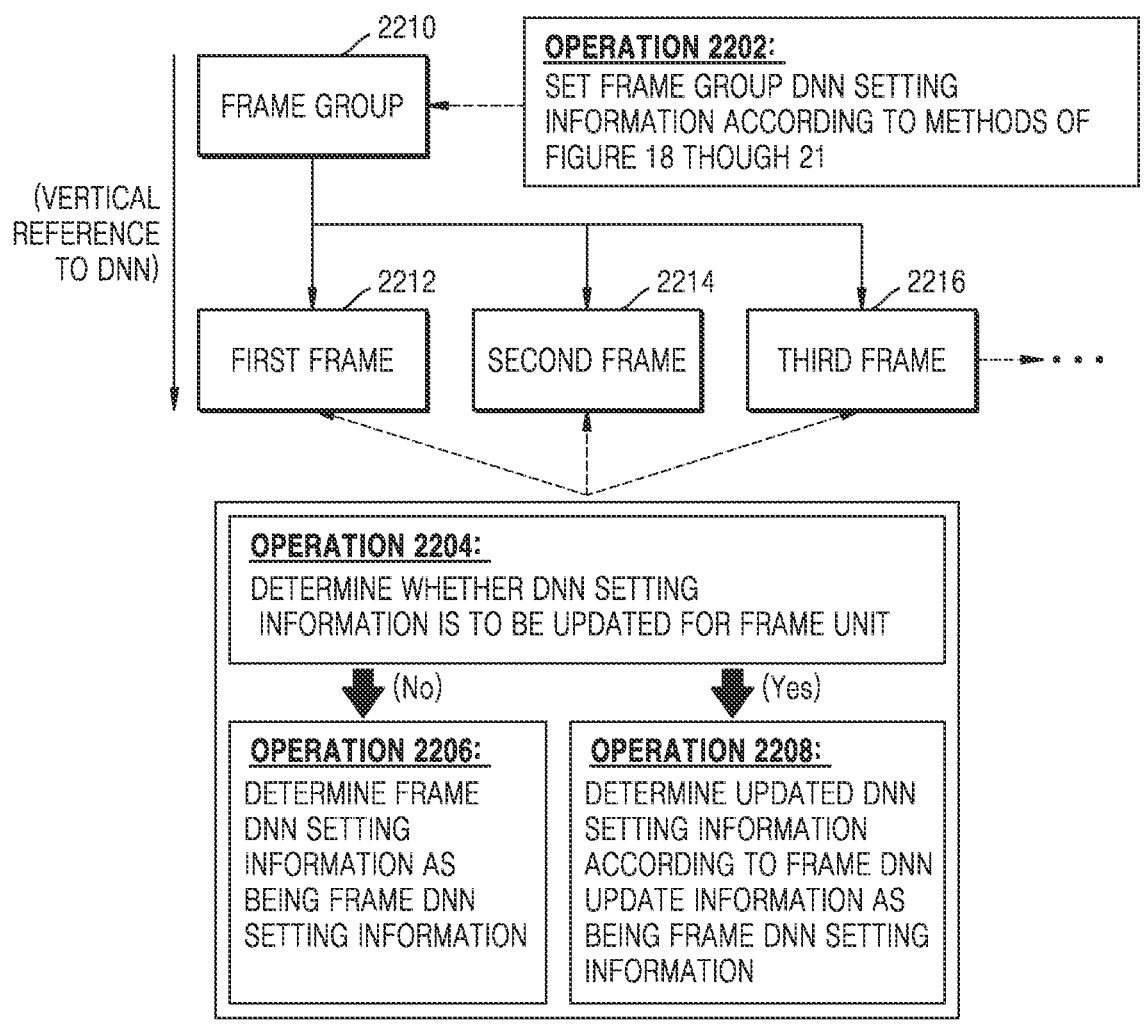
FIG. 22 illustrates a DNN setting information determination method for updating DNN setting information on a per-frame basis, according to an embodiment.

FIG. 22 illustrates a DNN setting information determination method for updating DNN setting information on a per-frame basis, according to an embodiment of the disclosure. Different DNN setting information may be applied for each frame according to the DNN setting information determination method shown in FIG. 22.

The DNN controller 1736 determines frame group DNN setting information for a current frame group 2210 according to the methods of determining frame group DNN setting information (operation 2202), which are illustrated in FIGS. 18 through 21.

The DNN controller 1736 determines whether DNN setting information is to be updated for a current frame (operation 2204). The current frame is a frame currently being decoded from among frames included in the current frame group 2210. The current frame group 2210 includes a plurality of frames including first through third frames 2212, 2214, and 2216, etc. Because frame DNN setting information is independently determined for each frame, for example, different pieces of frame DNN setting information may be respectively applied to the first and second frames 2212 and 2214.

When the DNN setting information is not updated for the current frame (operation 2204: No), the DNN controller 1736 determines the frame group DNN setting information as frame DNN setting information for the current frame (operation 2206).

When the DNN setting information is updated for the current frame (operation 2204: Yes), the DNN controller 1736 determines updated DNN setting information generated according to frame DNN update information as being frame DNN setting information (operation 2208). According to an embodiment of the disclosure, the DNN controller 1736 may determine frame DNN setting information without referring to the frame group DNN setting information. According to another embodiment, the DNN controller 1736 may determine frame DNN setting information regarding the structure of the second DNN 300 by referring to the frame group DNN setting information. Furthermore, frame DNN setting information regarding a parameter of a filter kernel to be set in the second DNN 300 may be determined based on the frame DNN update information.

According to an embodiment of the disclosure, prior to operation 2204, the DNN controller 1736 may obtain, for each of the remaining frames other than the first frame 2212, frame DNN dependency information indicating whether frame DNN setting information for an immediately preceding frame is to be referred to by the current frame. Furthermore, prior to operation 2114, the DNN controller 1736 may determine, based on the frame DNN dependency information, whether frame DNN setting information for the current frame is determined by referring to the frame DNN setting information for the immediately preceding frame. Because it is highly likely that the same or similar frame DNN setting information will be used for consecutive frames, the size of data required to determine the frame DNN setting information may be reduced by using the frame DNN dependency information.

FIGS. 23 through 26 illustrate structures of DNN update information for determining at least one piece of DNN setting information for a video or a frame group, according to embodiments of the disclosure.

Figure 23:
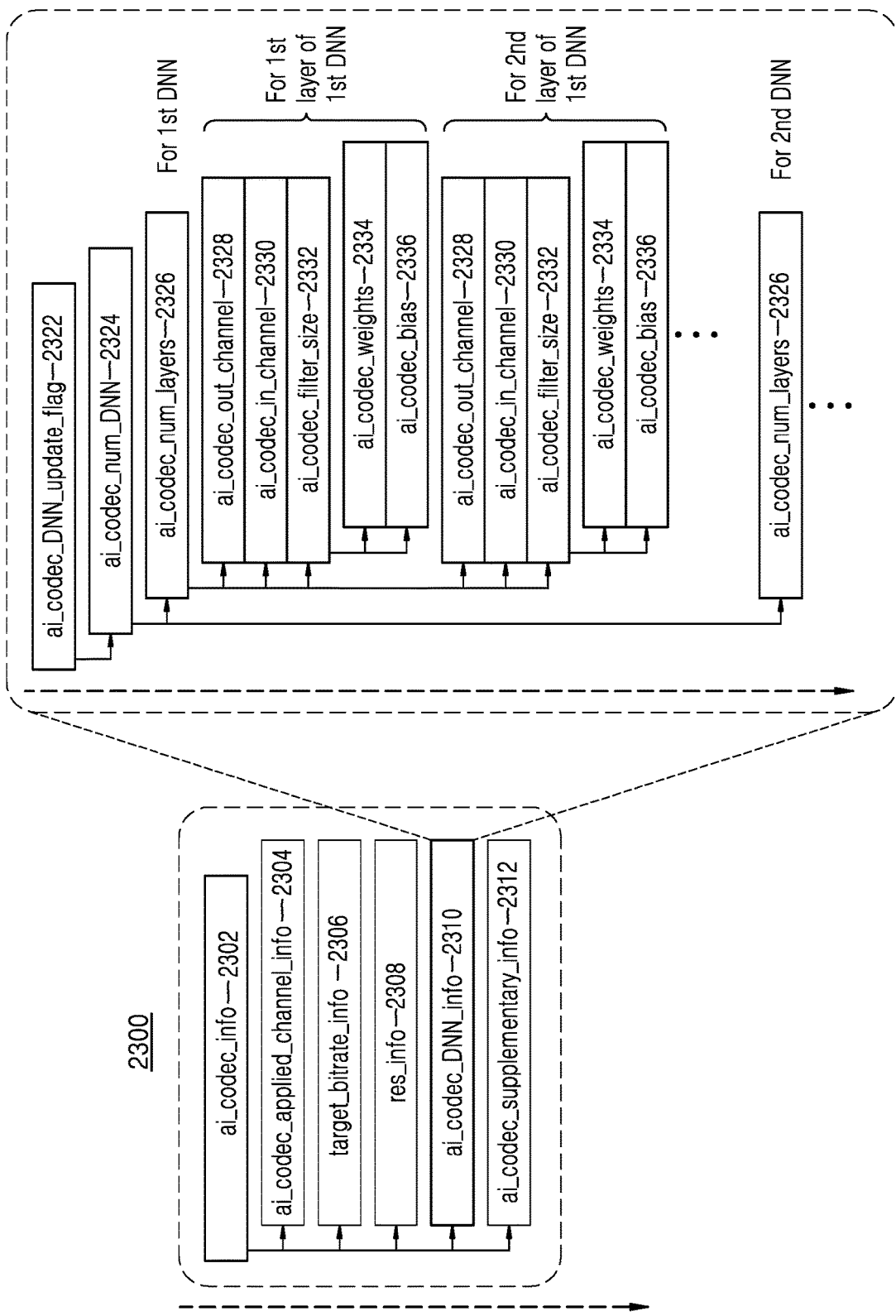
FIG. 23 illustrates a data structure including AI target data and AI auxiliary data and a data structure including AI data related to an update of DNN setting information, according to an embodiment.
Figure 24:
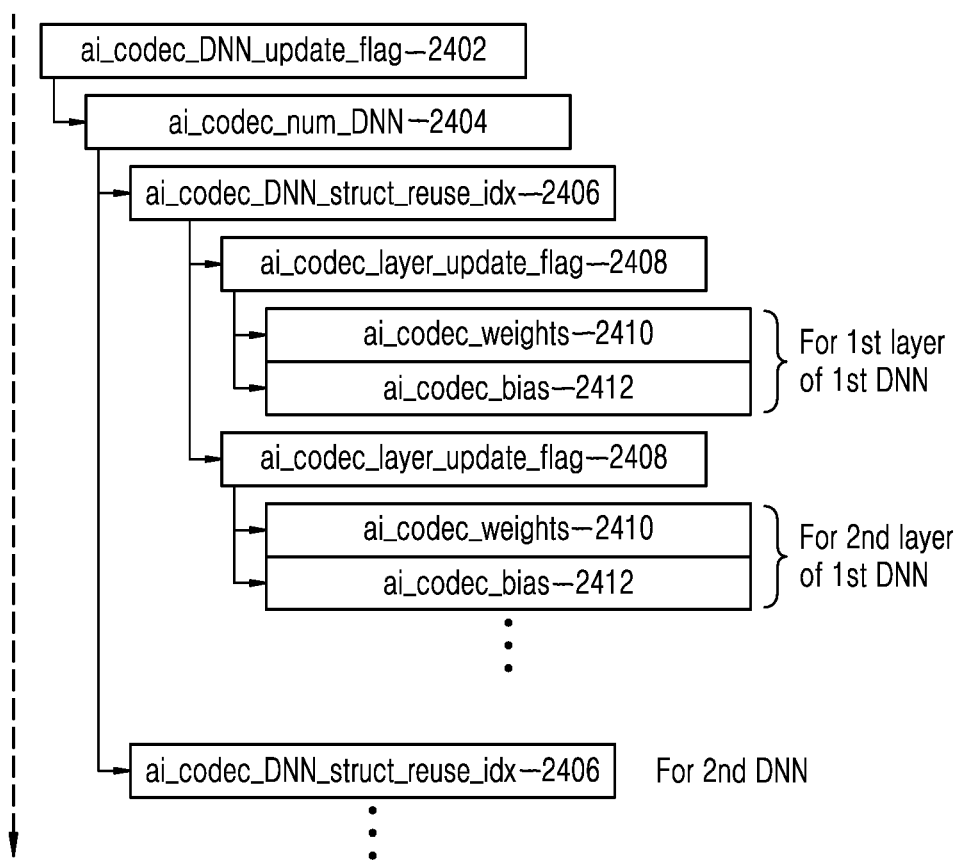
FIG. 24 illustrates a data structure including AI data related to an update of DNN setting information, according to an embodiment.
Figure 25:
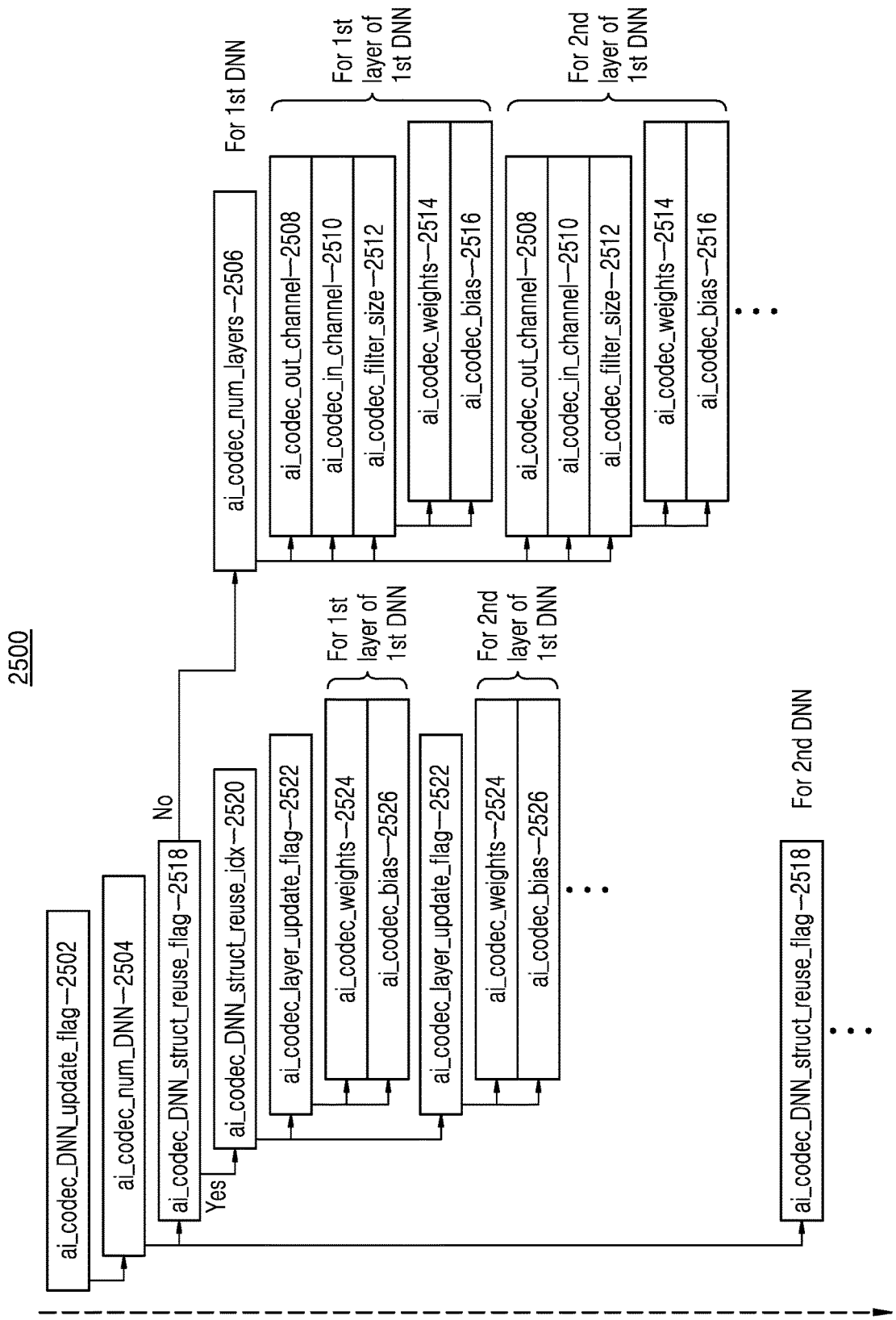
FIG. 25 illustrates a data structure including AI data related to an update of DNN setting information, according to an embodiment.

FIGS. 23 through 25 respectively illustrate data structures 2320, 2400, and 2500, each including AI data related to an update of DNN setting information for a video or a frame group, according to embodiments of the disclosure. AI data according to each of the data structures 2320, 2400, and 2500 may be included in a video parameter set or frame group parameter set. Alternatively, AI data according to each of the data structures 2320, 2400, and 2500 may not be included in a video parameter set or frame group parameter set but may be included in a video header or frame group header as a separate item.

According to an embodiment of the disclosure, AI data according to each of the data structures 2320, 2400, and 2500 may be stored in the metadata box 1510 of the video file 1500 of FIG. 15. Alternatively, AI data according to each of the data structures 2320, 2400, and 2500 may be transmitted separately from image data. The AI data may also be synchronized with the image data and applied to a video or a frame group.

When AI data according to each of the data structures 2320, 2400, and 2500 is applied to a video, AI data related to an update of DNN setting information may be applied to all frames of the video. When AI data according to each of the data structures 2320, 2400, and 2500 is applied to a frame group, AI data related to an update of DNN setting information may be applied to all frames of the frame group.

Characteristics for determining one or more pieces of video DNN setting information optimized for each of the videos in operations 1802 through 1806 of FIG. 18, operations 1902 through 1906 of FIG. 19, operations 2002 through 2006 of FIG. 20, and operations 2102 through 2106 of FIG. 21 may be implemented according to the data structures 2320, 2400, and 2500 of FIGS. 23 through 25. Furthermore, characteristics for determining one or more pieces of frame group DNN setting information optimized for each of the frame groups in operations 2008 through 2012 of FIG. 20 and operations 2108 through 2118 of FIG. 21 may be implemented according to the data structures 2320, 2400, and 2500 of FIGS. 23 through 25.

FIG. 23 illustrates a data structure 2300 including AI target data and AI auxiliary data and the data structure 2320 including AI data related to an update of DNN setting information, according to an embodiment of the disclosure. In FIG. 23, updated DNN setting information is determined according to DNN update information without referring to default DNN setting information or DNN setting information for a higher-level data unit than a current data unit.

The data structure 2300 of FIG. 23 is a higher level structure compared to the data structure 2320. The data structure 2300 includes ai_codec_info 2302 which is AI target data indicating whether AI up-scaling is applied to the current data unit. When ai_codec_info 2302 indicates that AI up-scaling is applied to the current data unit, the data structure 2300 includes AI auxiliary data ai_codec_applied_channel_info 2304, target_bitrate_info 2306, res_info 2308, ai_codec_DNN_info 2310, and ai_codec_supplementary_info 2312 that respectively represent channel information, target bitrate information, resolution information, DNN related information, and supplementary information.

Referring to FIG. 23, the ai_codec_DNN_info 2310 may include DNN update information related to an update of DNN setting information according to the data structure 2320 of FIG. 23. The DNN update information according to the data structure 2320 may include ai_codec_DNN_update_flag 2322, ai_codec_num_DNN 2324, ai_codec_num_layers 2326, ai_codec_out_channel 2328, ai_codec_in_channel 2330, ai_codec_filter_size 2332, ai_codec_weights 2334, and ai_codec_bias 2336.

The ai_codec_DNN_update_flag 2322 in the data structure 2320 is DNN update permission information. The DNN update permission information indicates whether one or more pieces of DNN setting information are updated.

When the ai_codec_DNN_update_flag 2322 indicates that the one or more pieces of DNN setting information are not updated, the ai_codec_num_DNN 2324 and some pieces of the DNN update information below the ai_codec_num_DNN 2324 are not included in the data structure 2320 of FIG. 23. When the current data unit is a video, one or more pieces of video DNN setting information may be selected from among a plurality of pieces of prestored default DNN setting information. When the current data unit is a frame group, frame group DNN setting information for the current frame group may be selected from the one or more pieces of video DNN setting information. DNN index information referenced in the selection of video DNN setting information or frame group DNN setting information may be included in the data structure 2320.

When the ai_codec_DNN_update_flag 2322 indicates that the one or more pieces of DNN setting information are updated, DNN update information is included in the data structure 2320. The DNN update information indicates information about an update of the one or more pieces of DNN setting information used for setting the second DNN 300.

For example, the DNN update information may include DNN number information regarding the number of pieces of DNN setting information to be updated. The DNN update information may further include layer number information regarding the number of layers in a DNN. The DNN update information may further include input channel information indicating the number of input channels in a layer and output channel information indicating the number of output channels in the layer. In addition, the DNN update information may include filter kernel size information indicating a size of a filter kernel of a layer, and information related to weights and a bias representing parameters of the filter kernel.

The ai_codec_num_DNN 2324 indicates DNN number information. The ai_codec_num_DNN 2324 may be included in the data structure 2320 when the ai_codec_DNN_update_flag 2322 indicates that the one or more pieces of DNN setting information are updated. A number of pieces of updated DNN setting information equal to a number indicated by the ai_codec_num_DNN 2324 is defined for a video or frame group. For example, when the ai_codec_num_DNN 2324 indicates four (4), four pieces of updated DNN setting information are defined.

Pieces of information about a layer and a filter kernel included in updated DNN setting information are determined according to the ai_codec_num_layers 2326, ai_codec_out_channel 2328, ai_codec_in_channel 2330, ai_codec_filter size 2332, ai_codec_weights 2334, and ai_codec_bias 2336 that may be individually defined for each of a plurality of updated DNNs. Alternatively, values of the ai_codec_num_layers 2326, ai_codec_out_channel 2328, ai_codec_in_channel 2330, and ai_codec_filter size 2332 may be set to be commonly applied to a plurality of pieces of updated DNN setting information.

The ai_codec_num_layers 2326 may be defined for updated DNN setting information. The ai_codec_num_layers 2326 is layer number information indicating the number of layers included in the updated DNN setting information. For example, when the ai_codec_num_layers 2326 indicates three (3), an updated DNN is set to include three layers.

A number of pieces of the ai_codec_num_layers 2326 equal to the number of a plurality of updated DNNs may be respectively defined for the updated DNNs. When the number of updated DNNs is four, four pieces of the ai_codec_num_layers 2326 respectively relating to four updated DNNs may be included in the data structure 2320.

Furthermore, only one piece of the ai_codec_num_layers 2326 may be defined for a plurality of updated DNNs. Thus, the number of layers in each of the updated DNNs may be determined by the one piece of the ai_codec_num_layers 2326. Thus, the numbers of layers in the updated DNNs may be determined for all the updated DNNs to be equal to one another.

The ai_codec_out_channel 2328 and ai_codec_in_channel 2330 may be defined for each layer in an updated DNN. The ai_codec_out_channel 2328 indicates output channel information regarding the number of output channels in each layer. Furthermore, the ai_codec_in_channel 2330 indicates input channel information regarding the number of input channels in each layer. For example, when the ai_codec_out_channel 2328 indicates 3, the number of output channels in each layer is set to 3. When the ai_codec_in_channel 2330 indicates 3, the number of input channels in each layer is set to 3.

When there are two or more layers in a DNN, ai_codec_in_channel 2330 of a subsequent layer may be determined according to ai_codec_out_channel 2328 of a preceding layer. Thus, for the remaining layers other than a first layer of the DNN, the ai_codec_in_channel 2330 may be omitted from the data structure 2320.

Furthermore, when the number of input channels in the DNN is fixed, the ai_codec_in_channel 2330 of the first layer may be omitted from the data structure 2320. For example, when the number of input channels in the DNN is fixed to 3, the ai_codec_in_channel 2330 of the first layer is omitted from the data structure 2320.

Similarly, when the number of output channels in the DNN is fixed, ai_codec_out_channel 2328 of a last layer of the DNN may be omitted from the data structure 2320. For example, when the number of output channels in the DNN is fixed to 3, ai_codec_out_channel 2328 of the last layer (i.e., the third layer) may be omitted from the data structure 2320.

The ai_codec_out_channel 2328 and ai_codec_in_channel 2330 may be defined for each of layers in each of a plurality of updated DNNs. For example, when there are two updated DNNs, i.e., first and second updated DNNs, a plurality of pieces of ai_codec_out_channel 2328 and a plurality of pieces of ai_codec_in_channel 2330 for respective layers of the first updated DNN and a plurality of pieces of ai_codec_out_channel 2328 and a plurality of pieces of ai_codec_in_channel 2330 for respective layers of the second updated DNN may be included in the data structure 2320.

Furthermore, when each of two or more updated DNNs includes an equal number of layers, a plurality of pieces of ai_codec_out_channel 2328 and a plurality of pieces of ai_codec_in_channel 2330 respectively defined for layers in one updated DNN may be applied to corresponding layers in another updated DNN. Accordingly, each of the two or more updated DNNs may be determined to have an equal number of layers, and layers arranged at corresponding positions in the two or more updated DNNs are each determined to have an equal number of input channels and an equal number of output channels. For example, first layers in the two or more updated DNNs may be each determined to have an equal number of input channels and an equal number of output channels. Similarly, second layers in the two or more updated DNNs may be each determined to have an equal number of input channels and an equal number of output channels.

Ai_codec_filter_size 2332 may be defined for each layer of an updated DNN. The ai_codec_filter_size 2332 is filter kernel size information indicating a size of a filter kernel of a layer. Because a depth of the filter kernel is determined according to the number of input channels, the ai_codec_filter size 2332 represents the number of rows and columns of the filter kernel, and the depth of the filter kernel may be omitted in the ai_codec_filter size 2332. When the number of rows in the filter kernel is equal to the number of columns therein, the ai_codec_filter_size 2332 may only include one value for the numbers of rows and columns of the filter kernel. For example, when ai_codec_filter_size 2332 indicates 3, a size of the filter kernel is determined to be 3×3. When the number of rows in the filter kernel is not necessarily equal to the number of columns therein, both the number of rows and the number of columns of the filter kernel may be used to indicate the size of the filter kernel. For example, when the ai_codec_filter_size 2332 indicates 3 and 5, the size of the filter kernel is determined to be 3×5 (i.e., 3 rows by 5 columns).

The ai_codec_filter_size 2332 may be defined for each of layers in each of a plurality of updated DNNs. For example, when there are two updated DNNs, i.e., first and second updated DNNs, a plurality of pieces of ai_codec_filter size 2332 for respective layers of the first updated DNN and a plurality of pieces of ai_codec_filter size 2332 for respective layers of the second updated DNN may be included in the data structure 2320.

Furthermore, when each of two or more updated DNNs includes an equal number of layers, and layers arranged at corresponding positions in the two or more updated DNNs each have an equal number of input channels and an equal number of output channels, a plurality of pieces of ai_codec_filter size 2332 respectively defined for layers in one updated DNN may be applied to corresponding layers in another updated DNN. Accordingly, each of the two or more updated DNNs may be determined to have an equal number of layers, and layers arranged at corresponding positions in the two or more updated DNNs are each determined to have an equal number of input channels, an equal number of output channels, and an equal filter kernel size. For example, first layers in the two or more updated DNNs may be each determined to have an equal filter kernel size. Similarly, second layers in the two or more updated DNNs may be each determined to have an equal filter kernel size.

Ai_codec_weights 2334 are defined for a filter kernel of each layer in an updated DNN. The ai_codec_weights 2334 is information indicating weights included in the filter kernel. Each layer in the updated DNN includes a number of filter kernels equal to the number of output channels. Thus, when a layer has two output channels, the layer includes two filter kernels.

A size of a filter kernel is determined by the number of rows, the number of columns, and a depth. Thus, each filter kernel includes parameters having a number corresponding to (number of rows)×(number of columns)×(depth). Because a depth of the filter kernel is equal to the number of input channels, each filter kernel includes a matrix of weights having a number corresponding to (number of rows)×(number of columns)×(number of input channels).

Thus, the number of weights included in all filter kernels of a layer is equal to (number of rows)×(number of columns)×(number of input channels)×(number of output channels). Accordingly, for one layer, a number of pieces of ai_codec_weights 2334 equal to (number of rows)×(number of columns)×(number of input channels)×(number of output channels) may be included in the data structure 2320. For example, as shown in FIG. 13, when the number of rows and the number of columns are both 3 and the number of input channels and the number of output channels are both 4, 144 (=3×3×4×4) pieces of ai_codec_weights 2334 may be included in the data structures 2320.

A bit size of ai_codec_weights 2334 may be limited. For example, the ai_codec_weights 2334 may be limited to indicate one of values −1, 0, and 1. Thus, ai_codec_weights 2334 may be represented by 1 to 2 bits. However, a range of ai_codec_weights 2334 may be determined in various ways, and is not limited hereto.

Ai_codec_bias 2336 is defined for a filter kernel of each layer in an updated DNN. The ai_codec_bias 2336 is bias information indicating a bias of a filter kernel. An output value of a filter kernel is adjusted according to a bias corresponding to the filter kernel. For example, when an output value of a filter kernel is 3 and a bias is 1, the output value of the filter kernel is adjusted to 4 (=3+1).

A layer includes a number of filter kernels equal to the number of output channels. Thus, a number of biases equal to the number of output channels in the layer are determined. For example, when the number of output channels in the layer is two, two pieces of ai_codec_bias 2336 for the layer are included in the data structure 2320.

Continuous dots shown in FIG. 23 indicate that the same data structure is repeated. Thus, continuous dots appearing below information about a second layer of a first DNN indicates that data structures for the other layers of the first DNN are also the same as data structures for the first and second layers of the first DNN. Furthermore, continuous dots below information about a second DNN (ai_codec_num_layers 2326) indicates that a data structure for the other DNNs including the second DNN is the same as that for the first DNN.

The data structure 2320 of FIG. 23 is merely an example, and according to an embodiment of the disclosure, the data structure 2320 may include DNN update information not shown in FIG. 23 but necessary for configuring an updated DNN. For example, input channel size information regarding a size of a 2D data array for an input channel and output channel size information regarding a size of a 2D data array for an output channel may be included in the data structure 2320.

Furthermore, expansion information regarding expansion of a 2D data array for an input channel may be included in the data structure 2320. Thus, as shown in FIG. 13, according to the expansion information, zero-valued elements may be added to top, lower, left, and right sides of the 2D data array for the input channel. Alternatively, zero-valued elements may be added between elements in the 2D data array for the input channel. Alternatively, interpolation elements may be added between elements in the 2D data array for the input channel. Thus, the size of the 2D data array for the input channel may increase according to the expansion information.

FIG. 24 illustrates the data structure 2400 including AI data related to an update of DNN setting information, according to an embodiment of the disclosure. Like the data structure 2320 of FIG. 23, the data structure 2400 is related to sub-information of ai_codec_DNN_info 2310 of FIG. 23.

In FIG. 24, a structure of an updated DNN that is determined with reference to a structure of a default DNN. Furthermore, weights and a bias of a filter kernel in the updated DNN are determined according to DNN update information. In the disclosure, a structure of a DNN represents pieces of information about attributes of a layer, an input channel and an output channel and a size of a filter kernel, excluding weights and a bias of the filter kernel. For example, the number of layers, the number of input and output channels in each of the layers, and a size of a filter kernel of each layer are included in DNN setting information related to the structure of the DNN.

Ai_codec_DNN_update_flag 2402 and ai_codec_num_DNN 2404 illustrated in FIG. 24 have the same functions as the ai_codec_DNN_update_flag 2322 and ai_codec_num_DNN 2324 of FIG. 23, respectively.

Unlike the data structure 2320 of FIG. 23, the data structure 2400 of FIG. 24 does not include the ai_codec_num_layers 2326, ai_codec_out_channel 2328, ai_codec_in_channel 2330 and ai_codec_filter size 2332. Instead, the structure of the updated DNN is determined with reference to the structure of the default DNN. Thus, ai_codec_DNN_struct_reuse(ref)_idx 2406 indicating reference DNN index information may be included in the data structure 2400. The reference DNN index information indicates default DNN setting information or video DNN setting information that is referenced in setting updated DNN setting information. When a current data unit is a video, the reference DNN index information indicates one of a plurality of pieces of default DNN setting information. When the current data unit is a frame group, the reference DNN index information may indicate one of a plurality of pieces of video DNN setting information. According to an embodiment of the disclosure, when the current data unit is a frame group, the reference DNN index information may indicate one from among a plurality of pieces of video DNN setting information and a plurality of pieces of frame group DNN setting information for previous frame groups.

When the DNN setting information that is referenced in generating the updated DNN setting information is determined according to the ai_codec_DNN_struct_reuse(ref)_idx 2406, the number of layers, the number of input and output channels in each layer, and a size of a filter kernel of each layer in the updated DNN setting information are determined according to the number of layers, the number of input and output channels in each layer, and a size of a filter kernel of each layer, which are included in the referenced DNN setting information. Furthermore, a size of a 2D data array for an input channel and a size of a 2D data array for an output channel, which are included in the updated DNN setting information, may be determined according to a size of a 2D data array for an input channel and a size of a 2D data array for an output channel, which are included in the referenced DNN setting information.

Ai_codec_layer_update_flag 2408 may be included in the data structure 2400. The ai_codec_layer_update_flag 2408 is a layer update flag indicating whether filter kernel parameters in a layer of the updated DNN are identical to filter kernel parameters in a layer of the default DNN or a flag for indicating the need for an update with new values. Because the number of layers in the referenced DNN setting information is equal to the number of layers in the updated DNN, a number of pieces of ai_codec_layer_update_flag 2408 equal to the number of layers in the updated DNN are included in the data structure 2400. When the ai_codec_layer_update_flag 2408 indicates that the filter kernel parameters in the layer of the updated DNN need to be updated with new values, ai_codec_weights 2410 indicating weights of a filter kernel in the updated DNN and ai_codec_bias 2412 indicating a bias are included in the data structure 2400. Thus, the weights and bias of the filter kernel in the updated DNN may be different from weights and a bias of a filter kernel in the default DNN.

When the ai_codec_layer_update_flag 2408 indicates that the filter kernel parameters in the layer of the updated DNN are identical to the filter kernel parameters in the layer of the default DNN, the ai_codec_weights 2410 and/or the ai_codec_bias 2412 may be omitted from the data structure 2400, and the filter kernel parameters in the layer of the updated DNN are determined to be the same as the filter kernel parameters in the layer of the default DNN.

According to an embodiment of the disclosure, filter kernel identity information indicating whether parameters of some filter kernels in one layer of an updated DNN are identical to parameters of filter kernels in a layer of a default DNN may be included in the data structure 2400. When the filter kernel identity information indicates that parameters of a filter kernel in the updated DNN are identical to parameters of a filter kernel in the default DNN, the ai_codec_weights 2410 and/or the ai_codec_bias 2412 may be omitted from the data structure 2400. The filter kernel identity information may be respectively defined for one or more filter kernels of a layer. Thus, when a layer includes three filter kernels, three pieces of filter kernel identity information for the three filter kernels may be included in the data structure 2400.

According to an embodiment of the disclosure, when the updated DNN setting information references the default DNN setting information, the ai_codec_weights 2410 may indicate a difference between a weight of a filter kernel in the default DNN and a weight of a filter kernel in the updated DNN, the weights being arranged at the same position in the filter kernels. For example, the ai_codec_weights 2410 for a first weight of a first filter kernel in a first layer of the updated DNN may indicate a difference between the first weight of the first filter kernel in the first layer of the updated DNN and a first weight of a first filter kernel in a first layer of the default DNN.

Similarly, when the updated DNN setting information references the default DNN setting information, the ai_codec_bias 2412 may indicate a difference between biases at the same position respectively in the default DNN and the updated DNN, For example, the ai_codec_bias 2412 for a bias of a first filter kernel in a first layer of the updated DNN may indicate a difference between the bias of the first filter kernel in the first layer of the updated DNN and a bias of a first filter kernel in a first layer of the default DNN.

Continuous dots shown in FIG. 24 indicate that the same data structure is repeated. Thus, continuous dots appearing below information about a second layer of a first DNN indicates that data structures for the other layers of the first DNN are also the same as data structures for the first and second layers of the first DNN. Furthermore, continuous dots below information about a second DNN (ai_codec_DNN_struct_reuse_idx 2406) indicates that a data structure for the other DNNs including the second DNN is the same as that for the first DNN.

FIG. 25 illustrates the data structure 2500 including AI data related to an update of DNN setting information, according to an embodiment of the disclosure. Similar to the data structure 2320 of FIG. 23, the data structure 2400 is related to sub-information of ai_codec_DNN_info 2310 of FIG. 23.

The data structure 2500 of FIG. 25 includes default DNN reuse permission information. One of the updated DNN determination method of FIG. 23 and the updated DNN determination method of FIG. 24 is selected according to the default DNN reuse permission information. Updated DNN setting information is determined according to the selected updated DNN determination method. Thus, in FIG. 25, the updated DNN setting information may be determined according to DNN update information without referring to default DNN setting information, as described with reference to FIG. 23. Furthermore, in FIG. 25, the updated DNN setting information may be determined with reference to a structure of a default DNN, as described with reference to FIG. 24.

Ai_codec_DNN_update_flag 2502 and ai_codec_num_DNN 2504 of FIG. 25 have the same functions as the ai_codec_DNN_update_flag 2322 and ai_codec_num_DNN 2324 of FIG. 23, respectively.

Unlike the data structures 2320 of FIG. 23 and 2400 of FIG. 24, the data structure 2500 of FIG. 25 includes ai_codec_DNN_struct_reuse_flag 2518 that is the default DNN reuse permission information. The default DNN reuse permission information indicates whether a structure of an updated DNN is determined with reference to the default DNN. The data structure 2500 includes ai_codec_DNN_struct_reuse_flag 2518 for each piece of updated DNN setting information.

When the ai_codec_DNN_struct_reuse_flag 2518 indicates that the updated DNN setting information references the structure of the default DNN (Yes), the updated DNN setting information is determined with reference to the structure of the default DNN, as described with reference to FIG. 24. Accordingly, characteristics of the data structure 2400 described with reference to FIG. 24 may be applied to the data structure 2500 of FIG. 25.

Thus, default DNN setting information, video DNN setting information, or frame group DNN setting information for a previous frame group, which is referenced by the updated DNN setting information, may be determined according to ai_codec_DNN_struct_reuse_idx 2520. Furthermore, it may be determined according to ai_codec_layer_update_flag 2522 whether a layer of the updated DNN is the same as a layer of the default DNN. Then, weights and a bias of a filter kernel may be respectively determined according to ai_codec_weights 2524 and ai_codec_bias 2526.

When the ai_codec_DNN_struct_reuse_flag 2518 indicates that the updated DNN setting information does not reference the structure of the default DNN (i.e., ai_codec_DNN_struct_reuse_flag=No), the updated DNN setting information is determined without being referenced to the structure of the default DNN, as described with reference to FIG. 23. Thus, characteristics of the data structure 2320 described with reference to FIG. 23 may be applied to the data structure 2500 of FIG. 25.

Accordingly, ai_codec_num_layers 2506, ai_codec_out_channel 2508, ai_codec_in_channel 2510, and ai_codec_filter_size 2512 are included in the data structure 2500. Thus, the number of layers in the updated DNN, the number of output and input channels in each of the layers, and a size of a filter kernel of each layer are respectively determined according to ai_codec_num_layers 2506, ai_codec_out_channel 2508, ai_codec_in_channel 2510, and ai_codec_filter_size 2512. Furthermore, weights and a bias of a filter kernel are respectively determined according to ai_codec_weights 2514 and ai_codec_bias 2516.

Continuous dots shown in FIG. 25 indicate that the same data structure is repeated. Thus, continuous dots appearing below information about a second layer of a first DNN indicates that data structures for the other layers of the first DNN are also the same as data structures for the first and second layers of the first DNN. Furthermore, continuous dots below information about a second DNN (ai_codec_DNN_struct_reuse_flag 2518) indicates that data structures for the other DNNs including the second DNN are the same as that of the first DNN.

FIG. 26 illustrates an AI codec high-level syntax 2600 in which the data structure including AI data related to an update of DNN setting information is implemented, according to an embodiment of the disclosure. The AI codec high-level syntax 2600 represents a high-level syntax in which a data structure for AI data is implemented. A high-level syntax refers to a syntax including parameters commonly applied in encoding of a particular data unit. For example, the high-level syntax includes a video parameter set applied to a video, a frame group parameter set applied to a frame group, a frame parameter set applied to a frame, etc.

A syntax describes a data structure in a bitstream represented by consecutive bits. Thus, the bitstream is interpreted according to the data structure described by a syntax. The AI codec high-level syntax 2600 of FIG. 26 may be applied to a video or a frame group.

According to an embodiment of the disclosure, the AI codec high-level syntax 2600 of FIG. 26 may be implemented in the form of an SEI message. The SEI message is a set of supplementary information related to a video and is transmitted separately from encoded data for images. The SEI message in which the AI codec high-level syntax 2600 of FIG. 26 is implemented is transmitted for a frame group.

The order of acquisition of syntax elements related to an update of DNN setting information and conditions for the acquisition of the syntax elements are described at the left side of a table of FIG. 26. Furthermore, the right side of the table of FIG. 26 shows how syntax elements related to an update of DNN setting information are extracted from a bitstream. Here, u(n) indicates that the corresponding syntax element has a size of n bits, where n is a positive integer. ue(v) indicates that the corresponding syntax element is encoded by an exponential Golomb encoding scheme.

As shown on the left side of the table of FIG. 26, the AI codec high-level syntax 2600 starts with ai_codec_info that is AI target information indicating whether AI up-scaling is applied to a current data unit. The ai_codec_info is a syntax element with a size of 1 bit, and when the ai_codec_info indicates 0, the AI codec high-level syntax 2600 ends.

When the ai_codec_info indicates 1, the AI codec high-level syntax 2600 includes ai_codec_DNN_update_flag that is DNN update permission information. In the table of FIG. 26, the ai_codec_DNN_update_flag is a syntax element having a size of 1 bit. When the ai_codec_DNN_update_flag indicates "0", the AI codec high-level syntax 2600 includes ai_codec_DNN_index indicating one of default DNN setting information and video DNN setting information. Furthermore, DNN setting information for the current data unit is determined according to the ai_codec_DNN_index.

When the ai_codec_DNN_update_flag indicates "1", the AI codec high-level syntax 2600 includes ai_codec_num_DNN which is DNN number information. The ai_codec_num_DNN is a syntax element having a size of 8 bits. The number of pieces of updated DNN setting information according to ai_codec_num_DNN may be within a range of 1 to 256. However, according to an embodiment of the disclosure, a bit size of ai_codec_num_DNN may be changed differently. According to an embodiment of the disclosure, when only one piece of updated DNN setting information is required, the ai_codec_num_DNN may be omitted from the AI codec high-level syntax 2600.

The AI codec high-level syntax 2600 includes a number of pieces of ai_codec_network_struct_reuse_flag[i], which is DNN reuse permission information, the number being equal to the number of updated DNNs indicated by ai_codec_num_DNN (e.g., for(i=0; i<ai_codec_num_DNN, i++)). For example, when the ai_codec_num_DNN indicates 4, the AI codec high-level syntax 2600 may include ai_codec_network_struct_reuse_flag [0], ai_codec_network_struct_reuse_flag [1], ai_codec_network_struct_reuse_flag [2], and ai_codec_network_struct_reuse_flag [3]. The ai_codec_network_struct_reuse_flag[i] is a syntax element with a size of 1 bit.

When the ai_codec_network_struct_reuse_flag[i] indicates 1, the AI codec high-level syntax 2600 includes ai_codec_network_struct_reuse_idx [i] that is reference DNN index information. The ai_codec_network_struct_reuse_idx [i] is a syntax element having a size of 8 bits. A structure of an updated DNN is determined according to default DNN setting information indicated by ai_codec_network_struct_reuse_idx [i]. For example, the number of layers in an updated DNN (ai_codec_num_layers[i]), the number of input channels in each of the layers (ai_codec_in_channel [i][j]), the number of output channels in each layer (ai_codec_out_channel [i][j]), a size of a filter kernel in each layer (ai_codec_filter width[i][j] and ai_codec_filter_height[i][j]), etc. may be determined according to the default DNN setting information to be referenced. Furthermore, a size of a 2D data array for an input channel and a size of a 2D data array for an output channel in the updated DNN may be determined according to a structure of the default DNN to be referenced.

According to an embodiment of the disclosure, unlike in FIG. 26, the AI codec high-level syntax 2600 may not include ai_codec_network_struct_reuse_idx[i]. Default DNN setting information to be referenced in setting updated DNN setting information may be determined according to an identification number assigned to an updated DNN. For example, when a first updated DNN has the same identification number as a first default DNN, first updated DNN setting information may be determined by referring to first default DNN setting information. Similarly, when a second updated DNN has the same identification number as a second default DNN, second updated DNN setting information may be determined by referring to second default DNN setting information.

A number of pieces of ai_codec_bias[i][j][k] indicating bias information of a current layer may be obtained, wherein the number is equal to the number of output channels indicated by ai_codec_out_channel [i][j] (for(k=0; k <ai_codec_out_channel [i][j]; k++)). In the AI codec high-level syntax 2600 of FIG. 26, the ai_codec_bias[i][j][k] is encoded by the exponential Golomb encoding scheme.

A number of pieces of ai_codec_weights[i][j][k][l][m] indicating weight information regarding parameters of filter kernels in the current layer may be obtained, wherein the number is equal to a number corresponding to a product obtained by multiplying the number of output channels indicated by ai_codec_out_channel [i][j], the number of input channels indicated by ai_codec_in_channel [i][j], and a size of a filter kernel indicated by ai_codec_filter_width[i][j]*ai_codec_filter_height[i][j]   (for(k=0; k<ai_codec_out_channel [i][j]; k++) {for(l=0; l <ai_codec_in_channel [i][j]; l++)   {for(m=0 m<ai_codec_filter_width[i][j] *ai_codec_filter_height[i][j]; m++)}}). In the AI codec high-level syntax 2600 of FIG. 26, the ai_codec_weights [i][j][k][l][m] is encoded by the exponential Golomb encoding scheme.

According to an embodiment of the disclosure, ai_codec_weights [i][j][k][l][m] may indicate a difference between a weight in the default DNN and a weight in the updated DNN. Furthermore, ai_codec_bias[i][j][k] may indicate a difference between a bias in the default DNN and a bias in the updated DNN.

When ai_codec_network_struct_reuse_flag[i] indicates "0", the AI codec high-level syntax 2600 includes a number of pieces of ai_codec_num_layers[i] that is layer number information, wherein the number is equal to the number of updated DNNs according to ai_codec_num_DNN (for(i=0; i<ai_codec_num_DNN, i++)). For example, when the ai_codec_num_DNN indicates 4, the AI codec high-level syntax 2600 may include al_codec_num_layers [0], ai_codec_num_layers[1], ai_codec_num_layers[2], and ai_codec_num_layers[3].

The ai_codec_num_layers[i] is a syntax element with a size of 8 bits. Thus, the number of layers according to ai_codec_num_layers [i] may be determined within a range of 1 to 256 (i.e., $2^8$=256). However, according to an embodiment of the disclosure, a bit size of ai_codec_num_layers[i] may be changed differently.

A number of pieces of ai_codec_layer_update_flag are included in the AI codec high-level syntax 2600, wherein the number is equal to the number of layers according to ai_codec_num_layers[i] (for(j=0; j<ai_codec_num_layers [i]; j++)). The ai_codec_layer_update_flag is a syntax element with a size of 1 bit and may include layer update information indicating whether the current layer is updated. When the ai_codec_layer_update_flag indicates "0", DNN setting information of a default layer, which is stored in the AI up-scaler 234, is applied to the current layer. When ai_codec_layer_update_flag indicates "1", ai_codec_in_channel [i][j] (that is, input channel information), ai_codec_out_channel [i][j] (that is, output channel information), ai_codec_filter_width [i][j] and ai_codec_filter_height[i][j] (which are filter kernel size information) are included in the AI high-level syntax 2600. Although FIG. 26 shows that the ai_codec_layer_update_flag is included in the AI codec high-level syntax 2600, according to an embodiment of the disclosure, the ai_codec_layer_update_flag may not be included in the AI codec high-level syntax 2600. When the ai_codec_layer_update_flag is not included in the AI codec high-level syntax 2600, the ai_codec_in_channel[i][j], ai_codec_out_channel[i][j], ai_codec_filter width[i][j] and ai_codec_filter height[i][j] may be configured to be included in the AI codec high-level syntax without decoding the layer update information.

The ai_codec_in_channel[i][j], ai_codec_out_channel[i][j], ai_codec_filter width[i][j] and ai_codec_filter_height[i][j] are syntax elements, each having a size of 8 bits. Thus, values respectively indicated by ai_codec_in_channel [i][j], ai_codec_out_channel [i][j], ai_codec_filter_width[i][j], and ai_codec_filter height[i][j] may be determined within a range of 1 to 256. However, according to an embodiment of the disclosure, bit sizes of ai_codec_in_channel[i][j], ai_codec_out_channel[i][j], ai_codec_filter_width[i][j], and ai_codec_filter height[i][j] may be changed differently.

Furthermore, the AI codec high-level syntax includes ai_codec_weights [i][j][k][l][m] indicating weights of parameters included in the filter kernels whose values are determined and ai_codec_bias[i] [j][k] indicating biases for adjusting outputs of the filter kernels.

The AI codec high-level syntax 2600 of FIG. 26 may be divided into a first syntax 2610, a second syntax 2620, and a third syntax 2630. The first syntax 2610 includes ai_codec_DNN_update_flag, ai_codec_num_DNN, and ai_codec_DNN_struct_reuse_flag [i]. A method of determining updated DNN setting information is determined according to ai_codec_DNN_struct_reuse_flag [i]. When ai_codec_DNN_struct_reuse_flag [i] indicates "1", updated DNN setting information is determined according to a syntax element of the second syntax 2620. When ai_codec_DNN_struct_reuse_flag [i] indicates "0", updated DNN setting information is determined according to a syntax element of the third syntax 2630.

By setting ai_codec_DNN_struct_reuse_flag[i] of the first syntax 2610 to always indicate "1" and excluding the third syntax 2630, the data structure 2400 of FIG. 24 may be implemented from the AI codec high-level syntax 2600 of FIG. 26. Furthermore, by setting the ai_codec_DNN_struct_reuse_flag[i] of the first syntax 2610 to always indicate "0" and excluding the second syntax 2620, the data structure 2320 of FIG. 23 may be implemented from the AI codec high-level syntax 2600 of FIG. 26.

The AI codec high-level syntax 2600 of FIG. 26 is merely an example, and according to an embodiment of the disclosure, some of the syntax elements of FIG. 26 may be excluded from the AI codec high-level syntax 2600, or a syntax not shown in FIG. 26 may be included in the AI codec high-level syntax 2600. Furthermore, algorithms illustrated in FIGS. 23 through 25 may be implemented in different ways in the AI codec high-level syntax 2600 of FIG. 26.

Figure 27:
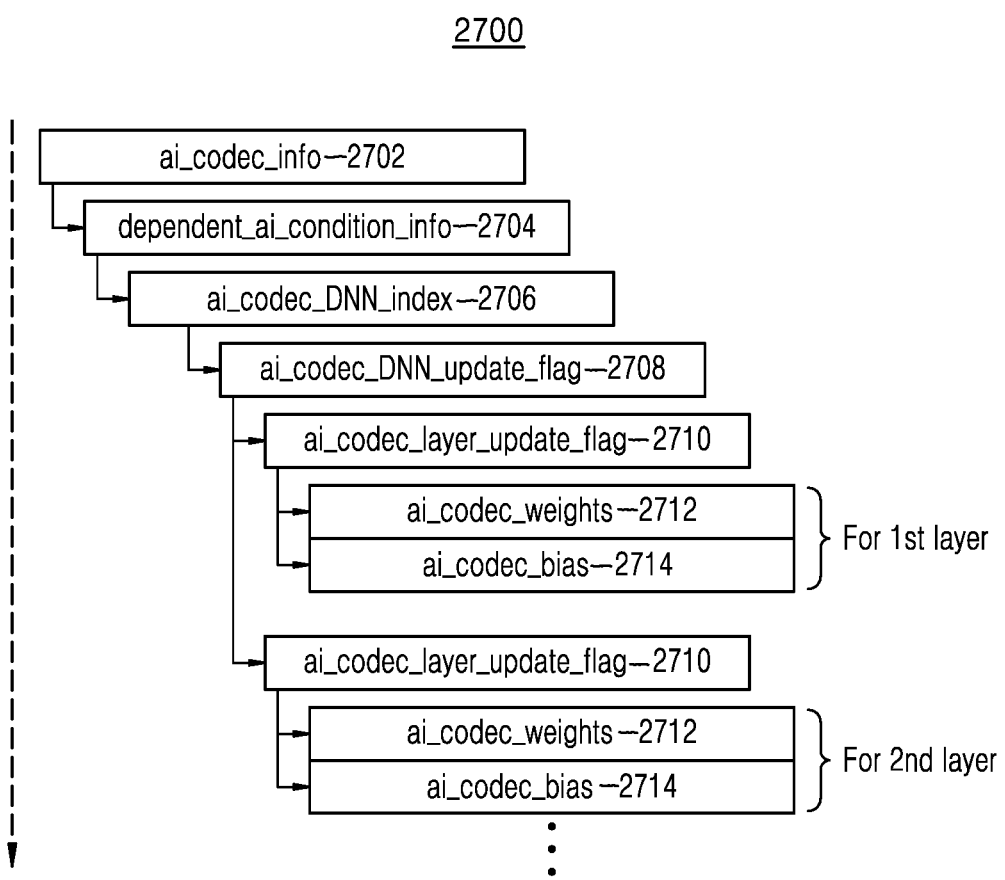
FIG. 27 illustrates a data structure including AI data related to an update of DNN setting information for a frame or a frame group, according to an embodiment.

FIG. 27 illustrates a data structure 2700 including AI data related to an update of DNN setting information for a frame group or frame, according to an embodiment of the disclosure. The AI data according to the data structure 2700 may be included in a frame group parameter set or a frame parameter set. Alternatively, the AI data according to the data structure 2700 may not be included in the frame group parameter set or frame parameter set, but may be separately included in a frame group header or frame header. Alternatively, the AI data according to the data structure 2700 may be transmitted separately from image data. The AI data according to the data structure 2700 may also be synchronized with the image data and applied to a frame group or a frame.

The characteristics for determining frame group DNN setting information optimized for each of the frame groups in operations 2008 through 2012 of FIG. 20 and operations 2108 through 2118 of FIG. 21 may be implemented to the data structure 2700 of FIG. 27. Furthermore, the characteristics for determining DNN setting information optimized for each of the frames in operations 2204 through 2208 of FIG. 22 may be applied to the data structure 2700 of FIG. 27.

Referring to FIG. 27, ai_codec_info 2702 is AI target information indicating whether AI up-scaling is applied to a current data unit. When the ai_codec_info 2702 indicates that AI up-scaling is not applied to the current data unit, AI up-scaling for the current data unit is not performed.

When the ai_codec_info 2702 indicates that AI up-scaling is applied to the current data unit, the data structure 2700 includes dependent_ai_condition_info 2704 that is AI auxiliary data dependency information indicating whether AI auxiliary data for a preceding data unit is applied to the current data unit. When the dependent_ai_condition_info 2704 indicates that the AI auxiliary data for the preceding data unit is applied to the current data unit, DNN setting information for the current data unit is not updated. When the dependent_ai_condition_info 2704 indicates that the AI auxiliary data of the immediately preceding data unit is not applied to the current data unit, ai_codec_DNN_index 2706 that is DNN index information is included in the data structure 2700.

The ai_codec_DNN_index 2706 indicates DNN setting information applied to the current data unit from among a plurality of pieces of candidate DNN setting information. For example, when the current data unit is a frame group, the ai_codec_DNN_index 2706 may indicate DNN setting information applied to a current frame group from among a plurality of pieces of video DNN setting information. Alternatively, when the current data unit is a frame group, the ai_codec_DNN_index 2706 may indicate DNN setting information applied to the current frame group from among one or more pieces of video DNN setting information and one or more pieces of frame group DNN setting information for a previous frame group. Alternatively, when the current data unit is a frame, the ai_codec_DNN_index 2706 may indicate DNN setting information applied to a current frame from among one or more pieces of frame group DNN setting information and one or more pieces of frame DNN setting information for a previous frame. When one piece of candidate DNN setting information exists, the ai_codec_DNN_index 2706 may be omitted from the data structure 2700.

The data structure 2700 includes ai_codec_DNN_update_flag 2708 that is DNN update permission information. While the DNN update permission information described with reference to FIGS. 22 through 24 indicates whether a plurality of DNNs are updated, DNN update permission information illustrated in FIG. 27 indicates whether DNN setting information of a higher-level DNN, which is indicated by the ai_codec_DNN_index 2706, is updated.

When the ai_codec_DNN_update_flag 2708 indicates that the DNN setting information of the higher-level DNN is not updated, DNN update information is not included in the data structure 2700. Accordingly, a second image in a frame may be AI up-scaled according to the DNN setting information of the higher-level DNN, which is indicated by the ai_codec_DNN_index 2706. When the ai_codec_DNN_update_flag 2708 indicates that the DNN setting information is updated, the second image in the frame may be AI up-scaled according to the updated DNN setting information determined from the DNN update information.

A structure of an updated DNN is determined with reference to the DNN setting information of the higher-level DNN. Thus, the number of layers in the updated DNN, the number of input channels, the number of output channels, a size of a filter kernel, etc. are determined according to the DNN setting information of the higher-level DNN.

Ai_codec_layer_update_flag 2710 may be included in the data structure 2700. The ai_codec_layer_update_flag 2710 is a layer update flag indicating whether a layer of the updated DNN needs to be updated with a new value without being referenced to a layer of the higher-level DNN. A number of pieces of ai_codec_layer_update_flag 2710 is included in the data structure 2700, wherein the number is equal to the number of layers in the updated DNN.

When the ai_codec_layer_update_flag 2710 indicates that the layer of the updated DNN directly refers to the layer of the higher-level DNN, the layer of the updated DNN is determined to be the same as the layer of the higher-level DNN. When ai_codec_layer_update_flag 2710 indicates that the layer of the updated DNN is updated with a new value without referencing the layer of the higher-level DNN, parameters of a filter kernel in the layer of the updated DNN are determined differently from those of a filter kernel in the layer of the higher-level DNN.

Weights and a bias of the filter kernel in the updated DNN are determined according to ai_codec_weights 2712 that is weight information and ai_codec_bias 2714 that is bias information.

According to an embodiment of the disclosure, filter kernel identity information indicating whether the parameters of the filter kernel in the updated DNN are identical to the parameters of the filter kernel in the higher-level DNN may be included in the data structure 2700. When the filter kernel identity information indicates that the parameters of the filter kernel in the updated DNN are identical to those of the filter kernels in the higher-level DNN, the ai_codec_weights 2712 and the ai_codec_bias 2714 may be omitted from the data structure 2700.

According to an embodiment of the disclosure, the ai_codec_weights 2712 may indicate a difference between a weight of the filter kernel in the higher-level DNN and a weight of the filter kernel in the updated DNN, where the weights may be arranged at the same position in each of the filter kernels. Similarly, the ai_codec_bias 2714 may indicate a difference between biases at the same position respectively in the higher-level DNN and the updated DNN.

Continuous dots shown in FIG. 27 indicate that the same data structure may be repeated. Thus, continuous dots below the information about the second layer indicates that data structures for the other layers may also be the same as the data structures for the first and second layers.

FIG. 28 illustrates an AI codec high-level syntax 2800 in which the data structure 2700 of FIG. 27 including the AI data related to an update of DNN setting information is implemented, according to an embodiment of the disclosure. The AI codec high-level syntax 2800 of FIG. 28 may be applied to a frame group or frame.

The order of acquisition of syntax elements related to an update of DNN setting information and conditions for the acquisition of the syntax elements are described at the left side of a table of FIG. 28. Furthermore, the right side of the table of FIG. 28 shows how syntax elements related to the update of DNN setting information are extracted from a bitstream.

As shown on the left side of the table of FIG. 28, the AI codec high-level syntax 2800 includes ai_codec_info that is AI target information indicating whether AI up-scaling is applied to a current data unit. The ai_codec_info is a syntax element with a size of 1 bit, and when the ai_codec_info indicates "0", the AI codec high-level syntax 2800 ends.

When the ai_codec_info indicates "1", the AI codec high-level syntax 2800 includes dependent_ai_condition_info that is AI auxiliary data dependency information indicating whether AI auxiliary data for a preceding data unit is applied to the current data unit. The dependent_ai_condition_info is a syntax element having a size of 1 bit. When the dependent_ai_condition_info indicates "1", the AI codec high-level syntax 2800 ends.

When the dependent_ai_condition_info indicates "0", the AI codec high-level syntax 2800 includes ai_codec_DNN_index that is DNN index information. The ai_codec_DNN_index represents a syntax element encoded by an exponential Golomb encoding scheme.

The AI codec high-level syntax 2800 includes ai_codec_DNN_update_flag which is DNN update permission information. The ai_codec_DNN_update_flag represents a syntax element having a size of 1 bit. When the ai_codec_DNN_update_flag indicates "0", frame DNN setting information is determined with reference to higher-level DNN setting information indicated by the ai_codec_DNN_index.

When ai_codec_DNN_update_flag indicates "1", ai_codec_bias [i][j][k] that is bias information and ai_codec_weights[i][j] [k][l][m] that is weight information are included in the AI codec high-level syntax 2800. According to an embodiment of the disclosure, ai_codec_weights [i][j][k][l][m] may indicate a difference between a weight of a filter kernel in a higher-level DNN and a weight of a filter kernel in an updated DNN, the weights being arranged at the same position in the filter kernels. Similarly, ai_codec_bias [i][j][k] may indicate a difference between biases at the same position respectively in the higher-level DNN and the updated DNN.

Furthermore, the AI codec high-level syntax 2800 may include filter kernel identity information indicating whether parameters of a filter kernel in the updated DNN are identical to parameters of a filter kernel in the higher-level DNN. When the filter kernel identity information indicates that the parameters of the filter kernel in the updated DNN are identical to those of the filter kernel in the higher-level DNN, the ai_codec_weights[i][j][k][l][m] and/or the ai_codec_bias[i][j][k] may be omitted from the AI codec high-level syntax 2800.

The AI codec high-level syntax 2800 of FIG. 28 is merely an example, and according to an embodiment of the disclosure, some of the syntax elements of FIG. 28 may be excluded from the AI codec high-level syntax 2800, or a syntax not shown in FIG. 28 may be included to the AI codec high-level syntax 2800. Furthermore, an algorithm illustrated in FIG. 27 may be implemented in different ways in the AI codec high-level syntax 2800 of FIG. 28.

The AI codec high-level syntax 2800 of FIG. 28 may be implemented in the form of an SEI message. The SEI message in which the AI codec high-level syntax 2800 of FIG. 28 is implemented is transmitted for a frame.

According to an embodiment of the disclosure, the ai_codec_info and the dependent_ai_condition_info illustrated in FIG. 28 may be included in a syntax other than the AI codec high-level syntax 2800. In this case, the AI codec high-level syntax 2800 may be set to be activated when the ai_codec_info and the dependent_ai_condition_info included in the other syntax both indicate "0".

Figure 29:
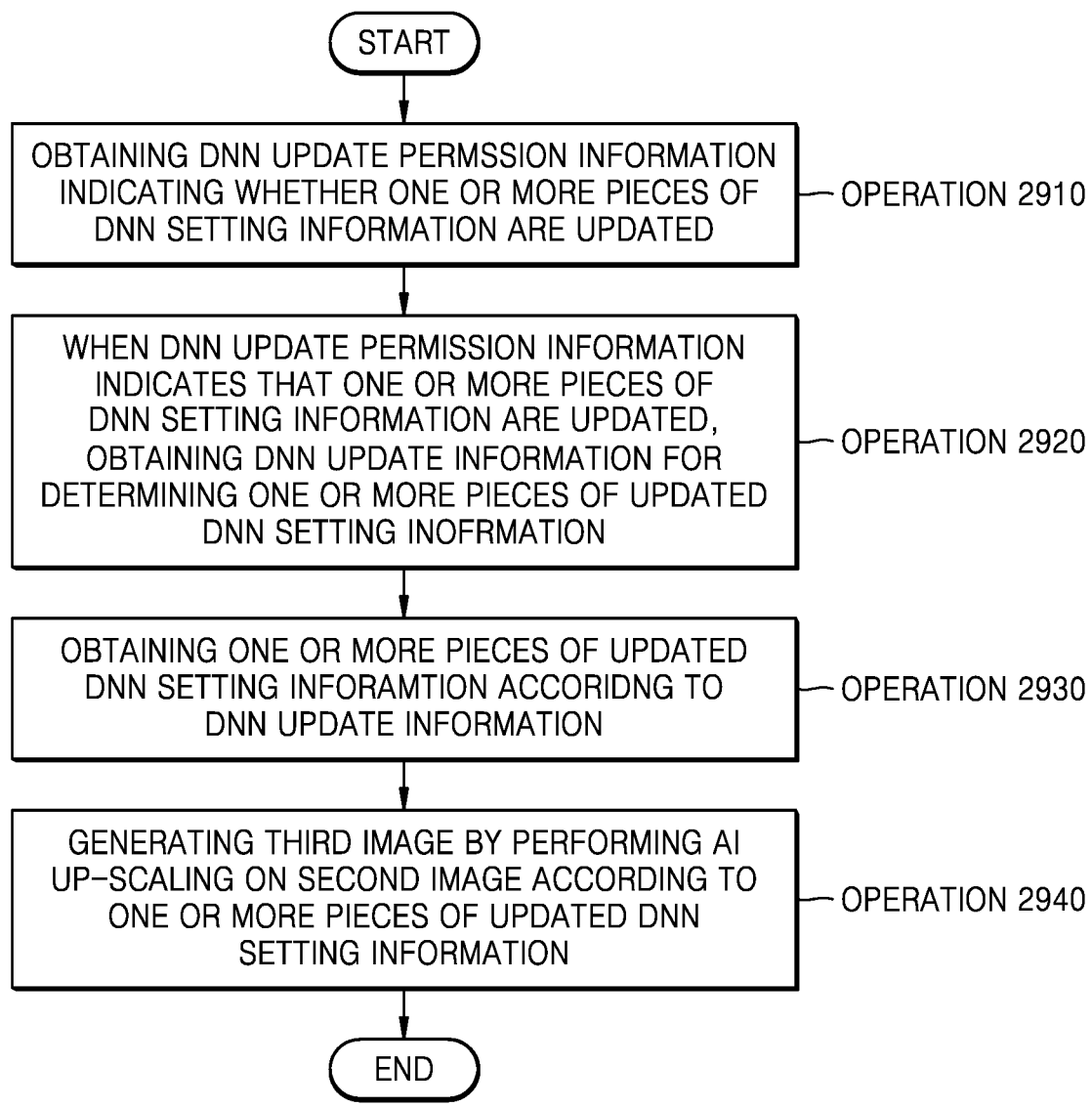
FIG. 29 is a flowchart of an image decoding method performed by an AI decoding apparatus, according to an embodiment.

FIG. 29 is a flowchart of an image decoding method performed by an AI decoding apparatus, according to an embodiment of the disclosure.

DNN update permission information indicating whether one or more pieces of DNN setting information are updated is obtained (operation 2910).

When the DNN update permission information indicates that the one or more pieces of DNN setting information are updated, DNN update information for determining one or more pieces of updated DNN setting information is obtained (operation 2920).

When the DNN update permission information indicates that the one or more pieces of DNN setting information are not updated, DNN update information is not obtained. Thus, a third image may be generated by performing AI up-scaling on a second image according to one or more pieces of default DNN setting information.

According to an embodiment of the disclosure, the DNN update information may include DNN number information indicating the number of one or more pieces of updated DNN setting information. Furthermore, the DNN update information may include at least one of layer number information indicating the number of layers included in a DNN, input channel information indicating the number of input channels in a layer, output channel information indicating the number of output channels in the layer, filter kernel size information indicating a size of a filter kernel of the layer, weight information indicating weights of the filter kernel, or bias information indicating a bias for adjusting an output of the filter kernel.

According to an embodiment of the disclosure, the DNN update information may include default DNN reuse permission information indicating whether information about a structure of a default DNN is reused for updated DNN setting information. When the default DNN reuse permission information indicates that the information about the structure of the default DNN is to be reused for the updated DNN setting information, the DNN update information may include reference DNN index information indicating an index of the default DNN. Furthermore, the DNN update information may include at least one of weight information indicating weights of a filter kernel or bias information indicating a bias for adjusting an output of the filter kernel. The weight information may include a difference between weights respectively in the default DNN and an updated DNN, and the bias information may indicate a difference between biases respectively in the default DNN and the updated DNN.

One or more pieces of updated DNN setting information are obtained according to the DNN update information (operation 2930).

According to an embodiment of the disclosure, the number of pieces of updated DNN setting information is determined from DNN number information.

According to an embodiment of the disclosure, when the default DNN reuse permission information indicates that the information about the structure of the default DNN is reused for the updated DNN setting information, one or more pieces of updated DNN setting information may be determined according to the information about the structure of the default DNN indicated by reference DNN index information and the DNN update information. For example, the number of layers, the number of input channels in each layer, the number of output channels in each layer, and a size of a filter kernel of each layer in the updated DNN setting information may be determined according to the number of layers in the default DNN indicated by the reference DNN index information, the number of input channels in each of the layers, the number of output channels in each layer, and a size of a filter kernel of each layer. Furthermore, weights and a bias of the filter kernel in the updated DNN setting information may be determined from the DNN update information.

According to an embodiment of the disclosure, operations 2910 through 2930 may be performed for a frame group including a plurality of frames. Alternatively, operations 2910 through 2930 may be performed for a video.

A third image is obtained by performing AI up-scaling on the second image according to the one or more pieces of updated DNN setting information (operation 2940).

According to an embodiment of the disclosure, operation 2940 may be performed for a frame. According to DNN index information obtained for the frame, updated DNN setting information for the frame may be determined from among the one or more pieces of updated DNN setting information. In addition, a third image in the frame may be obtained by performing AI up-scaling on a second image in the frame according to the updated DNN setting information.

According to an embodiment of the disclosure, secondary DNN update permission information may be obtained, which indicates whether a secondary update of the updated DNN setting information determined for the frame is to be performed. When the secondary DNN update permission information indicates the secondary update of the updated DNN setting information, secondary DNN update information may be obtained. Furthermore, a third image in the frame may be obtained by performing AI up-scaling on a second image in the frame according to secondary updated DNN setting information determined from the secondary DNN update information.

According to an embodiment of the disclosure, determination of the one or more pieces of updated DNN setting information according to operations 2910 through 2930 may be omitted. Instead, one or more pieces of default DNN setting information optimized for a video or frame group may be obtained.

The image decoding method 2900 illustrated in FIG. 29 is merely an example, and the embodiments associated with updating of DNN setting information described with reference to FIGS. 14 through 28 may be applied to the image decoding method 2900 of FIG. 29.

Figure 30:
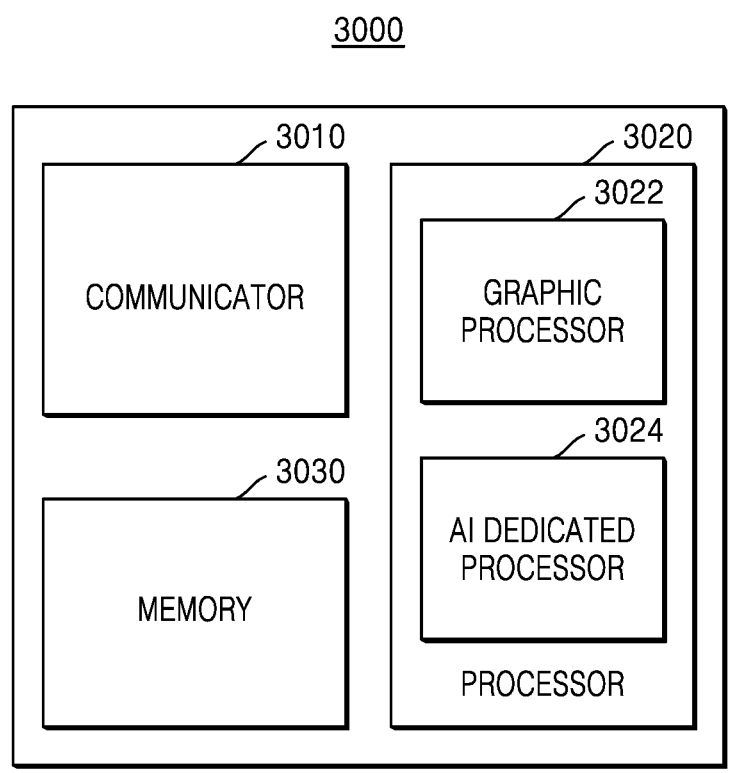
FIG. 30 is a block diagram of an image decoding apparatus according to an embodiment.

FIG. 30 is a block diagram of a configuration of an image decoding apparatus 3000 according to an embodiment of the disclosure.

The image decoding apparatus 3000 may include a communicator 3010, a processor 3020, and a memory 3030.

The communicator 3010 may receive AI data and image data from an external device (e.g., a server) according to control by the processor 3020.

The processor 3020 may control all operations of the image decoding apparatus 3000. According to an embodiment of the disclosure, the processor 3020 may execute one or more programs stored in the memory 3030. The processor 3020 may also perform the functions of the first decoder 1732 and the AI up-scaler 1734 (shown in FIG. 17). The processor 3020 may be include one or more processors.

According to an embodiment of the disclosure, the processor 3020 may include a graphics processor 3022 and an AI dedicated processor 3024. Furthermore, the processor 3020 may be implemented in the form of a system on chip (SoC) incorporating at least one of the graphics processor 3022 or the AI dedicated processor 3024. The processor 3022 controls all operations of the image decoding apparatus 3000 and flow of signals between the internal components of the image decoding apparatus 3000 and processes data.

The graphics processor 3022 is a processor with a design specialized for decoding and post-processing images. Thus, the graphics processor 3022 may perform calculations needed to process image data received through the communicator 3010 or retrieved from the memory of the image decoding apparatus 3000. Accordingly, low-resolution image reconstruction function of the first decoder 1732 may be efficiently performed by the graphics processor 3022. The AI dedicated processor 3024 is a processor with a design specialized for AI computation. Thus, the AI dedicated processor 3024 may efficiently perform calculations necessary for the AI up-scaler 1734 to perform the function of AI up-scaling a low-resolution image. Specifically, the AI dedicated processor 3024 may perform calculations necessary for the DNN controller 1736 to update a DNN and determine DNN setting information. In addition, the AI dedicated processor 3024 may perform calculations necessary for the image processor 1738 to AI up-scale a low-resolution image.

The image data and AI data input to the image decoding apparatus 3000 via the communicator 3010 are processed by the processor 3020. The graphics processor 3022 may decode the image data to generate a low-resolution image. The AI dedicated processor 3024 may then perform AI-upscaling on the low-resolution image generated by the graphics processor 3022. Accordingly, the AI dedicated processor 3024 may generate a high-resolution image by AI-upscaling the low-resolution image. Furthermore, an up-scaling DNN necessary for AI up-scaling may be set by the AI dedicated processor 3024.

Although it has been described that the processor 3020 includes one graphics processor 3022, according to an embodiment of the disclosure, the processor 3020 may include two or more graphics processors 3022. Furthermore, although it has been described that the processor 3020 includes one AI dedicated processor 3024, according to an embodiment of the disclosure, the processor 3020 may include two or more AI dedicated processors 3024. In addition, the processor 3020 may include one or more general-purpose processors. Additional processes required for AI up-scaling may be performed according to control by the one or more general-purpose processor. The AI dedicated processor 3024 may be implemented as a hardware field programmable gate array (FPGA).

According to an embodiment of the disclosure, the memory 3030 may store various data, programs, or applications for driving and controlling the image decoding apparatus 3000. A program stored in the memory 3030 may include one or more instructions. Furthermore, a program (one or more instructions) or an application stored in the memory 3030 may be executed by the processor 3020. The memory 3030 may store data originating from the communicator 3010 and the processor 3020. Furthermore, the memory 3030 may transmit data requested by the processor 3020 to the processor 3020.

According to an embodiment of the disclosure, the image decoding apparatus 3000 may perform at least one from among the functions of the AI decoding apparatus 200 described with reference to FIG. 2 and operations of the image decoding method described with reference to FIG. 29.

The image decoding method 2900 of FIG. 29 may be implemented by the image decoding apparatus 3000 of FIG. 30. Technical characteristics associated with updating of DNN setting information described with reference to FIGS.

17 through 28 may be applied to the image decoding method 2900 of FIG. 29 performed by the image decoding apparatus 3000 of FIG. 30.

The image decoding method 2900 of FIG. 29 performed by the image decoding apparatus 3000 of FIG. 30, according to various embodiments of the disclosure, may be written as a program executable on a computer. Furthermore, the data structures 2320, 2400, 2500, 2600, 2700, and 2800 described with reference to FIGS. 23 through 28 may be interpreted by the image decoding apparatus 3000, and accordingly, DNN setting information used for AI up-scaling may be determined.

In addition, the embodiments of the disclosure described above may be written as computer-executable programs or instructions that may be stored in a storage medium.

The storage medium may continuously store the computer-executable programs or instructions, or temporarily store the computer-executable programs or instructions for execution or downloading. Also, the storage medium may be any one of various recording media or storage media in which a single piece or plurality of pieces of hardware are combined, and the storage medium is not limited to a medium directly connected to a computer system, but may be distributed on a network. Here, the storage medium may include one or more computer-readable storage medium that refers to any type of physical memory on which information or data readable by a processor may be stored. The term "computer-readable medium" should be understood to include tangible items and exclude carrier waves and transient signals, i.e., non-transitory. Examples of the storage medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Furthermore, a model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

According to the embodiments of the disclosure, a method of decoding an image by using updated DNN setting information used for image up-scaling is provided. A quality of an up-scaled image may be improved by using a DNN configured according to DNN setting information optimized for an image.

While one or more embodiments of the disclosure have been shown and described above, it will be understood by those of ordinary skill in the art that various changes in form and details may be made therein without departing from the spirit and scope as defined by the following claims.

What is claimed is:

1. An image decoding method comprising:
obtaining deep neural network (DNN) update information that is obtained by inputting a training image to a first DNN and performing artificial intelligence (AI) downscaling on the training image by the first DNN, wherein the DNN update information includes information which indicates whether one or more pieces of DNN setting information of a second DNN, which are determined to be used for previous AI upscaling, are updated;
updating DNN setting information of the second DNN based on the DNN update information indicating the one or more pieces of DNN setting information of the second DNN, which are determined to be used for previous AI upscaling, are updated; and
obtaining an output image by performing AI up-scaling on an input image using the second DNN, according to the updated DNN setting information,
wherein the one or more pieces of DNN setting information of the second DNN, which are determined to be used for previous AI upscaling, are determined as the DNN setting information of the second DNN, based on the DNN update information indicating the one or more pieces of DNN setting information of the second DNN, which are determined to be used for previous AI upscaling, are not updated.

2. The image decoding method of claim 1, further comprising, based on the DNN update information indicating that one or more pieces of the DNN setting information are not updated, obtaining the output image by performing the AI up-scaling on the input image according to default DNN setting information.

3. The image decoding method of claim 1, wherein the DNN update information comprises DNN number information indicating a number of one or more pieces of the updated DNN setting information, and
wherein the determining the one or more pieces of the updated DNN setting information comprises determining whether the number of the one or more pieces of the updated DNN setting information matches the number of the one or more pieces of the updated DNN setting information indicated by the DNN number information.

4. The image decoding method of claim 1, wherein the DNN update information comprises at least one of layer number information indicating a number of layers included in the second DNN, input channel information indicating a number of input channels in each of the layers, output channel information indicating a number of output channels in each of the layers, filter kernel size information indicating a size of a filter kernel in each of the layers, weight information indicating weights of the filter kernel, or bias information indicating a bias for adjusting an output of the filter kernel.

5. The image decoding method of claim 1, wherein the obtaining the DNN update information comprises:

obtaining DNN reuse information indicating whether a default DNN is reused for updating the DNN setting information, the default DNN being preset with default DNN setting information;

based on the DNN reuse information indicating that the default DNN is reused for updating the DNN setting information, obtaining reference DNN index information indicating an index of the default DNN of which information is reused; and based on the DNN reuse information indicating that the default DNN is reused for updating the DNN setting information, determining one or more pieces of the updated DNN setting information according to the default DNN indicated by the reference DNN index information and the DNN update information.

6. The image decoding method of claim 5, wherein the obtaining the DNN update information further comprises:

determining a number of layers, a number of input channels in each of the layers, a number of output channels in each of the layers, and a size of a filter kernel of each of the layers according to a number of default layers in the default DNN indicated by the reference DNN index information, a number of default input channels in each of the default layers, a number of output channels in each of the default layers, and a size of a filter kernel of each of the default layers; and determining, from the DNN update information, weights and a bias of the filter kernel in the updated DNN setting information.

7. The image decoding method of claim 6, wherein the DNN update information comprises at least one of weight information indicating the weights of the filter kernel or bias information indicating the bias for adjusting an output of the filter kernel, wherein the weight information indicates a difference between weights respectively in the default DNN and the second DNN, and wherein the bias information indicates a difference between biases respectively in the default DNN and the second DNN.

8. The image decoding method of claim 1, wherein the obtaining the DNN update information is performed for a frame group that is a coded video sequence including a plurality of frames, and wherein the obtaining the output image comprises:

determining, for a frame in the frame group, the updated DNN setting information used for the frame based on one or more pieces of the updated DNN setting information; and obtaining the output image in the frame by performing the AI up-scaling on the input image in the frame according to the updated DNN setting information.

9. The image decoding method of claim 1, wherein the obtaining the output image comprises:

obtaining, for a frame, DNN index information indicating updated DNN setting information used for the frame based on one or more pieces of the updated DNN setting information;

determining, according to the DNN index information, the updated DNN setting information used for the frame based on the one or more pieces of the updated DNN setting information;

obtaining second DNN update information indicating whether a second update of the updated DNN setting information is to be performed;

based on the second DNN update information indicating that the second update of the updated DNN setting information is to be performed, obtaining secondary DNN update information; and obtaining the output image by performing the AI up-scaling on the input image by using the second DNN updated according to the second DNN update information.

10. An image decoding apparatus comprising:

a memory storing one or more instructions; and a processor configured to execute the one or more instructions stored in the memory to:

obtain deep neural network (DNN) update information that is obtained by inputting a training image to a first DNN and performing artificial intelligence (AI) down-scaling on the training image by the first DNN, wherein the DNN update information includes information which indicates whether one or more pieces of DNN setting information of a second DNN, which are determined to be used for previous AI upscaling, are updated;

updating DNN setting information of the second DNN based on the DNN update information indicating the one or more pieces of DNN setting information of the second DNN, which are determined to be used for previous AI upscaling, are updated; and obtain an output image by performing AI up-scaling on an input image using the second DNN, according to the updated DNN setting information, wherein the one or more pieces of DNN setting information of the second DNN, which are determined to be used for previous AI upscaling, are determined as the DNN setting information of the second DNN, based on the DNN update information indicating the one or more pieces of DNN setting information of the second, which are determined to be used for previous AI upscaling, are not updated.

11. A non-transitory computer-readable storage medium storing instructions to perform an image decoding method, the image decoding method comprising:

obtaining deep neural network (DNN) update information that is obtained by inputting a training image to a first DNN and performing artificial intelligence (AI) down-scaling on the training image by the first DNN, wherein the DNN update information includes information which indicates whether one or more pieces of DNN setting information of a second DNN, which are determined to be used for previous AI upscaling, are updated;

updating DNN setting information of the second DNN based on the DNN update information indicating the one or more pieces of DNN setting information of the second DNN, which are determined to be used for previous AI upscaling, are updated; and obtaining an output image by performing AI up-scaling on an input image using the second DNN, according to the updated DNN setting information, wherein the one or more pieces of DNN setting information of the second DNN, which are determined to be used for previous AI upscaling, are determined as the DNN setting information of the second DNN, based on the DNN update information indicating the one or more pieces of DNN setting information of the second DNN, which are determined to be used for previous AI upscaling, are not updated.

12. The non-transitory computer-readable storage medium of claim 11, wherein the DNN update information comprises DNN number information indicating a number of one or more pieces of the updated DNN setting information, and wherein the DNN update information further comprises DNN index information indicating whether the number of the one or more pieces of the updated DNN setting information matches the number of the one or more pieces of the updated DNN setting information indicated by the DNN number information.

13. The non-transitory computer-readable storage medium of claim 11, wherein the DNN update information further comprises:

DNN reuse information indicating whether a default DNN is reused for the updated DNN setting information, the default DNN being preset with default DNN setting information; and based on the DNN reuse information indicating that the default DNN is reused for updating the DNN setting information, the DNN update information further includes reference DNN index information indicating an index of the default DNN of which information is reused.

14. The non-transitory computer-readable storage medium of claim 13, wherein the DNN setting information for which a structure of the default DNN indicated by the reference DNN index information is reused comprises a number of layers in the default DNN, a number of input channels in each of the layers, a number of output channels in each of the layers, and a size of a filter kernel of each of the layers, and wherein the DNN setting information for which the structure of the default DNN indicated by the reference DNN index information is not reused comprises weights and a bias of the filter kernel.

15. The non-transitory computer-readable storage medium of claim 11, wherein the DNN update information further comprises:

DNN index information that is set for each of a plurality of frames in a frame group, and second DNN update information indicating whether a second update of the updated DNN setting information determined according to the DNN index information is to be performed, and wherein the image decoding method further comprises, based on the second DNN update information indicating that the second update of the updated DNN setting information is to be performed, performing the AI up-scaling on the input image according to the second DNN update information.

16. The image decoding method of claim 1, wherein structural loss information is determined based on a difference between structure information of a reduced training image and structure information of a first training image output by the first DNN, the reduced training image being obtained by performing at least one of bilinear scaling, bi-cubic scaling, lanczos scaling or stair-step scaling on an original image, wherein complexity loss information is determined based on spatial complexity of the first training image and includes a total variance value of the first training image, and wherein quality loss information comprises at least one of an L1-norm value, an L2-norm value, a Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value, of a difference between the original image and the output image.

* * * * *